United States Patent
Lablans

(10) Patent No.: US 9,171,221 B2
(45) Date of Patent: Oct. 27, 2015

(54) CAMERA TO TRACK AN OBJECT

(71) Applicant: Peter Lablans, Morris Township, NJ (US)

(72) Inventor: Peter Lablans, Morris Township, NJ (US)

(73) Assignee: Spatial Cam LLC, Morristown, NJ (US)

( * ) Notice: Subject to any disclaimer, the term of this patent is extended or adjusted under 35 U.S.C. 154(b) by 284 days.

(21) Appl. No.: 13/844,626

(22) Filed: Mar. 15, 2013

(65) Prior Publication Data

US 2013/0229529 A1   Sep. 5, 2013

Related U.S. Application Data

(63) Continuation-in-part of application No. 12/983,168, filed on Dec. 31, 2010.

(60) Provisional application No. 61/365,347, filed on Jul. 18, 2010.

(51) Int. Cl.
| | |
|---|---|
| H04N 5/225 | (2006.01) |
| G06K 9/32 | (2006.01) |
| H04N 5/232 | (2006.01) |
| H04N 5/262 | (2006.01) |
| H04N 13/02 | (2006.01) |
| H04M 1/725 | (2006.01) |
| G03B 35/08 | (2006.01) |
| G03B 37/04 | (2006.01) |

(52) U.S. Cl.
CPC .......... *G06K 9/3241* (2013.01); *H04N 5/23238* (2013.01); *H04N 5/2624* (2013.01); *H04N 13/0239* (2013.01); *H04N 13/0246* (2013.01); *G03B 35/08* (2013.01); *G03B 37/04* (2013.01); *H04M 1/7253* (2013.01); *H04M 1/72527* (2013.01); *H04M 2250/16* (2013.01)

(58) Field of Classification Search
CPC .................................................... G06K 9/3241
USPC ......................................................... 348/169
See application file for complete search history.

(56) References Cited

U.S. PATENT DOCUMENTS

| | | | | |
|---|---|---|---|---|
| 3,733,434 | A | * | 5/1973 | Weinstein ...................... 348/170 |
| 3,754,247 | A | * | 8/1973 | Hansford ........................ 342/23 |
| 3,766,835 | A | * | 10/1973 | Kobelt .............................. 92/68 |
| 4,550,376 | A | * | 10/1985 | Maciejczak ........................ 703/1 |
| 4,577,827 | A | * | 3/1986 | Eliscu ............................ 248/656 |
| 4,640,481 | A | * | 2/1987 | Kohno ............................ 248/126 |
| 4,782,402 | A | | 11/1988 | Kanamaru |

(Continued)

OTHER PUBLICATIONS

Szeliski, Richard "Image Alignment and Stitching: A Tutorial Preliminary Draft", *Technical Report MSR-TR-2004-92, Microsoft online*, (Sep. 27, 2004), 59 pp.

(Continued)

*Primary Examiner* — Dave Czekaj
*Assistant Examiner* — Leron Beck

(57) ABSTRACT

Methods and apparatus to create and display screen stereoscopic and panoramic images are disclosed. Methods and apparatus are provided to generate multiple images that are combined into a stereoscopic or a panoramic image. A controller provides correct camera settings for different conditions. A controller rotationally aligns images of lens/sensor units that are rotationally misaligned. A compact controllable platform holds and rotates a camera. A remote computing device with a camera and a digital compass tracks an object causing the camera in the platform to track the object.

12 Claims, 24 Drawing Sheets

(56) References Cited

U.S. PATENT DOCUMENTS

| | | | |
|---|---|---|---|
| 4,794,414 A * | 12/1988 | Kozina et al. | 396/504 |
| 4,866,430 A * | 9/1989 | Chek | 345/82 |
| 5,216,816 A * | 6/1993 | Ida | 33/356 |
| 5,257,324 A | 10/1993 | Bumgardner | |
| 5,343,243 A | 8/1994 | Maeda | |
| 5,434,617 A * | 7/1995 | Bianchi | 348/170 |
| 5,537,251 A * | 7/1996 | Shimada | 359/462 |
| 5,568,192 A | 10/1996 | Hannah | |
| 5,612,732 A * | 3/1997 | Yuyama et al. | 348/14.01 |
| 5,646,679 A | 7/1997 | Yano et al. | |
| 5,680,649 A | 10/1997 | Akimoto et al. | |
| 5,947,359 A * | 9/1999 | Yoshie | 224/570 |
| 6,029,073 A * | 2/2000 | Lebby et al. | 455/566 |
| 6,043,310 A | 3/2000 | Liu et al. | |
| 6,069,593 A * | 5/2000 | Lebby et al. | 345/1.1 |
| 6,076,978 A * | 6/2000 | McIlvenna | 396/425 |
| 6,157,379 A * | 12/2000 | Singh | 715/866 |
| 6,160,607 A * | 12/2000 | Diaconu | 352/140 |
| 6,178,144 B1 | 1/2001 | Huiber | |
| 6,282,320 B1 | 8/2001 | Hasegawa et al. | |
| 6,323,858 B1 | 11/2001 | Gilbert et al. | |
| 6,392,694 B1 * | 5/2002 | Bianchi | 348/169 |
| 6,421,069 B1 * | 7/2002 | Ludtke et al. | 715/762 |
| 6,445,833 B1 | 9/2002 | Murata et al. | |
| 6,512,670 B1 * | 1/2003 | Boehme et al. | 361/679.29 |
| 6,574,417 B1 | 6/2003 | Lin et al. | |
| 6,669,346 B2 | 12/2003 | Metcalf | |
| 6,696,198 B2 | 2/2004 | Okahisa et al. | |
| 6,715,940 B2 * | 4/2004 | Top et al. | 396/427 |
| 6,727,941 B1 | 4/2004 | Coleman | |
| 6,747,610 B1 * | 6/2004 | Taima et al. | 345/6 |
| 6,771,810 B1 | 8/2004 | Zhang et al. | |
| 6,781,635 B1 * | 8/2004 | Takeda | 348/552 |
| 6,819,355 B1 * | 11/2004 | Niikawa | 348/207.11 |
| 6,853,809 B2 * | 2/2005 | Pelletier | 396/85 |
| 6,885,374 B2 | 4/2005 | Doyle et al. | |
| 6,961,055 B2 | 11/2005 | Doak et al. | |
| 6,972,796 B2 | 12/2005 | Katta et al. | |
| 6,975,308 B1 | 12/2005 | Bitetto et al. | |
| 6,992,733 B1 * | 1/2006 | Klein | 349/58 |
| 7,020,888 B2 | 3/2006 | Reynolds et al. | |
| 7,085,484 B2 | 8/2006 | Hara | |
| 7,102,686 B1 | 9/2006 | Orimoto et al. | |
| 7,103,698 B2 * | 9/2006 | Zhang et al. | 710/303 |
| 7,109,990 B1 * | 9/2006 | Oler et al. | 345/428 |
| 7,123,745 B1 | 10/2006 | Lee | |
| 7,126,897 B2 | 10/2006 | Takeuchi et al. | |
| 7,136,333 B2 | 11/2006 | Wong et al. | |
| 7,149,178 B2 | 12/2006 | Wong et al. | |
| 7,167,155 B1 | 1/2007 | Albert et al. | |
| 7,218,144 B2 | 5/2007 | Lablans | |
| 7,221,395 B2 * | 5/2007 | Kinjo | 348/239 |
| 7,227,893 B1 | 6/2007 | Srinivasa et al. | |
| 7,259,792 B2 | 8/2007 | Terada | |
| 7,280,745 B2 | 10/2007 | Mollie et al. | |
| 7,340,077 B2 | 3/2008 | Gokturk | |
| 7,345,934 B2 | 3/2008 | Guterman et al. | |
| 7,355,444 B2 | 4/2008 | Lablans | |
| 7,365,787 B2 | 4/2008 | Nobels | |
| 7,365,789 B2 | 4/2008 | Ogino | |
| 7,376,441 B2 * | 5/2008 | Lee | 455/556.1 |
| 7,379,664 B2 * | 5/2008 | Marcus | 396/56 |
| 7,389,580 B2 | 6/2008 | Jenson et al. | |
| 7,397,690 B2 | 7/2008 | Lablans | |
| 7,418,275 B2 * | 8/2008 | Yiu | 455/566 |
| 7,424,175 B2 | 9/2008 | Lipton et al. | |
| 7,429,988 B2 * | 9/2008 | Gonsalves et al. | 345/472 |
| 7,460,781 B2 * | 12/2008 | Kanai et al. | 396/263 |
| 7,477,919 B2 * | 1/2009 | Warren | 455/557 |
| 7,526,586 B2 * | 4/2009 | Huber et al. | 710/72 |
| 7,616,248 B2 | 11/2009 | Parulski et al. | |
| 7,636,132 B2 * | 12/2009 | Sakamoto | 348/723 |
| 7,643,066 B2 * | 1/2010 | Henninger et al. | 348/211.99 |
| 7,667,765 B2 | 2/2010 | Turley et al. | |
| 7,676,150 B2 | 3/2010 | Nakashima | |
| 7,688,306 B2 | 3/2010 | Wehrenberg et al. | |
| 7,741,734 B2 | 6/2010 | Joannopoulos et al. | |
| 7,756,638 B2 * | 7/2010 | Hoashi | 701/432 |
| 7,835,736 B2 * | 11/2010 | Larocca | 455/432.3 |
| 7,869,117 B2 * | 1/2011 | Choi et al. | 359/296 |
| 7,911,493 B2 * | 3/2011 | Sarma | 348/14.01 |
| 8,077,243 B2 * | 12/2011 | Morita et al. | 348/333.04 |
| 8,180,410 B2 * | 5/2012 | Kim | 455/575.1 |
| 8,233,090 B2 * | 7/2012 | Chun | 348/552 |
| 8,284,288 B2 * | 10/2012 | Kitamori et al. | 348/333.06 |
| 8,311,513 B1 * | 11/2012 | Nasserbakht et al. | 455/410 |
| 8,325,239 B2 * | 12/2012 | Kaplan et al. | 348/207.1 |
| 8,326,315 B2 * | 12/2012 | Phillips et al. | 455/456.1 |
| 8,374,421 B1 * | 2/2013 | Hickman | 382/153 |
| 8,619,021 B2 * | 12/2013 | Hayton | 345/107 |
| 8,659,666 B2 * | 2/2014 | Ishibashi | 348/207.1 |
| 2002/0094845 A1 | 7/2002 | Inasaka | 455/566 |
| 2003/0030638 A1 | 2/2003 | Astrom et al. | |
| 2004/0257436 A1 | 12/2004 | Koyanagi et al. | |
| 2004/0263659 A1 * | 12/2004 | Abe | 348/333.01 |
| 2005/0122400 A1 | 6/2005 | Kochi et al. | |
| 2006/0061951 A1 * | 3/2006 | Hara | 361/683 |
| 2006/0164883 A1 | 7/2006 | Lablans | |
| 2006/0233544 A1 * | 10/2006 | Coppola | 396/428 |
| 2006/0259942 A1 * | 11/2006 | Toyama et al. | 725/133 |
| 2007/0010200 A1 * | 1/2007 | Kaneko | 455/41.2 |
| 2007/0031062 A1 | 2/2007 | Pal et al. | |
| 2007/0035516 A1 | 2/2007 | Voto et al. | |
| 2007/0120979 A1 | 5/2007 | Zhang et al. | |
| 2007/0247697 A1 | 10/2007 | Sohn et al. | |
| 2007/0248260 A1 * | 10/2007 | Pockett | 382/154 |
| 2008/0002023 A1 | 1/2008 | Cutler | |
| 2008/0024594 A1 | 1/2008 | Ritchey | |
| 2008/0024596 A1 | 1/2008 | Li et al. | |
| 2008/0024614 A1 | 1/2008 | Li et al. | |
| 2008/0084961 A1 * | 4/2008 | Keppel et al. | 378/37 |
| 2008/0106634 A1 | 5/2008 | Masuda | |
| 2008/0111583 A1 | 5/2008 | Lablans | |
| 2008/0136990 A1 * | 6/2008 | Kimura | 349/46 |
| 2008/0147730 A1 * | 6/2008 | Lee et al. | 707/104.1 |
| 2008/0180987 A1 | 7/2008 | Lablans | |
| 2008/0239170 A1 * | 10/2008 | Klosowiak et al. | 348/744 |
| 2008/0303888 A1 * | 12/2008 | Hansson | 348/14.02 |
| 2009/0003630 A1 * | 1/2009 | Kuroda et al. | 381/150 |
| 2009/0086015 A1 * | 4/2009 | Larsen et al. | 348/46 |
| 2009/0175323 A1 | 7/2009 | Chung | |
| 2009/0309177 A1 | 12/2009 | Jeung et al. | |
| 2010/0009700 A1 * | 1/2010 | Camp et al. | 455/456.6 |
| 2010/0050779 A1 | 3/2010 | Pushparaj et al. | |
| 2010/0128015 A1 | 5/2010 | Feenstra et al. | |
| 2010/0171708 A1 | 7/2010 | Chuang | |
| 2010/0177111 A1 * | 7/2010 | Abe | 345/589 |
| 2010/0270970 A1 * | 10/2010 | Toya et al. | 320/108 |
| 2011/0007157 A1 * | 1/2011 | Sekelsky et al. | 348/143 |
| 2011/0091195 A1 * | 4/2011 | Goldberg et al. | 396/419 |
| 2011/0095999 A1 * | 4/2011 | Hayton | 345/173 |
| 2011/0216166 A1 * | 9/2011 | Takahashi et al. | 348/46 |
| 2011/0310243 A1 * | 12/2011 | Fuhrmann et al. | 348/92 |
| 2011/0312374 A1 * | 12/2011 | Chen et al. | 455/556.1 |
| 2012/0062702 A1 * | 3/2012 | Jiang et al. | 348/46 |
| 2012/0090004 A1 * | 4/2012 | Jeong | 725/39 |
| 2012/0105573 A1 | 5/2012 | Apostolopoulos | |
| 2012/0212409 A1 * | 8/2012 | Abe | 345/156 |
| 2012/0218379 A1 * | 8/2012 | Ozcan et al. | 348/40 |
| 2012/0293633 A1 | 11/2012 | Yamato | |
| 2013/0010081 A1 | 1/2013 | Tenney et al. | |
| 2013/0057762 A1 * | 3/2013 | Yoshida et al. | 348/552 |
| 2013/0058582 A1 | 3/2013 | Van Beek | |
| 2013/0067505 A1 * | 3/2013 | Hicks | 725/9 |

OTHER PUBLICATIONS

Zitova, Barbara et al., "Image Registration Methods: A Survey", *Image and Vision Computing 21*, (2003), 977-1000 pp.

PCT International Search Report and Written Opinion in PCT/US2009/043075, (Jul. 6, 2009), 12 pgs.

PCT International Search Report & Written Opinion in PCT/US2009/043410, (Jul. 7, 2009), 12 pgs.

(56) References Cited

OTHER PUBLICATIONS

Schein et al., "Optimization of Image Processing Algorithms: A Case Study", Article dated Sep. 23, 2009 published on website of Intel Corporation, Santa Clara, CA, http://software.intel.com/en-us/articles/optimization-of-image-processing-algorithms-a-cas . . . , 11 pgs.

Mingqin et al., "Real Time Image Rotation System", Proceedings of SPIE vol. 4553 (2001), Bellingham, WA., 5 pgs.

Paul S. Heckbert, "Fundamentals of Texture Mapping and Image Warping", Master Thesis, University of California, Berkeley, CA, Jun. 17, 1989, 94 pgs.

A.D. Jepson DJ Fleet, lecture notes "Segmentation" downloaded from http://www.cs.toronto.edu/~jepson/csc2503/segmentation.pdf, 2007.

Sharp Press Release, Apr. 2, 2010 downloaded from: http://sharp-world.com/corporate/news/100402.html.

Kindle 2, Teardown, Part 1. May 12, 2009, downloaded from http://techon.nikkeibp.co.jp/english/NEWS_EN/20090421/169102/.

Kindle 2, Teardown, Part 2, May 13, 2009, downloaded from http://techon.nikkeibp.co.jp/english/NEWS_EN/20090422/169162/.

Kindle 2, Teardown, Part 3, May 14, 2009, downloaded from http://techon.nikkeibp.co.jp/english/NEWS_EN/20090424/169296/.

Kindle 2, Teardown, Part 4, May 15, 2009, downloaded from http://techon.nikkeibp.co.jp/english/NEWS_EN/20090427/169398/.

Kindle 2, Teardown, Part 5, May 18, 2009, downloaded from http://techon.nikkeibp.co.jp/english/NEWS_EN/20090428/169498/.

Samsung Module on Engadet, Mar. 18, 2008, downloaded from http://www.engadget.com/2008/03/18/samsung-announces-worlds-thinnest-8-megapixel-cellphone-module/.

Apple iPAD Teardown, Apr. 7, 2010, Rassweiler, downloaded from http://www.isuppli.com/News/Pages/User-Interface-Focused-iPad-Changes-the-Game-in-Electronic-Design-iSuppli-Teardown-Reveals.aspx.

Pushparaj et al., "Flexible energy storage devices based on nanocomposite paper" in Proceedings of the National Academy of Sciences (PNAS) Aug. 21, 2007 vol. 104 No. 34 pp. 13574-13577.

Que proReader™ Fact Sheet downloaded from: http://www.plasticlogic.com/news/QUE/etc/QUE_Fact_Sheet.pdf.

Vandecasteele et al. "Embedding of thinned chips in plastic substrates" of IMEC-TFCG Microsystems in Zwijnaarde, Belgium downloaded from http://www.sadechaf.eu/pdf-files/paper_IMEC.pdf.

Datasheet of NemoCAM-02AVG downloaded from http://www.nemotek.ma/attachments/020_NEMOCAM%2002AVG.pdf.

Mau-Chung Frank Chang et al. "RF/Wireless Interconnect for Inter- and Intra-Chip Communications" Proceedings of the IEEE, vol. 89, No. 4, Apr. 2001 pp. 456-466.

"On the Direct Estimation of the Fundamental Matrix" by Yaser Sheikh et al. on Apr. 30, 2007 and copyrighted by Radical Eye Software in 2004 and available on-line at <URLhttp://vision.eecs.ucf.edu/papers/742_submission.pdf>.

\* cited by examiner

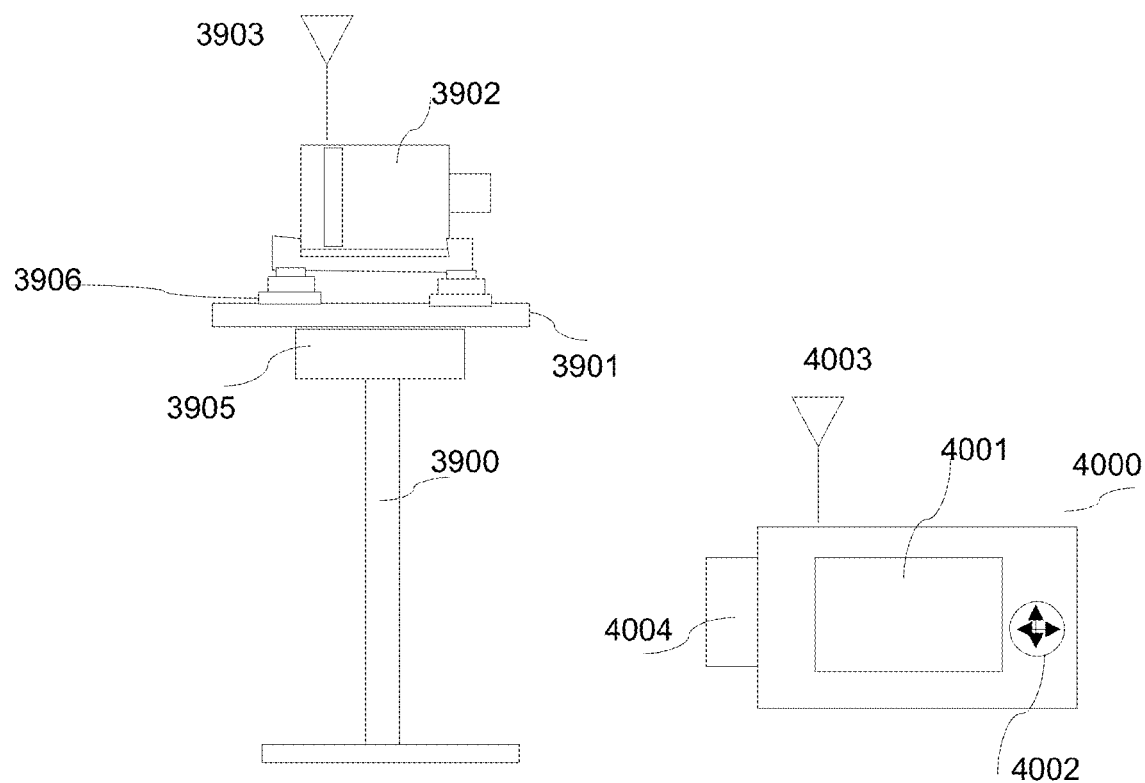
FIG. 37
FIG. 38
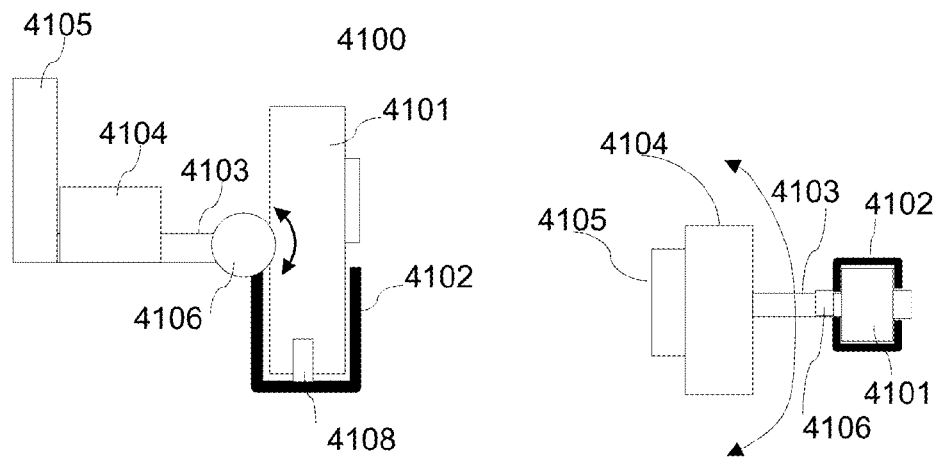
FIG. 39
FIG. 40

CAMERA TO TRACK AN OBJECT

STATEMENT OF RELATED CASES

This application is a continuation-in-part of U.S. Non-Provisional application Ser. No. 12/983,168 filed Dec. 31, 2010 which claims the benefit of U.S. Provisional Patent Application Ser. No. 61/365,347, filed on Jul. 18, 2010 which are both incorporated herein by reference in their entirety.

BACKGROUND OF THE INVENTION

The present invention relates to digital image devices. More specifically, it relates to a thin and large and light weight display that is connectable to a portable computing device which has a digital camera. The camera being able to record single image in one embodiment and at least 2 images concurrently in a second embodiment and generate a stereoscopic image from those at least two images, or a panoramic image or a stereoscopic or panoramic image related to an existing image to be displayed on the thin and large connectable display.

Digital cameras are increasingly popular. The same applies to camera phones. The digital images taken by these devices use a digital sensor and a memory which can store data generated by the sensor. Data may represent a still image. Data may also represent a video image. Images may be viewed on the device. Images may also be transferred to an external device, either for viewing, for storage or for further processing.

Panoramic images are also very popular and have been created from the time of photographic film to the present day of digital imaging. Stereoscopic or 3D images are also created by combining two images. A whole range of tools exists to combine two or more images from a scene into a single, combined, hopefully seamless panoramic image or into a stereoscopic image. This process of combining is called registering, stitching or mosaicing, especially in the case of panoramic images. An advantage of a panoramic image is to provide a view of a scene that is usually beyond what is usually possible with a common camera and having no or very little distortion. For stereoscopic imaging the combining of two images requires to provide the appropriate horizontal parallax to create the right depth illusion.

The processes of picture taking for creating a panoramic or stereoscopic image are processes that have many different technologies, apparatus and methods. Very common is the method of taking a first picture with a single lens camera, followed by taking at least a second picture at a later time, and followed by combining the pictures. This method is not very user friendly or requires complex cameras or complex camera settings. Furthermore, this method may be troublesome for creating video images.

Images taken by a small computing device can usually be displayed on a small integrated display screen on the computing device. The quality and the size of such integrated display screens is generally barely adequate and mainly serves to provide feedback on reviewing an image, not for long time viewing of video or for high quality display of images. A large display screen would enable a better image viewing experience. However, a large display screen integrated into a portable computing device would defy at least some of the benefits of portability and small size. One would also not want to carry a separate heavy and bulky connectable display. It would be beneficial to have a large display screen in a thin, large and light display device that is easy to carry and connectable to the computing device if so desired.

Accordingly, novel and improved ultra-thin, large and ultra-light connectable displays with a large display screen are required.

SUMMARY OF THE INVENTION

One aspect of the present invention presents novel methods and systems for recording, processing storing and concurrent displaying of a plurality of images which may be video programs into a panoramic or a stereoscopic image.

In accordance with an aspect of the present invention a method is provided for tracking an object with a camera, comprising: the camera removably positioned in a holder attached to an actuator attached to a housing, the actuator enabled to rotate the holder relative to the housing, the camera recording an image of the object, a second camera located at a remote location including a display displaying the image of the object recorded by the camera and an image of the object recorded by the second camera being part of a mobile computing device including a digital compass and a processor and a user tracking the object with the second camera causing the camera to track the object based on data from the digital compass.

In accordance with a further aspect of the present invention a method is provided, wherein the image of the object recorded by the camera and the image of the object recorded by the second camera are displayed within a window displayed on the display.

In accordance with yet a further aspect of the present invention a method is provided, wherein the mobile computing device is a smart phone.

In accordance with yet a further aspect of the present invention a method is provided, wherein the mobile computing device provides data that controls the actuator.

In accordance with yet a further aspect of the present invention a method is provided, further comprising: determining an initial azimuth of the housing.

In accordance with yet a further aspect of the present invention a method is provided, further comprising: determining a plurality of positions of the actuator relative to a neutral position.

In accordance with yet a further aspect of the present invention a method is provided, further comprising estimating a speed of the second camera by the processor.

In accordance with yet a further aspect of the present invention a method is provided, wherein an error angle is minimized.

In accordance with yet a further aspect of the present invention a camera is provided for tracking a movement of a moving camera in a device containing a digital compass, comprising: a platform including a base that is attached to a structure, a housing attached to the base, the housing containing a controller to control an actuator attached to the housing and attached to a holder enabled to removably hold the camera, the actuator enabled to rotatably move the holder relative to the base, a communication link enabled to transmit data representing an image recorded by the camera and the communication link enabled to receive control data for the controller based on the data representing the image recorded by the camera and data generated by the digital compass.

In accordance with yet a further aspect of the present invention a camera is provided, wherein the device is a smart phone.

In accordance with yet a further aspect of the present invention a camera is provided, wherein the moving camera includes a display enabled to display the image recorded by the camera and the image recorded by the moving camera.

In accordance with yet a further aspect of the present invention a camera is provided, wherein the display displays at least one of the image recorded by the camera and the image recorded by the moving camera in a transparent mode.

In accordance with yet a further aspect of the present invention a camera is provided, further comprising a window displayed on the display inside which the image recorded by the camera and the image recorded by the moving camera are displayed.

In accordance with yet a further aspect of the present invention a camera is provided, wherein the housing contains a digital compass.

In accordance with yet a further aspect of the present invention a camera is provided, further comprising a communication link between the camera and a processor in the housing.

In accordance with yet a further aspect of the present invention a camera is provided, wherein the camera is part of a mobile computing device with a communication link to the mobile computing device where the moving camera is part of.

In accordance with yet a further aspect of the present invention a platform is provided removably holding a camera to collaborate with a remote mobile computing device containing a digital compass, comprising: a base enabled to be attached to a structure, a housing attached to the base, the housing containing a controller, an actuator attached to the housing, the actuator being controlled by the controller and a camera holder attached to the actuator enabled to be rotatably moved by the actuator relative to the housing, the camera enabled to be removably held by the holder, wherein the controller controls the actuator based on an image recorded by the camera and a status of the digital compass.

In accordance with yet a further aspect of the present invention a camera is provided, further comprising a communication link between the controller and the remote mobile computing device.

In accordance with yet a further aspect of the present invention a camera is provided, further comprising a digital compass inside the housing.

In accordance with yet a further aspect of the present invention a camera is provided, further comprising a communication link between the camera and the controller.

DESCRIPTION OF THE DRAWINGS

FIG. 37 illustrates a remote controlled platform for a camera in accordance with an aspect of the present invention;

FIG. 38 illustrates a display in accordance with an aspect of the present invention;

FIGS. 39-40 illustrate a remote controlled platform for a camera in accordance with an aspect of the present invention;

DESCRIPTION OF A PREFERRED EMBODIMENT

Figure 1:
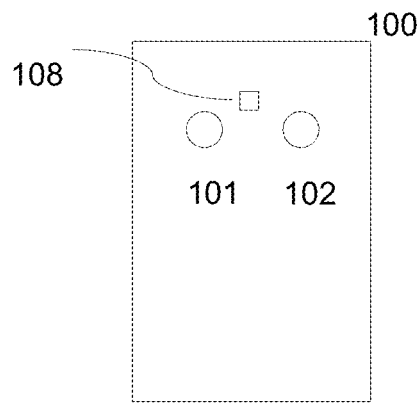
FIG. 1 is a diagram of a camera for panoramic and/or images in frontal view in accordance with an aspect of the present invention.

In earlier inventions the inventor has disclosed methods and apparatus for creating panoramic images. These inventions will be briefly be recapitulated. FIG. 1 shows in diagram a camera 100 having at least two lens/sensor units 101 and 102. A lens/sensor unit contains a lens that corresponds to an image sensor. The image sensor may be a CCD or a CMOS image sensor or any other type of image sensor. An image sensor generally provides lines of pixels as data signals that can be processed by a processor and/or stored in a memory.

An image sensor is associated with a lens. A lens may be combined with a sensor in a housing. The combination of a lens with its associated sensor is called a lens/sensor unit. A lens in one embodiment of the present invention is a fixed focus lens. In a further embodiment of the present invention a lens has a focus mechanism. A focus mechanism can be a manual focus mechanism, for instance by rotating the lens. In yet a further embodiment of the present invention, a lens has an auto-focus mechanism. Part of an autofocus-mechanism can be a distance sensor 108 as illustrated in FIG. 1. In one embodiment of the present invention, the multiple lenses are controlled by a single distance sensor and based on a measured distance all of the lenses of the at least two lens/sensor units are controlled via a single distance sensor. The distance sensor is shown as a sensor 108 outside the lenses. However, in one embodiment of the present invention, the distance sensor for focus setting is a through-the-lens distance sensor.

In one embodiment of the present invention the at least two lens/sensor units are applied to combine two images into a single three-dimensional or stereoscopic image. In that case the camera of FIG. 1 is a stereoscopic camera. In one embodiment of the present invention the at least two lens/sensor units are used to create a panoramic image of a scene. In that case there may be more than two lens/sensor units and the camera of FIG. 1 is called a panoramic camera.

Figure 2:
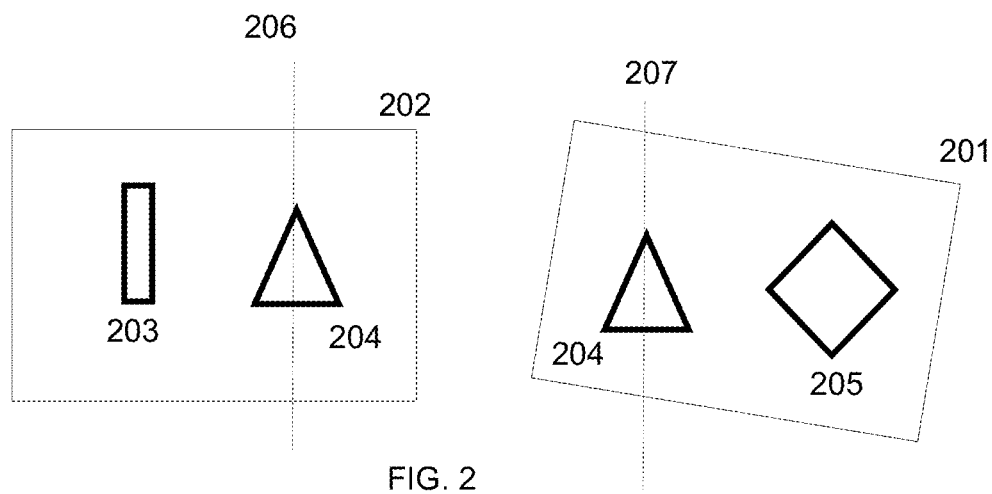
FIGS. 2 and 3 illustrate a panoramic image created in accordance with an aspect of the present invention.

It is well known that more than 2 lens/sensor units may be applied to generate a panoramic image. For instance 3 or more lens/sensor units may be applied. To keep the explanation simple only 2 lens/sensor units 201 and 202 are shown in FIG. 2. Lens/sensor unit 201 corresponds to lens 101 and unit 202 corresponds to lens 102. In manufacturing it may be difficult to perfectly align the units 201 and 202 along their (usually horizontal) scan lines of the sensors. If one sensor is even slightly rotated compared to the other it will require additional measures to form an aligned panoramic image.

FIG. 2 shows three objects 203, 204 and 205 in a scene to be recorded by the camera as a panoramic image. The sensors 201 and 202 are in transformed positions relative to each other, including a translation and a rotation. In order to create a panoramic image during a calibration step that may include determining a distance of the lens to an object and a setting of a lens and/or the camera, for each of the sensors a merge line 206 and 207 is determined. These merge lines help define the active areas of the sensors. An active area of a sensor is the area of pixels that will be used to create and will appear in the panoramic image. The merge lines and thus the active area may change with camera setting and/or distance to objects or other imaging conditions.

Figure 3:
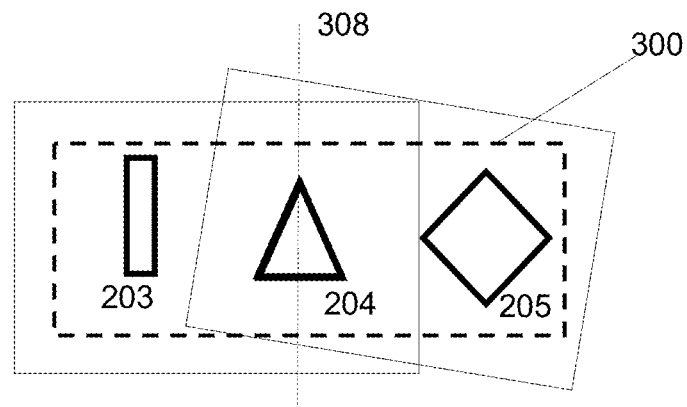

Both sensors have an area of overlap, so when their images are combined along the merge line 308, as shown in FIG. 3, a panoramic image 300 is formed. One has to address the rotation before images can be merged. One may adjust for rotation by for instance instructing a processor to read pixels in such a manner that the read pixel lines are aligned. One may also create an adjusted scanning direction based on a measured rotational misalignment. These adjustments including interpolation take place preferably before demosaicing of the raw image data. In one embodiment of the present invention areas and parameters in image data are defined to perform for instance smoothing and blurring and pixel equalization to create a smooth transition between two active pixel areas. In a further embodiment of the present invention the image data is stored and/or displayed as a panoramic image, or the processed or raw but aligned data is stored in such a manner that a panoramic image is formed by merging two images each created from active sensor areas. (keeping in mind that one may also use three or more lens/sensor units.

Figure 4:
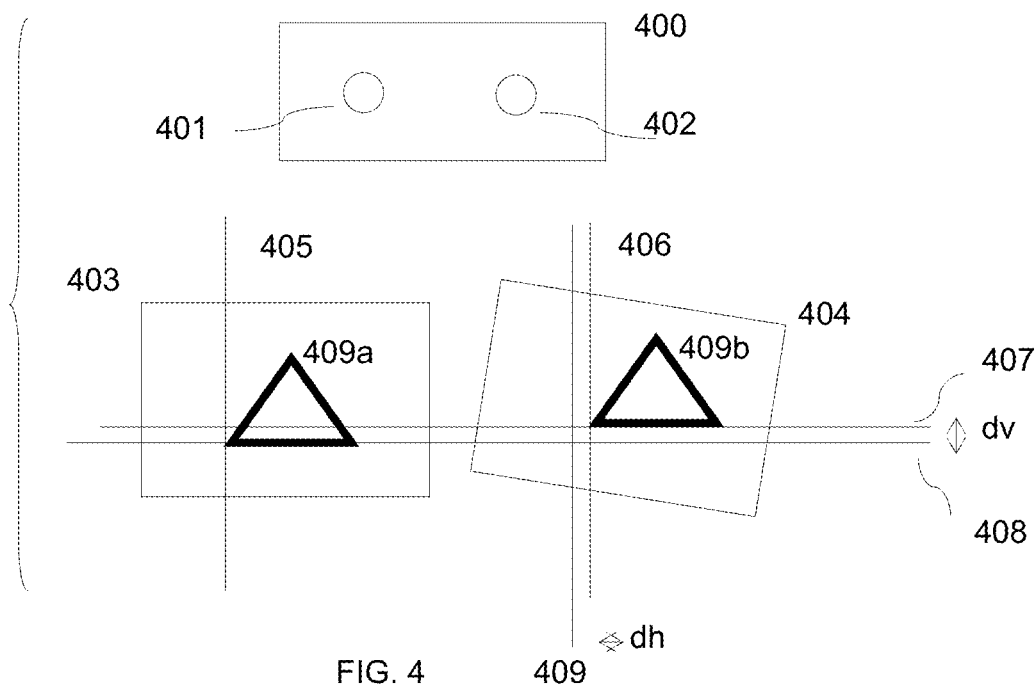
FIGS. 4, 5 and 6 illustrate a stereoscopic image created in accordance with yet another aspect of the present invention.
Figure 5:
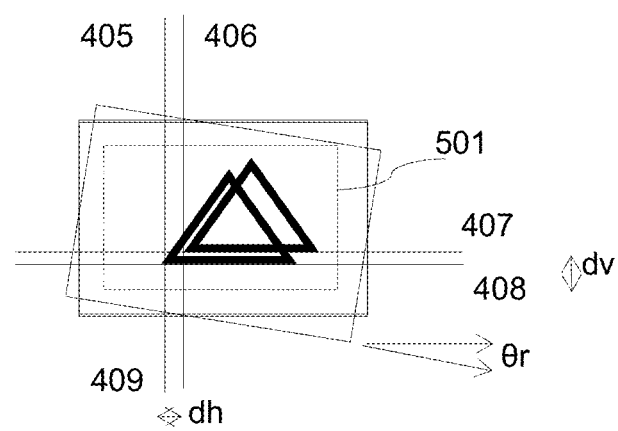

A similar but modified approach can be applied for creating stereoscopic images. This is illustrated in FIGS. 4 and 5. The issue here is also alignment of images. But rather than creating a wide image the issue in 3D images is to create two images with a predetermined amount of parallax, so that when displayed appropriately an impression is created of a 3D image. FIG. 4 shows a stereoscopic camera 400 with two lens/sensor units 410 and 402. In one embodiment of the present invention, camera 400 has at least one lens focus sensor. In a further embodiment of the present invention camera 400 has an autofocus mechanism that focuses both lenses 401 and 402. The distance between the lenses should be sufficient to create the appropriate stereoscopic image. One may also create a 'faux' stereoscopic image by combining two images that were taken with two lenses having a non standard parallax distance. The image sensors are shown as 403 and 404 and are in mirror image of the front view of the camera 400.

Lens/sensor unit 404 is shown to have a translation and rotation relative to 403. The rotational misalignment is an angle θr and the vertical (translational) misalignment is dv. The vertical misalignment may be measured from an object 409 which is recorded as 409a by 403 and 409b by 404. In one embodiment of the present invention vertical alignment or merge lines 405 and 406 are defined in image sensors 403 and 404. For a stereoscopic image the objects need to be positioned on a display screen with a parallax displacement that is proportional to the distance of the object to the camera. It is assumed that the horizontal displacement of the images for the instant distance is dh which is defined by for instance the distance between the line 406 defined by a feature of the object and the parallax line 409. The images also have a vertical displacement dv defined by lines 407 and 408. In general one would like the vertical displacement to be close to 0.

FIG. 5 shows the aligned images to be appropriately displayed to create a 3D image. This may be done by a lenticular lenses display screen, by using parallax barriers, by using anaglyphs, by using alternately viewing left and right images by for instance using switching glasses or by any other appropriate 3D viewing system.

Figure 6:
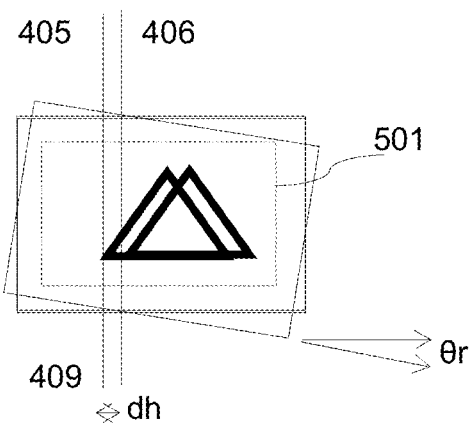

The rotational alignment is addressed as in the panoramic case. It is known that for most comfortable viewing by a viewer the rotational misalignment should be minimized. The horizontal and vertical alignment can be addresses by reading the appropriate pixel lines at the appropriate starting point. As in the case of the panoramic imaging one should calibrate the alignment for different conditions, for instance for different distances, zoom factors, light conditions and the like. FIG. 6 shows the combined images to generate a 3D image with appropriate horizontal parallax and no vertical displacement.

The camera, in one embodiment of the present invention, is calibrated for different conditions such as distance or focus setting, and a condition such as focus setting is associated with all required settings to create an appropriate 3D image and store those settings in a memory. When during operation of the camera a particular condition is present, a controller retrieves all associated settings from the memory and applies all the settings in processing image data to generate the 3D image.

The following 5 patent applications describe aspects of image alignment and calibration for stereoscopic and 3D images and are incorporated by reference herein in their entirety: U.S. patent application Ser. No. 12/435,624 filed on May 5, 2009, U.S. patent application Ser. No. 12/436,874, filed on May 7, 2009, U.S. patent application Ser. No. 12/538, 401 filed on Aug. 10, 2009, U.S. patent application Ser. No. 12/634,058 filed on Dec. 9, 2009 and U.S. Provisional Patent Application 61/291,861 filed on Jan. 1, 2010.

Figure 7:
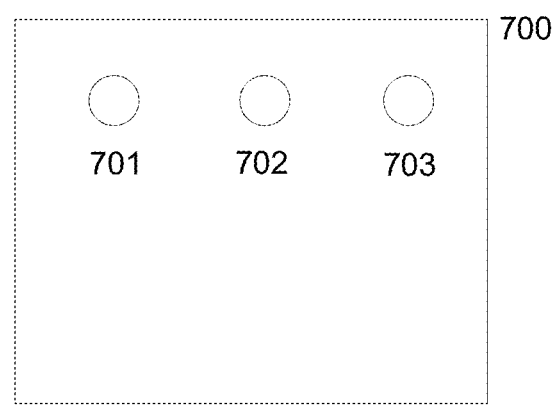
FIG. 7 is a diagram of a camera in frontal view in accordance with another aspect of the present invention.

In accordance with an aspect of the present invention a camera is provided with three lens/sensor units for creating panoramic pictures. This is illustrated in FIG. 7 with lens/sensor units 701, 702 and 703 in camera 700. In one embodiment of the present invention an autofocus mechanism, including a focus sensor is included. In one embodiment of the present invention the lenses are single focus lenses.

Figure 8:
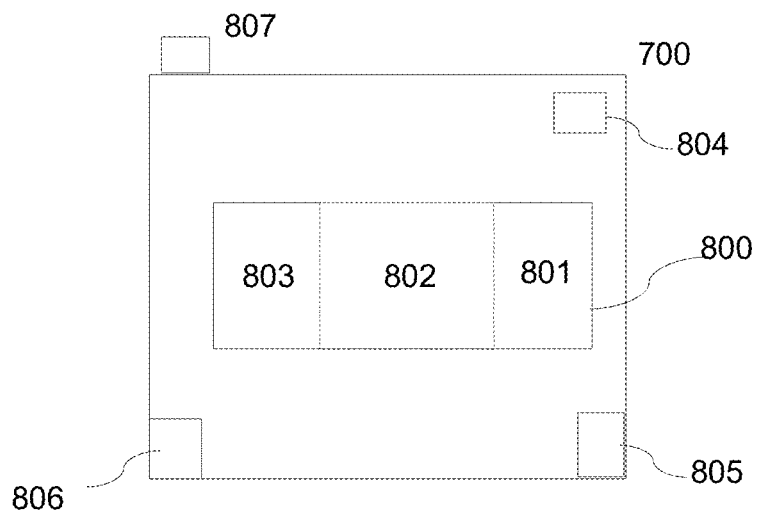
FIG. 8 is a diagram of a camera in rear view in accordance with a further aspect of the present invention.

Each of the images generated by these lens/sensor units can be combined to create a panoramic image. The camera may also have more than 3 lens/sensor units. The units 701, 702 and 703 are arranged in a row. One may apply a greater number of lens/sensor units and arrange these in different ways, such as multiple columns or multiple rows. FIG. 8 shows the back side of the camera 700 with a display screen 800 which in one embodiment of the present invention is divided in at least three segments 801, 802 and 803. One can select with a button 804 a first display mode which shows on one segment the complete image of one lens/sensor unit. For instance in the first mode segment 802 shows the image generated by lens/sensor unit 702. One may also display the image of other lens/sensor units in a display segment by selecting a display mode, for instance with button 804.

The camera 700 contains at least a processor to process image data and to control the settings of the camera and the display screen, wherein the button 804 for instance can be used to select a display mode. Such a button may take the camera through consecutive modes by pushing it briefly and a mode is selected by holding the button for a longer period of time. The camera also contains memory to store pre-set camera and display settings, which have been entered for instance during a calibration. The camera also contains a memory to store image data. The camera also contains a processor to process the sensor data according to preset settings and the memory can hold the processed image data, which can represent a still image or video images and can be a single lens/sensor unit based image or an image constructed from at least two lens/sensor units. Details of an internal processing and communication architecture of a digital camera is disclosed in for instance U.S. Pat. No. 7,676,150 to Nakashima issued on Mar. 9, 2010 and U.S. Pat. No. 7,667,765 to Turley et al. issued on Feb. 23, 2010 which are both incorporated herein by reference.

In a further embodiment of the present invention a control button enables a menu that is displayed on at least a segment of the display, allowing a user to select a mode of display and of taking an image. An image is recorded in a certain mode when the recording is activated by a button, for instance button 807. In one embodiment of the present invention all images recorded by the sensors are stored and the selected mode determines how the recorded image is displayed. For instance, in one mode only the image taken by the center lens/sensor unit is displayed. In another mode the created panoramic image is displayed.

In one mode an image is displayed on the display screen that is not being generated by one of the lens/sensor units but is for instance an archival image that is stored on the camera or that has been made available and transmitted to the display by another device. In one embodiment of the present invention the image is being displayed on the display screen that serves as a background to compare with an image from one or more lens/sensor units of the camera. For this purpose the image may be displayed in a low intensity. It may be enhanced with edges of objects in the image by an edge detector such as a Canny edge detector as is known in the art. The images viewed on the display screen that are provided by one or more of the lens/sensor units may be displayed in a transparent mode that overlays the archival or externally provided image.

This embodiment of the present invention allows one to retake an image of a scene as close as possible to the original setting. The original picture may have been in black and white, or a picture with or without persons or objects. An image may also have been taken under different weather conditions, during a different season, time of day, or any other conditions that have been changed. One may want to retake an image or video that is as close as possible to the original setting or frame. For instance, a picture of a scene was taken with a single lens/sensor camera, and one wants to retake the picture as a video or as a panoramic or a 3D image. The overlay mode provided herein as one aspect of the present invention allows to retaking that image as closely as possible to the original image.

In a further embodiment of the present invention one may also extract edges from the current image generated by a lens/sensor unit. Image registration by comparing edges and transformation of images is known. One may apply an image registration as is known to one of ordinary skill to match lens/sensor setting in such a way that the image generated by a lens/sensor optimizes a registration to the background image. Some aspects of using an archival image on a camera to improve an image are known and are described in U.S. Pat. No. 7,616,248 to Parulski et al. issued on Nov. 10, 2009 which is incorporated herein by reference. The archival images in Parilski are displayed and applied differently and not to retake an image that was taken at a completely different time. Parulski also does not provide an image that is provided by another camera. Parulski also does not disclose image matching and does not disclose using the archival image as a template for retaking the image as a video or as a panoramic or a 3D image.

The camera 700 also has an external port to dock to another device. Such a port may be a USB port, which allows the camera to be connected for instance to a computing device such as a computer for exchanging images. The port may also be used to connect the camera to a display having a large display screen to display the images taken by one or more lens/sensor units. The port may also be a wireless port.

In many cases a user may have a computing device such as a mobile phone that has a camera. Such camera may not be enabled to take images in a panoramic or a 3D mode. The camera 700 in a further embodiment of the present invention as illustrated in FIG. 8 has a communication port 806 that communicates directly with a mobile computing device such as a mobile phone. Such a port can be enabled to work in a wired mode. It may also be configured to work in a wireless mode. For instance, the camera may have a port 806 that is a Bluetooth port that can exchange data with a mobile phone. The mobile phone can provide camera 700 with an image that serves as an archival image. The camera 700 in one embodiment of the present invention provides the mobile phone with image data, for instance of a panoramic image. The cell phone may have a different resolution display screen than the camera 700. In a further embodiment of the present invention images are stored in a high resolution and are downsampled on a device to be displayed in an appropriate resolution on a display screen.

The above provided capability of importing and/or comparing a generated image with an archival image enables a further aspect of the present invention. In accordance with a further aspect of the present invention one may import an image that is an image of an object that is segmented from its background. In a further aspect of the present invention the camera has processing capabilities to segment an object from its background. Such image segmentation algorithms are well known and are for instance described in an online lecture notes "Segmentation" by Professor Allan D. Jepson downloaded from <http://www.cs.toronto.edu/~jepson/csc2503/segmentation.pdf> which is dated as Fall 2009 and which is incorporated herein by reference.

Figure 10:
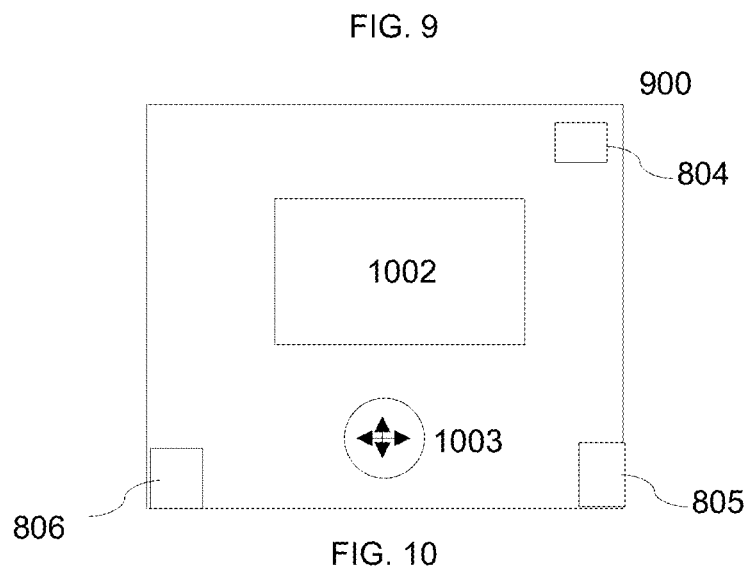
FIG. 10 is a diagram of a camera in rear view in accordance with yet a further aspect of the present invention.

Combined with the above disclosed method and device of overlaying an image, in one embodiment of the present invention the segmented image is inserted into an actual image being taken by a lens/sensor unit in the camera. One may modify the size of the inserted image by opening a menu on the camera to be shown on the display screen 1002 as shown in FIG. 10. An input device 1003 with different button modes can be used to activate a menu and select a menu option. Device 1003 may also act as a mouse to move a cursor over the display screen, to draw and select areas of interest which may contain an object and activate a menu option, which may be an object segmentation. One can thus select to be segmented object for instance by drawing a box around the object, which may be a person. One can also activate a segmentation program to segment the object from its background. The result, being an image of a segmented object, can then be selected by either drawing again a box around it or by clicking on 1003 after selecting it with a cursor. One can select a menu option to resize the selected segmented object. One can also move the selected segmented object on the display screen by moving a cursor with multi-directional control button 1003. The segmented object may be displayed as a transparent image over the actually imaged scene by a lens/sensor unit. When satisfied with the size and position a user may confirm a position of the object on the display screen by button 1003 and change the image from transparent to opaque. One has thus placed a segmented object in the current image that can be recorded with the camera.

In a further embodiment of the present invention, even when the object was not originally recorded in 3D, the inserted image is synthesized into a 3D image from a 2D image. Methods and apparatus there to are known and are for instance disclosed in U.S. Pat. No. 6,445,833 to Murata et al. issued on Sep. 3, 2002 which in incorporated herein by reference. Preferably, a 2D image is synthesized into a 3D image with a parallax that reflects a desired distance from a point of view on the display screen.

In accordance with a further aspect of the present invention one may import a plurality of objects from different sources. For instance, the camera may be connected to a network, and receive a plurality of images from different sources via the network. In a further embodiment of the present invention, each image has an identifier that allows the camera to determine its relative size and earlier positions a particular segmented image had on the display screen. This allows the camera to position the image on a location and at a size that it had in a previous image. In a further embodiment of the present invention a display with a display screen is separate from the camera. For instance the camera may be connected via a communication port to a computing device having its own display screen, such as a PDA or a cell phone. This allows a user to position the camera out of reach, focused on the user. In a further embodiment of the present invention control of the camera is provided to the computing device such as cell phone. In yet a further embodiment of the present invention the computing device can open at least one menu on the display screen of the computing device that enables control of the separate camera. This allows a user to be part of an image taken by the camera while retaining control of the camera. In one embodiment of the present invention the display and camera are physically separate and are connected through a wired connection. In a further embodiment of the present invention the display and camera are physically separate and are connected through a wireless connection.

Imported images may be recorded in stereoscopic format. In a further embodiment of the present invention one may either receive the constituting separate 2D components of each image, or one may separate the stereoscopic image into the constituting 2D components and reassemble the components with a parallax representing a desired distance from a point of view on the device. In a further embodiment of the present invention an imported 3D image is reduced to a 2D image and the 2D image is synthesized into a 3D image having a parallax that reflects a desired distance from the object to the point of view.

In another embodiment of the present invention a plurality of users have a camera with remote control and display screen as provided above. Each camera is trained and focused on the user and generates a segmented image that is shared with at least one other camera.

Figure 9:
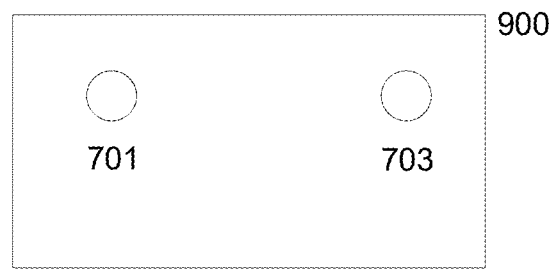
FIG. 9 is a diagram of a camera in frontal view in accordance with yet another aspect of the present invention.

In a further embodiment of the present invention a camera 900 is provided for creating a 3D image from at two lens/ sensor units 701 and 703 as shown in FIG. 9. While the camera may look the same as a 2 lens/sensor units panoramic camera, there are differences. In both the panoramic and 3D cameras the sensors have to be aligned appropriately. However, in the 3D case the lenses (or lens optical axis) should be substantially or almost parallel. In the panoramic case the lens optical axes should be positioned at a slight angle to create a broader field of vision.

The embodiment of the present inventions as provided above with regard to remote control and image insertion are contemplated to be applied to the panoramic and the 3D embodiment of a camera.

Recently Sharp Corporation of Japan in a press release dated Apr. 2, 2010, which is incorporated herein by reference, announced" "Sharp Corporation has developed a 3D touchscreen LCD featuring the industry's highest brightness that can switch between 2D and 3D modes. Users can view 3D images without the need to wear special glasses, making this LCD ideal for mobile devices such as digital cameras, mobile phones, and smartphones. The newly developed 3D LCD uses a parallax barrier system to display 3D images. This parallax barrier, which has a series of vertical slits, is incorporated into an ordinary LCD to control the path of light reaching the right and left eyes, thus creating a sense of depth. However, the conventional 3D LCD with this system had difficulty in displaying high-quality images in 3D mode."

It may be that cellphone manufacturers are not able or willing to modify a device they market to accommodate 3D and/or panoramic imaging. In such and in other cases it may be advantageous for a user of such a device to purchase a connectable or even dockable device that can take and/or display panoramic and/or 3D images. For instance, one may take with a camera a panoramic image and send it to the device that is connected with the camera. One may also take a 3D image with the camera and display it on the camera, and send the single lens image for display to a connected computing device or the 3D image for storage and/or further transfer and/or non-3D display to the connected device.

Figure 11:
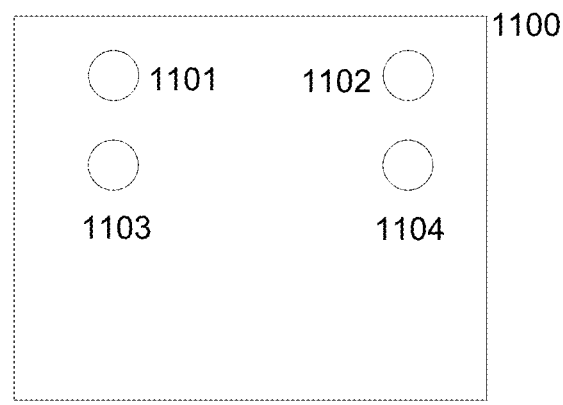
FIGS. 11-13 are diagrams of a camera in frontal view in accordance with one or more aspects of the present invention.

A camera, in accordance with an aspect of the present invention, is a 3D camera having at least 2 lens/sensor units. A camera, in accordance with another aspect of the present invention, is a panoramic camera having at least 2 lens/sensor units. A camera, in accordance with an aspect of the present invention, is a combined 3D and panoramic camera having at least 4 lens/sensor units. One embodiment of the present invention 1100 of such a combined 3D/panoramic camera is shown in diagram in FIG. 11. A combination of two lens/ sensor units 1101 and 1102 may be dedicated to 3D images and the optical axes of the lenses are parallel or almost parallel. This allows one lens/sensor unit of 1101 and 1102 to be dedicated to generate a single reference image. The distance between the lenses of 1101 and 1102 is in one embodiment of the present invention preferably a human parallax distance. At least two additional lens/sensor units 1103 and 1104 in 1100 may be dedicated to taking panoramic images. To create a wide field of view the optical axes of the lenses are positioned at an angle. One may select the distance of the two lenses of 1103 and 1104 to be similar to 1101 and 1102 for aesthetical reasons. The distance may also be different.

Figure 12:
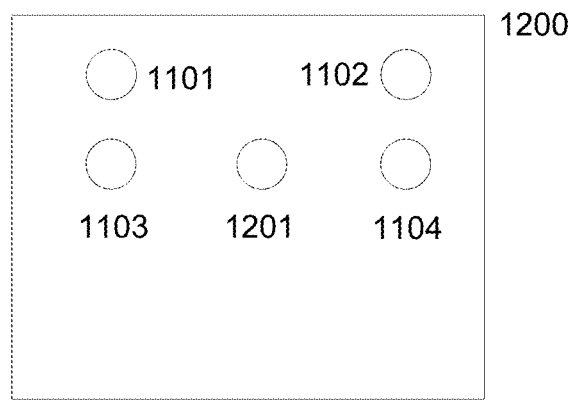

In another embodiment of the present invention an additional lens/sensor unit 1201 is placed between 1103 and 1104 as is shown in a diagram of a camera 1200 in FIG. 12. This allows for a higher quality panoramic image. It also allows for using an image generated by 1201 to generate a neutral or reference image.

Figure 13:
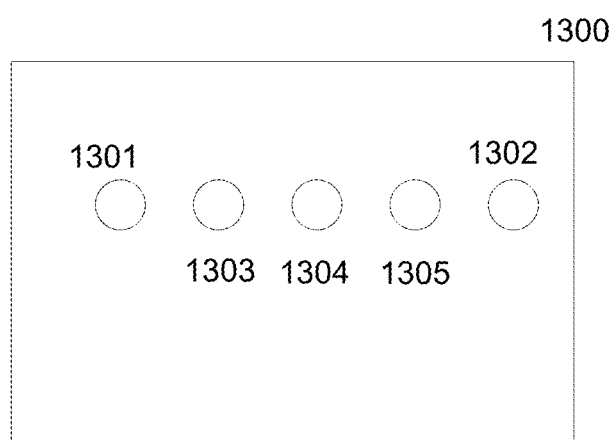

In yet another embodiment of the present invention as is shown in diagram in FIG. 13 of a camera 1330 all lenses for 3D and panoramic image generation are placed on a single line. The lens/sensor units 1301 and 1302 are for instance for generating 3D images, while 1303, 1304 and 1305 are used for generating a panoramic image.

Other configurations of lens/sensor units are possible and are fully contemplated. One may have multiple rows of lens/sensor units. One may arrange lens/sensor units in other patterns with overlap between images. In yet another embodiment of the present invention a camera may have at least two sets of two lens/sensor units wherein each set has lenses on parallax distance with parallel optical exes, and wherein the optical axes of the first set and the at least second set has an angle to create at least two panoramic images which are combined into a panoramic 3D image.

Figure 14:
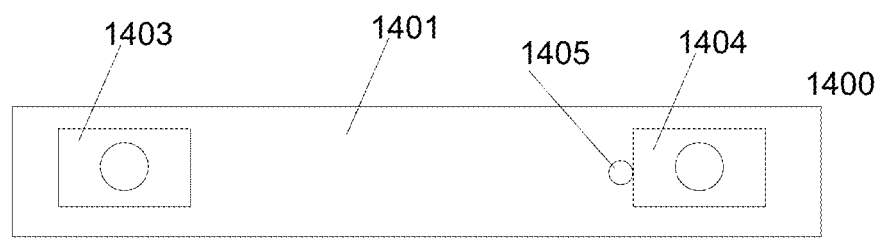
FIG. 14 is a diagram of a carrier of lens/sensor units for a camera for stereoscopic and or 3D images in accordance with an aspect of the present invention.

FIG. 14 illustrates another aspect of the present invention. It shows a lens/sensor carrier 1400 with lens/sensor units aligned attached. It was explained above that sensors have to be rotationally aligned to create appropriate panoramic images and to diminish negative effects on 3D images. One way to assure alignment is to attach at least two lens/sensor units 1403 and 1404 to a rigid carrier material 1401. The lens/sensors units can be aligned during manufacturing and/or assembly of 1400 and should be fixed in their aligned position. Material 1401 should be rigid with negligible bending and distortion over the life-time of the camera. This requires that the carrier will also not be bent or distorted after being assembled into a camera. Alternatively, one may fix at least one lens/sensor unit in an aligned position after the carrier is fixed into the camera. As another alternative, a motor 1405 that can rotate the lens/sensor unit can be included on the carrier 1400. This allows for motor driven alignment of the lens/sensor unit. The motor can be a stepping motor with a mechanism that significantly reduces the rotation angle of the lens/sensor unit per step. Per motor step the rotation of the lens/sensor unit is well below 1 degree in one embodiment of the present invention, and smaller than 1 minute in yet another embodiment of the present invention. A motor may be an actuator such as a piezo-electric actuator. Piezo-electric actuators are available that has a minimum displacement that is below 1 micron, thus allowing rotational displacement of a sensor that is in the single pixel range.

Figure 15:
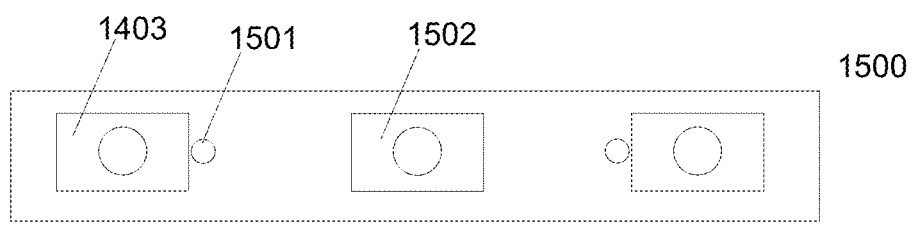
FIG. 15 is a diagram of a carrier of lens/sensor units for a camera for stereoscopic and or 3D images in accordance with another aspect of the present invention.

FIG. 15 shows a further embodiment of the present invention of a lens/sensor assembly 1500 with 3 lens/sensor units. Herein an additional lens/sensor unit 1502 is provided. Also lens/sensor unit 1403 is provided with a motor or actuator 1501 to allow mechanical alignment of the sensors.

Figure 16:
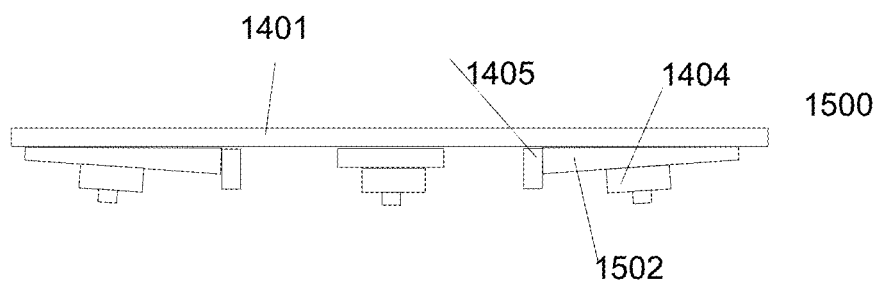
FIG. 16 is a diagram of a carrier of lens/sensor units for a camera for stereoscopic and or 3D images in accordance with yet another aspect of the present invention.

FIGS. 14 and 15 illustrate the carriers 1400 and 1500 in front view. FIG. 16 shows in diagram the carrier 1500 in side view. FIG. 16 shows that the optical axis of 1404 is rotated by a slanted support wedge 1502. The rotation angle effected by the support in one embodiment of the present invention is less than 10 degrees. The rotation angle effected by the support in another embodiment of the present invention is more than 10 degrees but less than 30 degrees. The rotation angle effected by the support in another embodiment of the present invention is more than 30 degrees In yet a further embodiment of the present invention, lens/sensor units may be placed on a carrier and bonded to the carrier in a high precision environment. For instance, at least two sensor units may be accurately placed on the carrier and at least rotationally aligned relative to each other. One can align the sensors in a calibration environment by providing an alignment image and using a mechanical or robotic high precision placement mechanism. After fixing the sensors in at least rotational alignment one may place a lens mechanism over a sensor. In that sense a carrier becomes an integrated panoramic and/or 3D imaging unit that is robust and can be placed in a housing of a camera. Electronic components and communication connection may also be placed on the carrier. In an additional step one may also provide translational alignment of the sensors or the lens/sensor units.

In a further embodiment of the present invention a carrier with at least the lens/sensor controllers and supporting electronics and connectors may be in a shape and completeness that allows a camera manufacturer to obtain a complete either panoramic, 3D or 3D/panoramic unit that can be assembled with housing, buttons and knobs, and a display screen into either a complete panoramic, 3D or 3D/panoramic camera.

In a further embodiment of the present invention the carrier may include an external communication link or may be attached to a communication link or device in the housing that allows communication such as the exchange of data, which may be image data or control/instruction data with the outside world, such as a computing device.

Preferably, the calibration steps that were already disclosed as an aspect of the present invention are performed during or right after an initial power up of the electronics on the carrier with the lens/sensor units attached and the settings stored in for instance a memory, such as a ROM memory. If one achieves a reliable level of accuracy and repeatability of creating the carrier with lens/sensor units attached one may skip the actual calibration step for the mass produced carriers, and replace this by downloading the calibration settings from an external memory or implement them in an electronic device on the carrier. The calibration steps are determined from a mother or standard carrier, which may be used to test the performance of mass produced carriers against.

In summary, a camera is provided that is a panoramic camera, a 3D camera or a 3D/panoramic camera. The camera may be a stand alone camera. It may also be part of a computing device or a mobile phone. The camera has a communication interface to communicate with a network or with a computing device to exchange data, including image data. A connection between the camera and computing device such as a mobile phone may be established via a wired connection, including a USB port or a wireless connection such as a Bluetooth® connection.

In a further embodiment of the present invention the camera may also have a connection directly with a display screen wherein a display screen is enabled to display image data but is not enabled to run general purpose computer programs. Devices to display stored documents are known, for instance as eReaders from for instance Sony® and Amazon's® Kindle®. Apple's® iPAD® has its own display screen, but has additional computing capabilities and is in fact its own computing device. Computing devices with a display screen are another embodiment of the present invention with which the camera as provided as one or more aspect of the present invention can communicate with to display image data in real-time or substantially in real-time. Some minimal transmission delay and buffering delay may create a somewhat delayed real-time experience. It is pointed out that real-time or substantially real-time display of an image, graphics, text, or an interface generated by a computing device herein is different from a computing device completing an image, text, document or otherwise completed file, transmitting it to a display and the display processing the file to a display screen.

Figure 17:
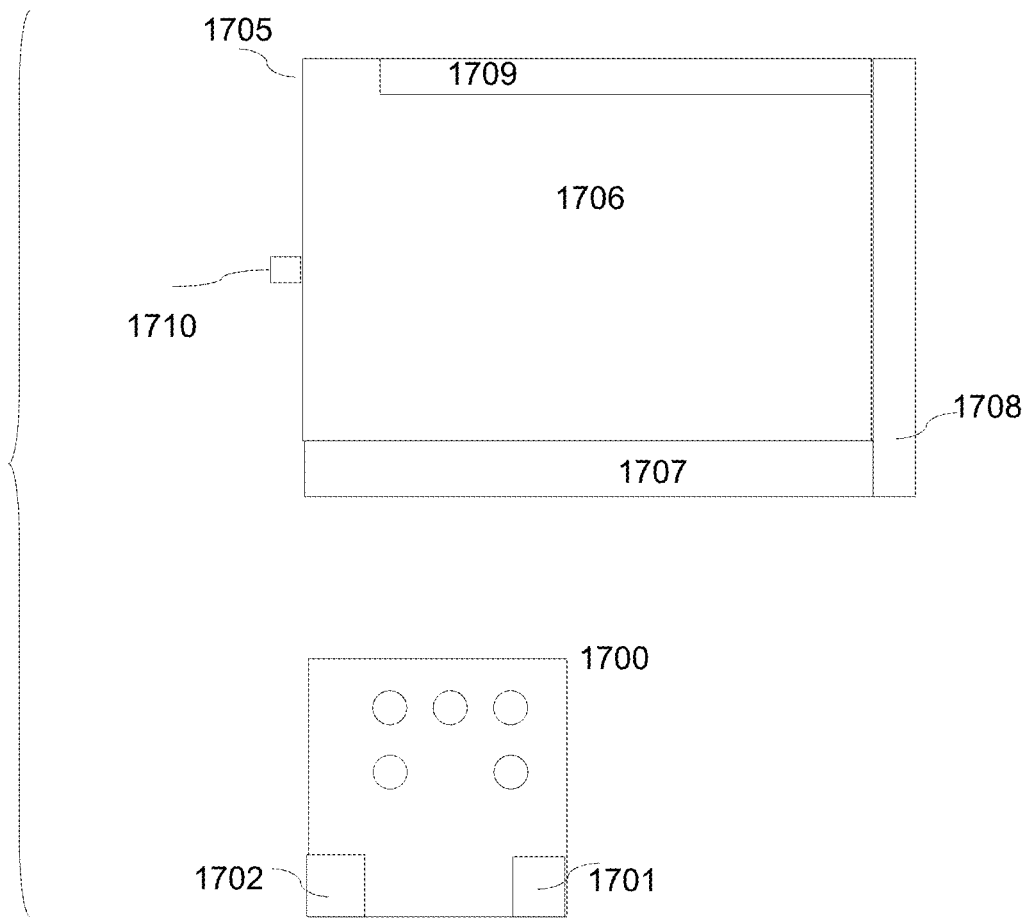
FIG. 17 is a diagram of a system having a camera and a display in accordance with an embodiment of the present invention.

FIG. 17 illustrates a display embodiment of the present invention. The camera 1700 which may be a panoramic/3D camera in accordance with an aspect of the present invention has a communication port/interface 1701 to communicate with a communication port 1708 of a display 1705. The display 1705 has a display screen 1706 which may be enabled to display 3D images. The display has display screen controls 1707 to allow a user to provide instructions related to an image. The controls may be used to adjust contrast, intensity, size of images, instructions to move forward, back ward in a series of images, zoom, capture, store recall images and the like. In one embodiment of the present invention, the display 1705 also has a processor and memory/storage to allow processing of an image and storage and retrieving of images. In one embodiment of the present invention storage capabilities are temporary and limited to a session, for instance lasting for a period of time that the camera 1700 is connected to the display 1705. In one embodiment of the present invention processing capabilities of the display 1705 are limited to image processing and do not provide general computing capabilities.

Figure 18:
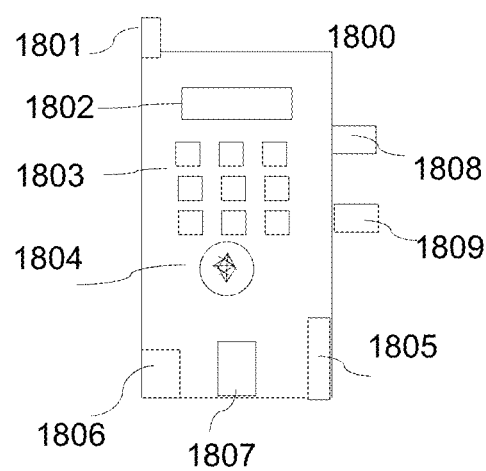
FIG. 18 is a computing device in accordance with an aspect of the present invention.

In yet a further embodiment of the present invention, the display is connected to a mobile computing device 1800 as illustrated in FIG. 18. The mobile computing device 1800 may include a cellphone with a dial pad 1803 a display screen 1802 a pointing device 1804 cellphone capabilities and an antenna 1801 to connect to a communication network. It also has a communication interface 1805 which allows communication with display communication interface 1708. Device 1800 also may have a communication interface to communicate with camera interface 1702. Communication between devices may be wired or wireless communication links.

The device 1800 has a powerful processor 1806 enabled to run an operating system such as Microsoft Windows® or Linux or any other operating system and applications such commonly used on a computer such as a wordprocessor, presentation software, communications, e-mail, browsers, spreadsheets, games, scientific software and the like or any other computer program that can run on a computing device. The device 1800 also has mass storage capabilities 1807 to store programs and data and the like. In a further embodiment of the present invention the device 1800 has a projector 1808 which is enabled to project on a screen or a wall an image. It may also have a projector 1809 which is enabled to create a virtual keyboard or input device, such as disclosed by U.S. Pat. No. 7,340,077 to Gokturk issued on Mar. 4, 2008 which is incorporated herein by reference.

The size of device 1800 is very small, and can be carried in a jacket or trouser pocket or a purse and is significantly smaller than present day laptop computers such as manufactured for instance by Hewlett Packard® or Apple®. Such a complete computer can be so small because they do not have bulky input and output devices or storage media such as large magnetic disks.

In a further embodiment of the present invention the device 1800 has included the camera 1700.

The problem of lacking input/output devices can be solved with locally positioned display devices 1705, which may be eReader devices as disclosed above. The devices may have a keyboard or a virtual keyboard for instance created with screen 1706 being a touch screen or a projector 1710 which may project a virtual keyboard.

In common situations where people are known to use a computer, such on an airplane, in one embodiment of the present invention a display is part of an airplane seat. A keyboard may also be part of a seat. The display and keyboard have communication ports to connect to a computer 1800 of a passenger.

In yet a further embodiment of the present invention a camera is part of an eReader. This is shown in diagram in FIG. 19. The term eReader, herein is used as a term for a thin, large, lightweight display that acts as a true display, enabled to provide still and video images in full color in real-time, but which is much thinner than a tablet such as the Apple iPAD®. An eReader in its known form displays a content of a file. The term eReader as an aspect of the present invention includes the capability to show screens and images in real-time.

It is believed by the inventor that computing is still not fully mobile. A computer requires a processor, storage, input device and a display. Current devices are compromises along the different properties of a computing device. If they are small, they have usually small displays. With larger displays, computers become bulky and look like the current tablets or laptop computers. By putting all processing, storage and communication capabilities in a very small footprint device and providing a large, thin and lightweight display that is separate but connected, wired or wirelessly, to the computing device, a very portable, mobile and fully usable (with no screen limitations) portable and mobile computer has been provided. The unexpected aspect is that the usability of the device is improved by separating screen/display from the actual processor containing device, which is nowadays common practice in laptops, PDA, mobile phones, smart phones, known eReaders, tablets and the like.

Figure 19:
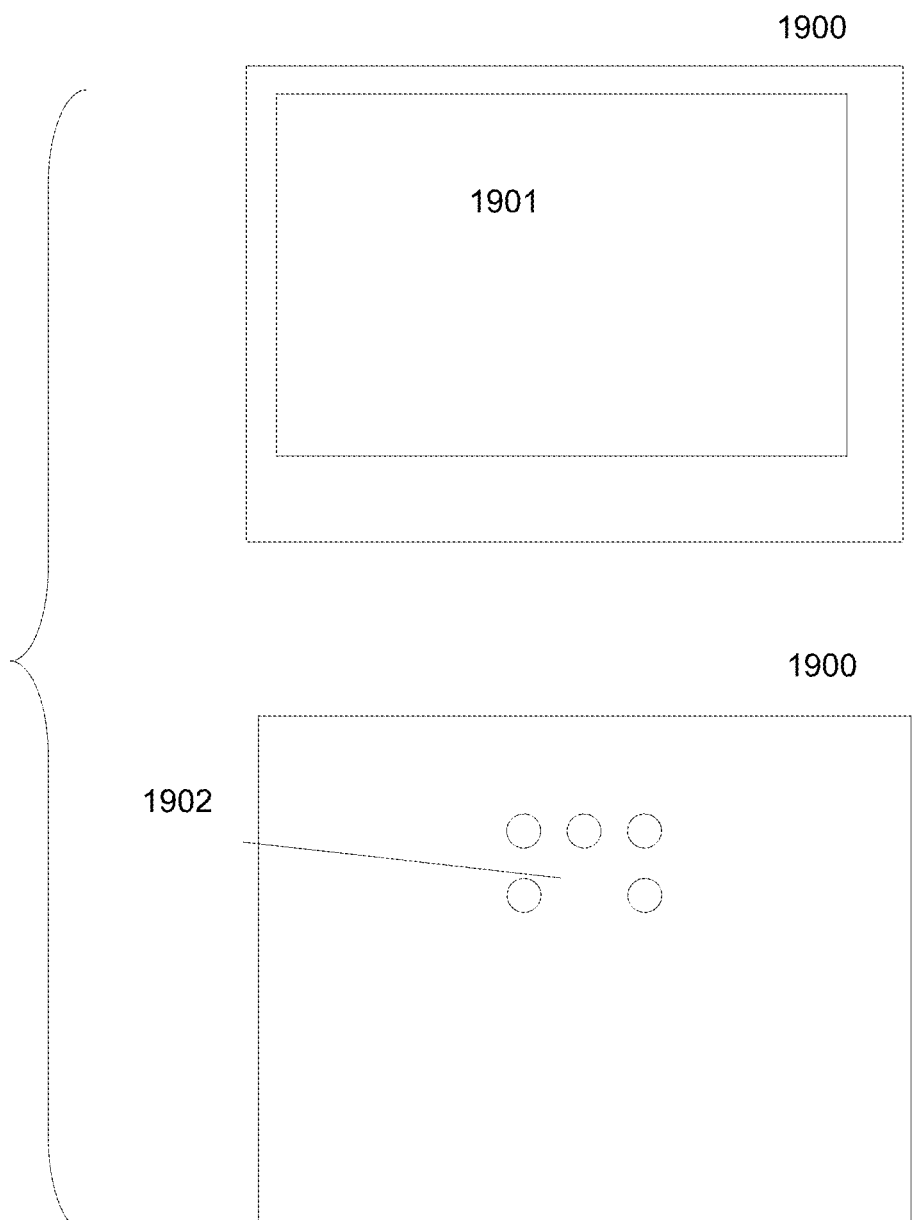
FIGS. 19-21 are diagrams of a camera with a thin large sized display screen in accordance with one or more aspects of the present invention.
Figure 20:
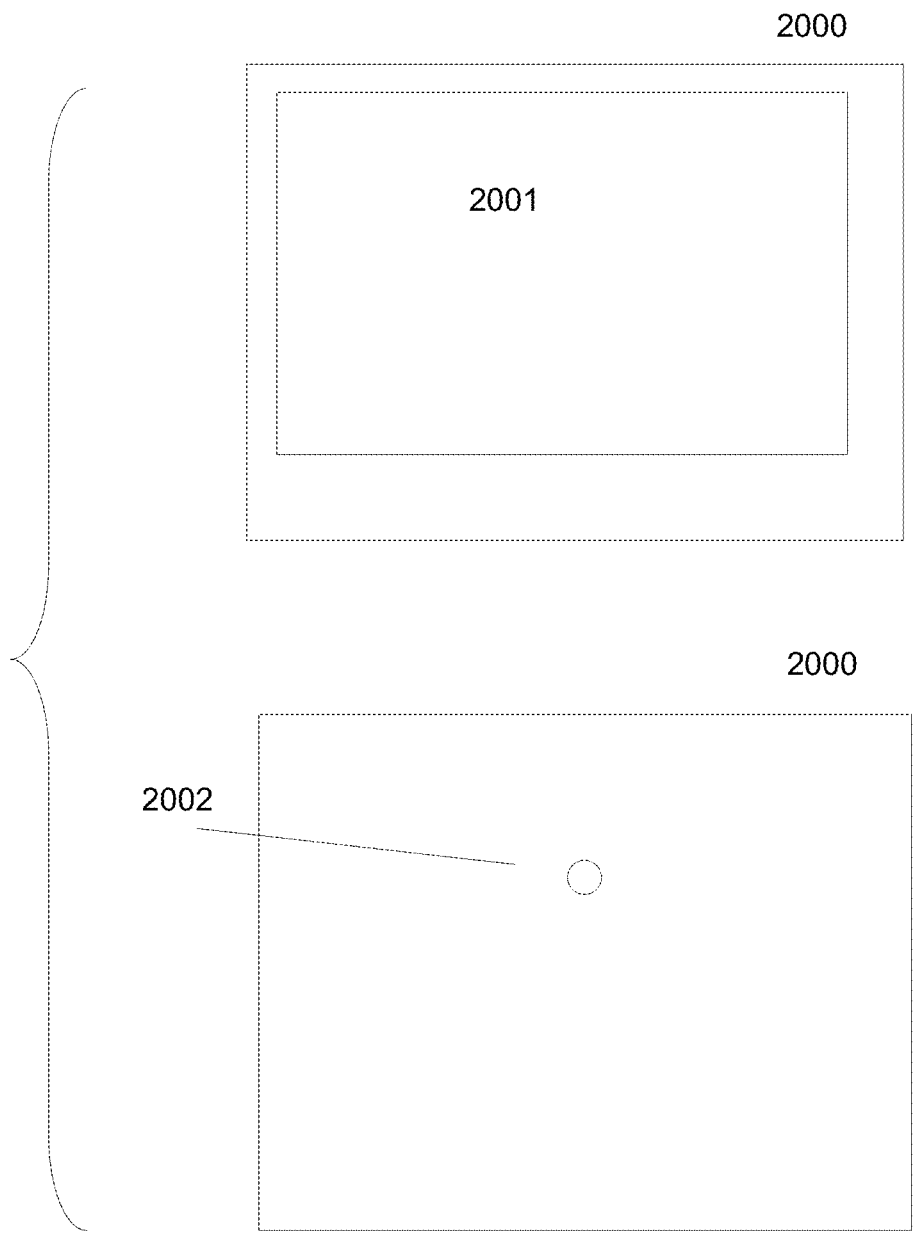

The novel eReader 1900 has a screen 1901. Such a screen is larger in surface than a standard camera display screen. A lens 1902, which may be a plurality of lenses as discussed above, each lens associated with an optical sensor is/are captured or manufactured into a housing of the eReader or other portable device 1900 that has a screen. Though many eReaders currently have a black/white screen which is known as ePaper or eInk, manufacturers at the time of this invention have indicated to move into the area of color display screens. There are different technologies that can be applied in high quality large color display screens. One embodiment is by the technology of Organic Light Emitting Diode or OLED display screens. Another is a color electrophoretic display screen such as disclosed in U.S. Pat. No. 7,167,155 to Albert et al. issued on Jan. 23, 2007 which is incorporated herein by reference. A further possibility is to use a 3D screen as manufactured by Sharp Corporation as was discussed above. In one embodiment of the present invention one thus creates an eReader with a multi-lens camera as shown in FIG. 19. In a further embodiment of the present invention a single lens camera as is shown in FIG. 20 is part of an eReader. Its shows an eReader housing 2000 with a screen 2001. Incorporated in the housing is a single lens/sensor unit 2002. In an embodiment of the present invention of FIG. 19 an eReader is provided that is also a 3D camera or a panoramic camera or a 3D/panoramic camera. These cameras are contemplated to have one or more aspects of the cameras as already described herein.

The large screen size allows an un-paralleled direct view of a recorded image. Even at relatively low resolution this is an attractive option. The current Apple iPAD® has a color screen with a resolution of 1024-by-768-pixel resolution at 132 pixels per inch. A novel eReader with a camera and a screen of such a resolution as provided as an aspect of the present invention will provide a completely new experience and enjoyment of taking pictures and video images with instant and real-time review capabilities.

A novel eReader is provided as an aspect of the present invention to include additional functionality as described previously taking pictures or videos.

In another embodiment of the present invention, devices 1900 and 2000 are any portable computing device with a display screen, with a lens or plurality of lenses associated with an image sensor or a plurality of image sensors 1902 captured or manufactured into a housing of the device 1900. FIG. 19 shows how lenses 1902 are provided at the opposite side of the housing related to the screen or display. One may provide a housing with lenses that is hinged to a housing of the display, so one can swivel the lenses in relation to the display.

In another embodiment of the present invention, the devices as shown in FIGS. 19 and 20 are only a camera with a very large display screen and memory to store data and processing capabilities to display images from an image sensor or from memory on the display and a control to control the camera and the screen. In one embodiment no other functionality is required and the devices are just digital cameras with a very large viewing screen. In a further embodiment other capabilities are added. In a further embodiment these cameras with very large screens have a communication port to off-load data such as image data, for instance to a computing device. In a further embodiment these device are also enabled to receive data through a communication port. In yet a further embodiment, these large display screen cameras have additional processor and programming capabilities. Research into display housing and camera housing at the time of the present invention has not turned up existing, completed or ongoing research to create such a camera, which is believed to be novel and non-obvious. It appears that no one has currently or previously articulated what the properties of a large screen, thin and highly portable camera should be. No consideration has previously been given what some properties of such a camera should be and what inventive steps are required to achieve such a desirable camera or as will be provided later a large screen ultra-thin and ultra-light and connectable display device.

The realization of this type of camera and display device is enabled by providing thin, sturdy, light weight housing, small and highly integrated powerful processing, memory and communication capabilities, very small lens/sensor units with appropriately sized connectors, light weight display screens and appropriate power sources. This will enable a portable camera or display device that is ultra-light and ultra-thin and thus ultra-portable with a very large display screen offering a novel experience in still image and video recording and viewing. In one embodiment of the present invention, the large display screen camera has only one lens/sensor unit. In another embodiment of the present invention the large display screen camera has at least two lens/sensor units.

The camera with large display screen is characterized by its format and its light weight and being thin. It is portable and easy to carry and to store for instance in a briefcase or portfolio. It has a format that provides a large display screen, that is thin and low weight. For instance the display screen has a diagonal that is larger than 10 cm in one embodiment of the present invention, larger than 15 cm in another embodiment of the present invention, larger than 20 cm in yet another embodiment of the present invention and larger than 30 cm in yet another embodiment of the present invention. The thickness in one embodiment of the present invention is less than 3 cm, less than 2 cm in another embodiment of the present invention, less than 1 cm in yet another embodiment of the present invention and less than 0.5 cm in yet another embodiment of the present invention. The weight in one embodiment of the present invention is less than 20 ounces. The weight in another embodiment of the present invention is less than 15 ounces. In yet another embodiment of the present invention the weight is less than 10 ounces. The weight and thickness will be determined by power supply, housing, and display screen and the way of selecting, modifying and combining these elements into a device.

The construction and assembly and its components of an eReader is for instance disclosed in a Kindle II teardown described in 5 articles on a website which includes <http://techon.nikkeibp.co.jp/english/NEWS_EN/20090421/169102/> dated May 12, 2009; <http://techon.nikkeibp.co.jp/english/NEWS_EN/20090422/169162/> dated May 13, 2009; <http://techon.nikkeibp.co.jp/english/NEWS_EN/20090424/169296/> dated May 14, 2009; <http://techon.nikkeibp.co.jp/english/NEWS_EN/20090427/169398/> dated May 15, 2009 and <http://techon.nikkeibp.co.jp/english/NEWS_EN/20090428/169498/> dated Mar. 18, 2009 which are all incorporated herein by reference.

The lens/sensor unit may be an integrated lens/sensor unit for instance as available from Omnivision of Santa Clara, Calif. of which one example is the CameraCube. Samsung of Korea also manufactures very thin and powerful camera modules. For instance on URL <http://www.engadget.com/2008/03/18/samsung-announces-worlds-thinnest-8-megapixel-cellphone-module/> on Mar. 18, 2008 a small ultrathin camera module was shown that was about 8.5 mm thin and has a 5 Megapixel sensor and a lens. It is about 1.5 by 3 cm in width and length. Such a module can be incorporated in a thin housing of a large display or of a reader. A copy of the article/website is incorporated herein by reference.

Camera controllers are also known and are for instance disclosed in U.S. Pat. No. 6,727,941 to Coleman, issued on Apr. 27, 2004 which is incorporated herein by reference.

A large display screen system with a controller is the iPAD® of which a teardown is provided in <http://www.isuppli.com/News/Pages/User-Interface-Focused-iPad-Changes-the-Game-in-Electronic-Design-iSuppli-Teardown-Reveals.aspx> which is incorporated herein by reference.

In another embodiment of the present invention a large display screen portable device, such as a novel eReader, is enabled to communicate with a camera, such as a camera phone, by wired or wireless communication and is enabled to display an image or video taken by the camera.

A large display screen camera such as provided in FIGS. 19 and 20 in a further embodiment of the present invention are provided with a communication device to communicate with another device or with a network. One example of such an interface is a Bluetooth interface, of which an extensive description is available on <http://www.bluetooth.com/English/Technology/Building/Pages/Specification.aspx>. An example of a network communication interface is the Wi-Fi interface of which a specification is available on <www.wifi.org>.

If eInk or similar displays are used either in black/white or color, one issue may be the refresh rate of the screens. Refresh rates as low as 0.1 sec have been reported. Though refresh rates of 0.5 up to 1 sec are also common. High quality video requires about 50 or 60 frames per second. These can be achieved by high quality display screens. In case low refresh rate display screens are used one may still display 'sampled' video images. For that purpose a display has a controller with a clock that selects images from a sequence of video images that may be stored on a memory in the camera to provide a lower video frame rate to accommodate the display screen. In one embodiment of the present invention a controller selects fewer than one in 10 of the frames from an image sequence to be displayed. Camera phones in general accommodate frame rates of about 15 fps. In another embodiment of the present invention a controller selects fewer than 25 fps but more than or equal to 10 fps from an image sequence to be displayed. In another embodiment of the present invention a controller selects more than 25 fps from an image sequence to be displayed. This means that a camera records high video rates, up to 60 fps or higher and stores these video sequences, for instance to be played on an external display, but selects a lower display screen rate to accommodate a refresh rate of a current display.

In another embodiment of the present invention a camera records images at a lower than 60 fps rate. For instance a display screen of the camera may be the main display screen for displaying images. No higher quality fps display in such an embodiment of the present invention is envisioned, and only a reduced video frame rate is implemented. In one embodiment of the present invention the recording rate is less than 10 fps. In another embodiment of the present invention the video rate is lower than 25 fps but higher or equal than 10 fps. In another embodiment of the present invention the video rate is equal to or higher than 25 fps.

In a further embodiment of a device having a large display displays image data that is to be displayed on a screen that is of a higher resolution quality than is displayed on the current display screen. In one embodiment the device with the large display screen performs downsampling of the higher resolution image data. In another embodiment a separate computing device performs downsampling of the higher resolution image data before it is transmitted to the display device.

Figure 21:
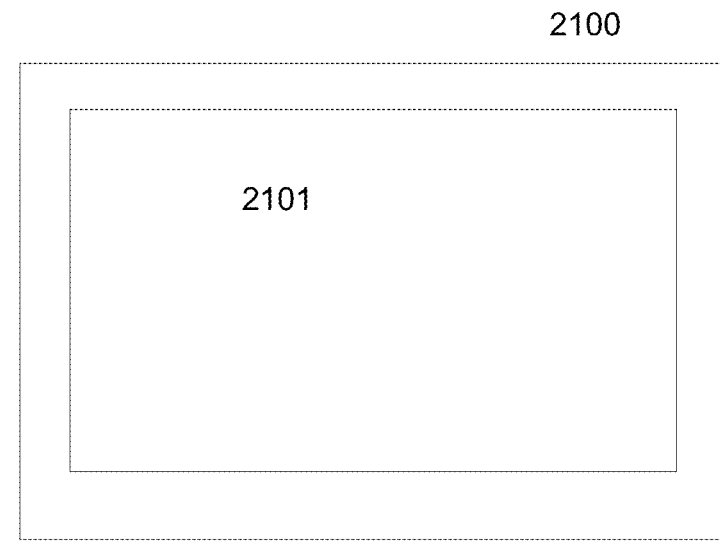
Figure 21:
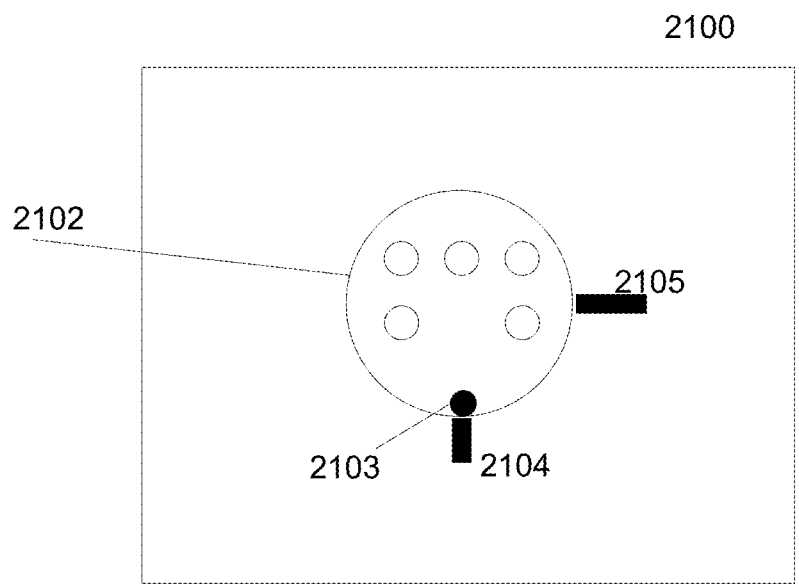

In one embodiment of the present invention a thin camera device 2100 with a large display screen 2101 as shown in diagram in FIG. 21 has a large display screen that is rectangular but not square. One preferred way to display an image such as a still image or a video is in landscape format as shown in FIG. 21. In another embodiment of the present invention the device 2100 is a multi-purpose computer or an eReader for instance. As an eReader the device can be used in portrait mode. A multi-lens unit 1902 as shown in FIG. 19 in the shown position can take 3D and panoramic images in landscape mode. One may want to take images in landscape mode even if the display screen is oriented in portrait mode. This is shown in an embodiment of the present invention as shown in FIG. 21. The multi-lens unit 2102 is part of a rotatable housing. This housing can be rotated by pushing for instance a protrusion 2103 from position 2104 (in landscape position) to position 2105 (in portrait position). In position 2105 the image can be shown in diminished size as a landscape image on a display screen in portrait orientation. The image can be stored and be displayed as a landscape image on the display screen in landscape orientation also.

Stand-alone digital picture frames are increasingly popular. These allow the display of a picture taken by a digital camera on a computer display screen. Such a digital picture frame is for instance disclosed in U.S. Pat. No. 6,975,308 to Bitetto et al. issued on Dec. 13, 2005 which is incorporated herein by reference. However, these digital displays require a connection to connect to a computer device and/or a camera. In one embodiment of the present invention, a digital picture display is provided wherein the camera is part of the display as is shown in for instance FIGS. 19-21.

Figure 22:
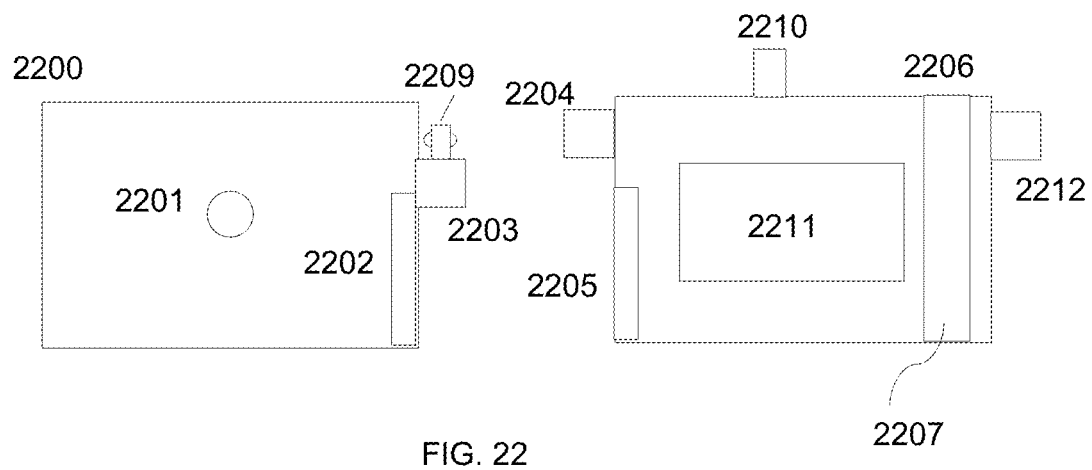
FIGS. 22-24 illustrate detachable displays in accordance with an aspect of the present invention.

In a further embodiment of the present invention a display screen of a portable and self contained computing device is part of a detachable portable and self contained display. This is illustrated in FIG. 22 with a computing device 2200 and a detachable display 2206 with a screen 2211. The computing device 2200 communicates with the display 2206 through a port 2201 in the computing device with a communication port 2205 in the display 2206. The communication ports 2201 and 2205 may communicate in one embodiment of the present invention in a wired manner. This may be for instance a wired USB connection. In one embodiment of the present invention the communication ports 2201 and 2205 are wireless communication ports that include wireless circuits and antennas to communicate. For instance the connection may be a wireless Bluetooth connection. It is emphasized that in one embodiment of a large display screen in an ultra-thin and ultra-light connectable display the display capabilities are in real-time. In a further embodiment of a large display screen in an ultra-thin and ultra-light connectable display the display capabilities are document or file based. It is further pointed out that a display screen herein is preferably a computer display screen, wherein an image is treated as an image of pixels and thus can be processed by a digital processor and can be stored in a memory or a buffer for temporary storage. A wireless connection between a display and a computing device is disclosed in US patent Application Publ. Ser. No. 20060061951 to Hara published on Mar. 23, 2006 which is incorporated herein by reference.

In case the computing device 2200 and the display 2206 are detached and are both self contained, they both require their own power source, which may be a battery. A battery 2207 to power the display 2206 has been identified in FIG. 22. In a further embodiment, the display 2206 has an inductive receiver 2207 to power the display. Inductive power in that case will be provided from an external source and enables the display 2206 to receive inductive power with power receiver 2207. This aspect of inductive power has been disclosed in U.S. Pat. No. 7,741,734 to Joannopoulos et al. issued on Jun. 22, 2010 which is incorporated herein in its entirety.

The wired connection such as the USB wired connection can be used to have the power source of the computing device power the display. A USB connection is preferably a real-time USB connection and not a file oriented connection. A separate wire to a power source in another embodiment can also be used to power the display. It is noted that in a wired connection with a USB connection the USB mini-A or mini-B connector can be used. The actual receptacles and plugs therein are 3.1 mm and are sufficiently small to be used in a display housing that is 5 mm thick. However, the housing of the USB mini receptacles are about 8.1 mm thick. In accordance with an aspect of the present invention a mini USB receptacle is modified to fit in a display housing that in one embodiment is 7 mm thick or smaller. In accordance with an aspect of the present invention a mini USB receptacle is modified to fit in a display housing that in one embodiment is 5 mm thick or smaller. In one embodiment the receptacle of a USB Micro may be used, if needed modified to fit the needs of connecting the display with the computing device and allowing the computing device to power the display. In a further embodiment the housing of the receptacle is part of the housing of the display. The state of the art is sufficient to enable a wired connection between a computing device and a display with a receptacle in the display wherein the display thickness is smaller than 5 mm down to a display thickness of 3 mm and wherein the receptacle is part of the housing and the actual connector is about 1 mm thick.

In one embodiment a battery is an ultra-light and ultra-thin battery made of nanocomposite paper as disclosed in the article "Flexible energy storage devices based on nanocomposite paper" by Pushparaj et al. in Proceedings of the National Academy of Sciences (PNAS) Aug. 21, 2007 Vol. 104 no. 34 pages 13574-13577 downloaded from its website www dot pnas dot org and US Patent Publication Ser. No. 20100050779 to Pushparaj et al. published Mar. 4, 2010 which are both incorporated herein by reference. A very thin battery not thicker than 1 mm is disclosed in U.S. Pat. No. 6,696,198 to Okahisa et al. issued on Feb. 24, 2004 which is incorporated herein by reference.

In one embodiment of the present invention the computing device 2200 and the display are combined as one apparatus. In such a configuration the computing device 2200 and the display 2206 are connected and combined, for instance through a separable hinge with male part 2203 with an axis and spring loaded ball connector 2209 and a female hinge part 2204 on the display 2206 that is enabled to receive and lock the spring loaded ball connector axis 2209. A user may separate the display 2206 from the device 2200.

The separated display in one embodiment of the present invention enables a display to collaborate with the computing device within at least 1 meter distance from the computing device of each other. In a further embodiment of the present invention the display can collaborate with the computing device in a distance not exceeding 3 meter of each other. In yet a further embodiment of the present invention the display can collaborate with the computing device in a distance not exceeding 10 m. In yet a further embodiment of the present invention the display can collaborate with the computing device in a distance exceeding 10 meter of each other.

In a further embodiment of the present invention the computing device has at least one lens/sensor unit 2201 which allows the device to record an image which may be a video image. In yet a further embodiment of the present invention the computing device 2200 is a camera phone or a wireless phone with a camera. In yet a further embodiment of the present invention the computing device 2200 is a camera.

The detachable display has several advantages. One advantage is that one can hold up the camera in a position for instance above one's head where it would be almost impossible to conveniently view its display. By detaching the camera, one can hold up the camera above one's head and still view the to be recorded scene on the detached display. In yet a further embodiment of the present invention, the display 2206 has a local control 2210 that activates the camera part of the computing device 2200. This also allows a person to make an image from himself/herself.

Figure 23:
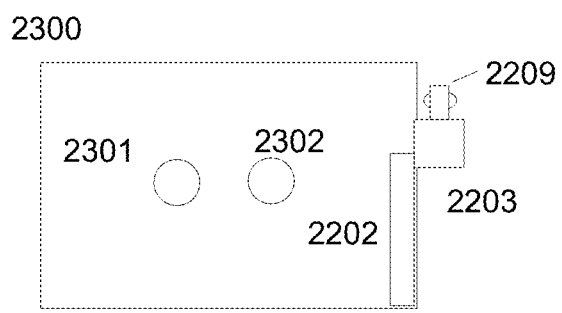

In a further embodiment of the present invention a computing device 2300 as illustrated in FIG. 23 has at least two lens/sensor units 2301 and 2302, which may be applied to generate a panoramic image or a stereoscopic image, which can be a video image. The display 2206 in FIG. 22 is illustrated from it's a view when it is folded open when attached. When folded closed a screen 2211 is visible. One may also modify this embodiment, by having a screen visible when the display is folded open.

However, when taking an image without detaching the display but with the display folded open, the screen is not visible by the user in one embodiment. One may address this by using a ball type hinge that allows the display to be rotated so the screen becomes visible to the user. In a further embodiment a hinge part 2112 may be provided to the display that allows the display to be hinged on the computing device so it faces the user. One may also provide an additional display screen on the computing device that is not detachable, so that the computing device has a detachable display and a fixed screen.

Figure 24:

In a further embodiment of the present invention, the detachable display has a screen at both of its sides, as is illustrated in FIG. 24 with a screen 2401. In yet a further embodiment a computing device has an integrated screen that cannot be removed and a detachable display that has at least one screen. The detachable screen in a further embodiment has two screens, one at each large flat side.

In general, a computing device such as a PDA, a cell phone, a smart phone, a camera and the like has its own display screen. Such a display is generally an integrated display that is not detachable from the computing device. With the increased miniaturization of computing devices there is a trend to minimize the size of a computing device and consequently the size of the display screen that is part of that device. On the other hand, cell phones and smart phones and the like are starting to become the main mobile device, including the main camera, for consumers. One or more aspects of the present invention allow the mobile phone to become the primary computing device for a consumer.

In one embodiment of the present invention, signals to the display from the computing device are provided via a wired connection. In a further embodiment of the present invention signals from the computing device are received by the display via wireless communications, for instance via radio signals such as via a Bluetooth or a wireless USB protocol, or via any other wireless communication that allows the display screen to show images generated by the computing device in real-time and not merely as files.

Figure 25:
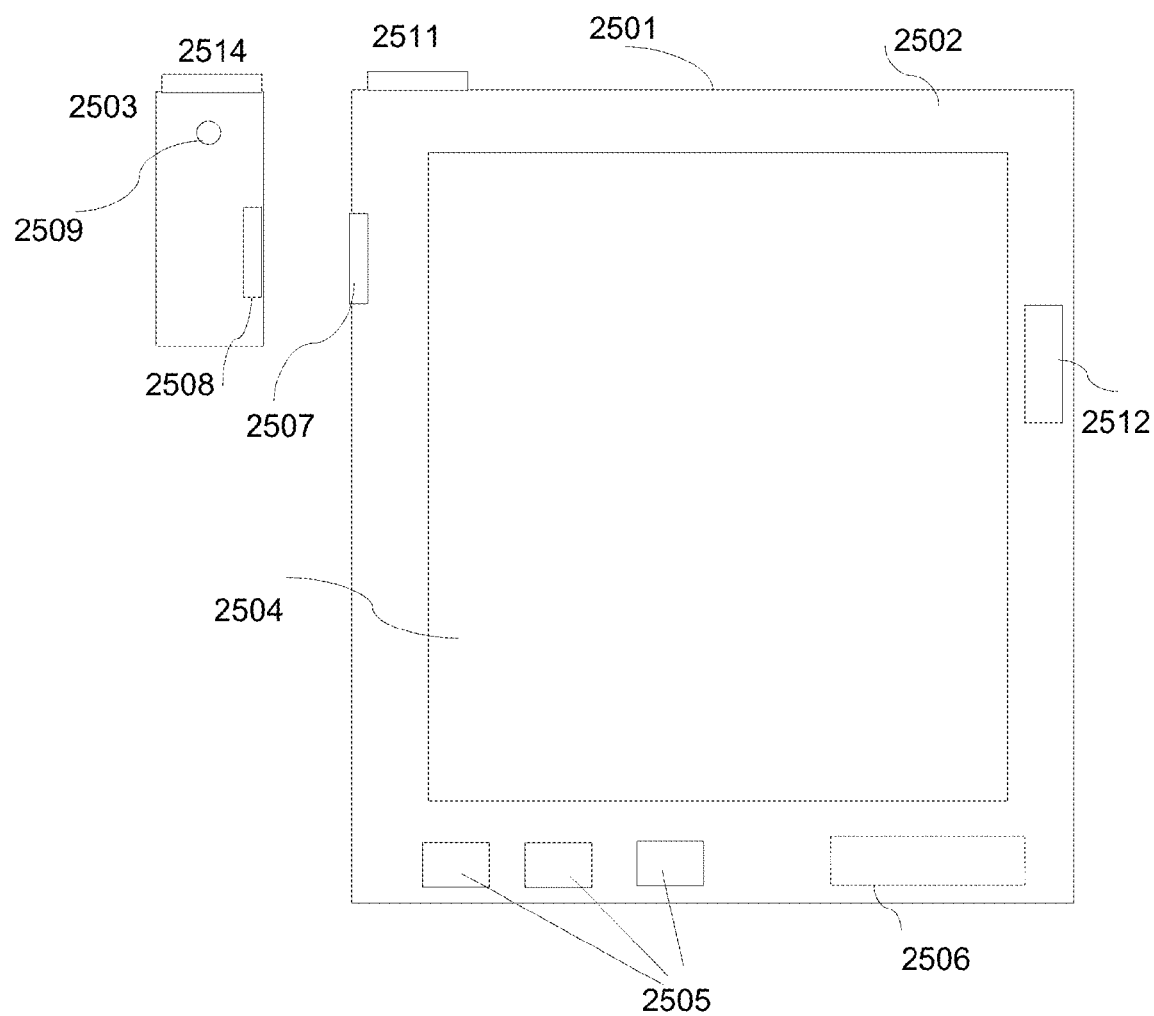
FIGS. 25-30 illustrate connectable large displays in accordance with an aspect of the present invention.

FIG. 25 illustrates such a display and the system it may be part of. The display 2501 has a housing 2502 and at least one screen 2504. The display with all components and housing is preferably ultra-tin and light and does not consume much energy, preferably a minimum amount of energy that can be provided by an inductive source that can be received by the display to power the screen or by an ultrathin battery that is not thicker than 1 mm and preferably thinner than 1 mm. Preferably the inductive power receiver or ultrathin battery 2507 (and which may not have been drawn to scale) is integrated in the housing 2502. The display is provided with a communication device 2507 that communicates with a corresponding communication device 2508 in a portable computing device 2503 that includes at least one lens/sensor unit 2509. In one embodiment the computing device 2503 is a mobile phone or smart phone. In another embodiment computing device 2503 is a stand-alone camera, preferably a digital camera.

A stand-alone camera in this case is defined as a portable device that is strictly limited to taking or recording images, which may be still images in one embodiment and video images in another embodiment of the present invention. A digital camera is a camera with at least one lens/image sensor combination. An example of a digital camera is an DSRL (digital single lens reflex) digital camera or any other digital camera for consumer or professional use. A stand-alone camera is not part of any other computing device such as a smartphone or a mobile phone. In one embodiment of the present invention a stand-alone camera has real-time communications means such as a wireless WiFi connection or Bluetooth or real-time wired or wireless USB. This communication means in case of the stand-alone camera is mainly used to receive instructions and or image data and to transmit status date and/or image data. In another embodiment of the present invention the communication means is exclusively used to receive instructions and or image data and to transmit status date and/or image data. In a further embodiment of the present invention a stand-alone camera is used to also record sound related to a scene. In that case the communication means is also used to transmit and receive instructions and data related to an audio signal. A stand-alone camera in a further embodiment of the present invention has processing capabilities, for instance in image processing or other tasks to generate image data that represents a desirable image that may be provided with an audio signal. It is believed that a stand-alone camera that is connectable to a display as disclosed herein is novel. In a further embodiment of the present invention a stand-alone camera is connected to an ultra-thin, ultra-light display via a wired connection. In yet a further embodiment of the present invention the wired connection also provides power to the ultra-thin, ultra-light display.

In one embodiment of the present invention a system is provided containing a stand-alone camera with a processor and memory and a connection to an ut/ul display to display in real-time an image being recorded by a lens/sensor unit in the stand-alone camera. In a further embodiment the stand alone camera contains two lens/sensor units. The stand-alone camera and the ut/ul display as provided herein are in one embodiment connected via a wire and in a further embodiment they are connected via a wireless connection. Despite having a wide angle lens or at least two lens/sensor units, a camera may not cover a desired field of view. In yet a further embodiment of the present invention a camera stand 3900 as illustrated in FIG. 37 is provided with a platform 3901 enabled to hold a camera 3902, the camera having at least a wired or wireless communication device to communicate with a display 4000 illustrated in FIG. 38 with a screen 4001 which may be an ut/ul display. In case of a wireless communication connection the camera 3902 has an antenna 3903 and the display has an antenna 4003. The stand 3900 further has a rotatable or movable platform 3905. The platform 3905 has at least one remotely controlled electrical motor, which may be a stepping motor or any other remotely controllable motor, which enables the platform 3901 to be rotated in a remotely controlled fashion.

In yet a further embodiment of the present invention a rotating control signal is provided via camera 3902 to a motor controller. In yet a further embodiment of the present invention a motor controller receives a control signal from a remote controller. Thus, by applying a remote controller a camera on a platform can be instructed to follow an object. In one embodiment of the present invention a camera on a platform moves substantially in one plane. In a further embodiment of the present invention a camera on a remotely controlled platform is also enabled to move in a vertical plane, for instance by using a vertical actuator such as a telescoping actuator 3906.

In one embodiment of the present invention a remote controller 4002, which may be a joystick, is incorporated in the display. In a further embodiment of the present invention one or more accelerometers 4004 are attached to the display or are incorporated in the display. Such a display with accelerometers is disclosed in U.S. Pat. No. 7,688,306 to Wehrenberg et al. issued on Mar. 30, 2010 which is incorporated herein by reference. A user confirms in a certain position a zero position which corresponds with a zero position of a camera. By moving the display with the accelerometers, the user can move the camera and track an object or pan an area. In one embodiment of the present invention a fixed tracking plane can be set. In a further embodiment of the present invention the camera can be provided with a third movement, for instance in a vertical plane.

The display can be one of a ut/ul display, a portable computer display, a tablet PC, a mobile phone, a smart phone, a PDA (personal digital assistant) or any other device including a display screen, at least one accelerometer, and a communication device to connect to a remote camera and a remote motor controller which is preferably a wireless connection but can also be a wired connection. One advantage of the above embodiments is that a user can track an object via a display rather than having to look through a viewer. In yet a further embodiment of the present invention a display has a processor that is programmed to instruct a motor controller to follow a pre-programmed track.

Cameras nowadays can be very small and are used in for instance computer gaming. The remotely controlled platform 4100 for a camera such as a small camera can also be small as is illustrated in FIG. 39. For instance a movable platform has a bracket 4105 that can be fixed, for instance temporarily, against or on an object or a wall. Fixed on the bracket is a motor holder 4104 which contains the motor controller and the motor that can move an axis or arm 4103 in a horizontal plane. Also contained in 4100 is a receiver to receive motor control instructions from the display. A camera holder 4102 is enabled to receive and tightly hold a camera 4101. In a further embodiment of the present invention a motor 4106 is attached between 4102 and 4103, enabling the holder 4102 to be rotated in a vertical plane. FIG. 40 illustrates the platform viewed from above. The motors are provided with electrical power. A power source, such as a battery, in one embodiment of the present invention is included in the platform. In a further embodiment of the present invention, a battery in the camera powers the platform, for instance via a power connection. In yet a further embodiment, power is provided from an external source, for instance via a power cord. In one embodiment of the present invention a platform 4100 is fixed against a wall, a structure or an object with a removable adhesive such as Scotch® Wallsaver™ Removable Mounting Square of 3M Corporation. This allows a camera to be removably positioned on an non-intrusive location, for instance during a performance and allow a user to pan, focus and zoom on part of a scene or a performance. In one embodiment a camera remote control is provided, which may be incorporated in the display. A touch type screen in the display in one embodiment of the present invention is enabled to display a camera control to control one of camera focus, camera zoom in/out, camera aperture, camera on/off and any other camera control.

In one embodiment of the present invention, after a camera platform has been positioned and camera settings have been provided a confirmation signal from the display keeps the camera platform and/or the camera in its preferred settings.

Figure 41:
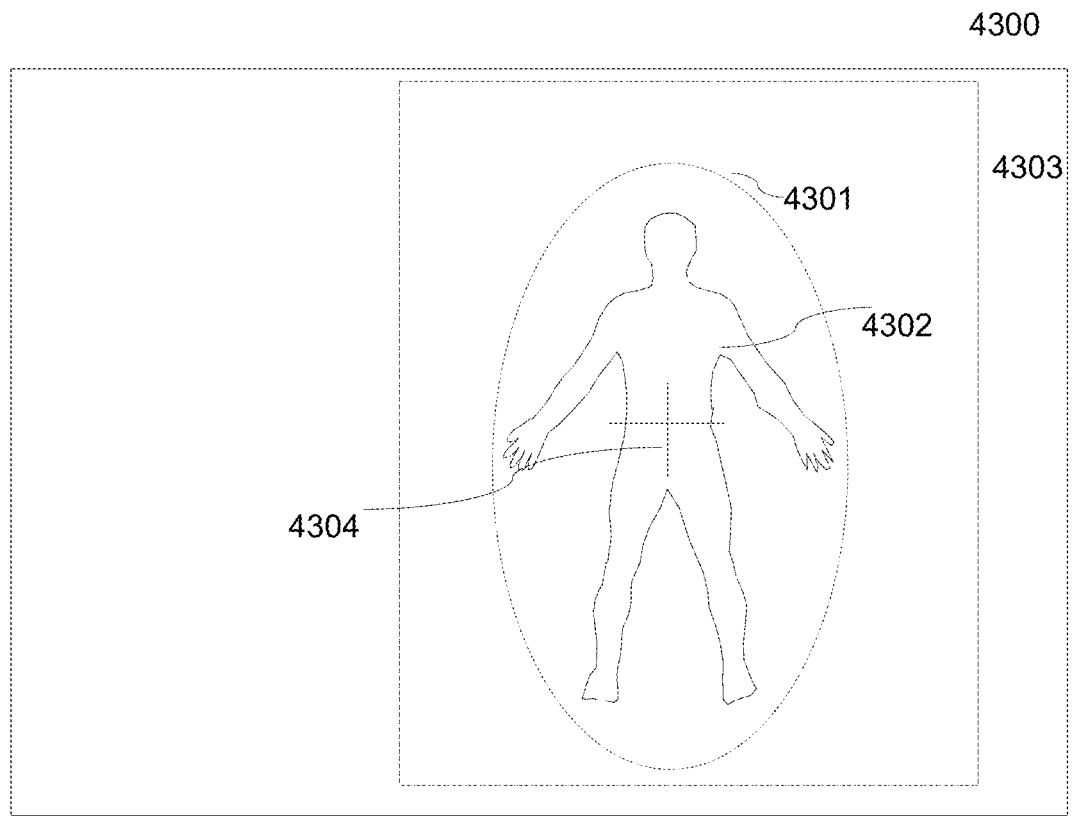
FIG. 41 illustrates a screen of a display in accordance with an aspect of the present invention.

In one embodiment of the present invention the camera platform and the camera and the display collaborate to track an object or a person in a scene. This is illustrated in FIG. 41. A screen 4300 contains an image of a person 4302 recorded by the camera on the platform. Preferably, a user provides an identifier 4301, such as an ellipse, around the image and a processor in the camera or the display is trained to learn characteristics of the object. This may be a segmentation learning, a statistical distribution learning, specific characteristics learning such as head and legs, or detection of a provided characteristic such as a colored tape or patch on the object. After analysis or learning, in an operational mode the processor is enable to recognize or track the object or person in a scene. The processor in one embodiment determines a tracking center 4303 of the object. A user may provide a tracking box 4303 which determines a part of the screen wherein the object's or person's image has to appear on the screen. For instance one may want to have the object appear at the right side of the screen. The size of the box 4303 determines the activity of the platform. If a person moves inside an area corresponding to 4303 the platform will not move, creating a relatively stable screen image. However, when the person or object moves outside the area corresponding to the box the platform will move. The location of for instance the tracking center 4304 determines the control signals provided via the processor to the motor controls of the platform. Image tracking is well known and is disclosed for instance in U.S. patent application Ser. No. 11/284,496 to Zhang et al. filed on Nov. 21, 2005 which is incorporated herein by reference.

A processor in one embodiment of the present invention is provided that is programmed to track a moving object from an image generated by a lens/sensor unit on the mobile platform. Based on the location of a tracking point in the image of the object a processor controls a motor in the mobile platform that allows a lens/sensor unit in the camera to keep the object in its field of vision.

In one embodiment of the present invention the mobile platform is compact and light. For instance a holder of the mobile platform is about the size of a mobile phone, but made of light strips or a web of rigid or semi-rigid material. Combined with the motor(s), control and communication circuitry, arm and bracket the weight is preferably less than 500 grams, more preferably less than 250 grams and most preferably less than 200 grams. The mobile platform should be mobile and portable. Its size in should be able to fit in a box of a volume preferably less than 1000 cm3 in volume, more preferably about or less than 500 cm3 and most preferably with a volume of about or less than 250 cm3.

Returning to FIG. 25, in yet another embodiment of the present invention the computing device 2503 has no lens/sensor unit and is a router or a router like device. The display 2501 has at least one control 2505 to control the display screen, including but not limited to an on/off switch, a contrast control, a brightness control and the like. In a further embodiment the control 2505 is a touch screen that is either separate or part of screen 2504. The display 2501 also contains control logic and memory 2512. The device 2512 may also contain a processor for processing image data that is to be displayed. In one embodiment device 2507 receives a signal that contains image data. Device 2507, which may be a wireless device such as Bluetooth device or a WiFi device, or with a wired connection such as a USB port, can demodulate the received signal, for instance from 2508, into for instance a baseband signal that represents a displayable image that is provided to 2512 where it may be stored, if necessary only temporarily, to be processed and to be displayed on the screen 2504. In one embodiment a demodulator demodulates the signal and an extractor extracts from the demodulated signal the image data. In a further embodiment the image data is arranged in a frame structure that allows the image data to be displayed on the display screen. In a further embodiment 2512 may contain a mass storage chip to store a series of images, such as consecutive video images.

In a further embodiment of the present invention display 2501 also contains a power inlet 2511 that allows it to be connected to a power outlet, for instance to a power outlet 2514 on device 2503 to power the display screen 2501. In a further embodiment of the present invention the power connection between 2511 and 2514 includes a communication connection and may be a USB connection or a WiFi connection. This allows the display to be powered by 2503 while also taking care of the communication that otherwise would be taken care of by 2507 and 2508.

In one embodiment of the present invention the computing device 2503 is a very small device that fits easily in a clinched first of a mature person. For instance such a device may have measurements of about $8*3*2$ cm$^3$ in volume such as for instance the Samsung® SCH-U470 model mobile phone or smaller. In yet another embodiment is larger than $8*3*2$ cm$^3$ but smaller than $10*3*3$ cm$^3$ in volume. In yet another embodiment is smaller than $10*4*4$ cm$^3$ in volume. The device has a screen for display of about $3*2$ cm, or larger or smaller which is adequate for viewing information, but of course provides only a limited quality view of images. The advantage of such a small device or even smaller, is that it is extremely portable. Even smaller devices can be made with imaging, processing, communication, audio and storage capabilities or any combination thereof. The advantage of such a small or even smaller device with at least one lens/sensor unit is that a user can hold it in virtually any position to take an image. Unfortunately, a user can only review an image on the device after it has been recorded on the device. A display 2501 that shows images taken by 2509 of 2503 in real time allows the display 2501 to be used as a real-time viewer. In one embodiment at least one lens/sensor unit 2509 on a device 2503 records an image, which may be a video image, and provides the related image data to a communication device 2508 which transmits it to a receiving device 2507 of display 2501 to be processed by 2512 to be displayed in real-time or close to real-time on screen 2504. In a further embodiment device 2503 has at least 2 lens/sensor units from which device 2503 creates a 3D or a panoramic image which is provided for transmission on 2508. The screen 2504 may be a 3D enabled screen to display 3D images.

In one embodiment of the present invention wherein a computing device is connected to a single display wherein a screen 2504 of the connectable ultrathin, ultralight display is at least 1.5 the size in area and preferably at least 2 times the size in area of a display screen that is an integrated part of the computing device. In yet a further embodiment of the present invention the connectable ultralight ultrathin display is preferably at least 5 times, more preferably at least 10 times, yet more preferably at least 20 times, yet more preferably at least 40 times and most preferably at least 100 times the size of the integrated display of the computing device.

In one embodiment the screen 2504 works as a real-time viewer of lens/sensor unit 2509. In general a camera unit creates and stores an image. Such an image can be transferred to another device in the form of a file, including a RAW file. However, in at least the one embodiment of the present invention of this paragraph, the screen 2504 shows the same image, which may be a video image as one would see on a viewer on the device. One should keep in mind that a camera viewer on the computing device in one embodiment is significantly smaller than the screen 2504. This may mean that screen 2504 can show an image in a higher resolution than the integrated viewer on the computing device. This issue can be addressed in several ways. In one embodiment of the present invention the computing device recognizes the device 2501 and the display screen requirements. This may include the type of display screen and the signals formats required to display an image correctly on the screen 2504. For instance a screen 2504 can show four times as many pixel lines than the integrated viewer. This recognition may be achieved for instance by an identifying code that is transmitted by device 2501 during initiation of a connection and that is recognized by 2503. Device 2503 may have a memory that stores different display protocols for a possible connected screen 2504. When a specific identifying code is recognized an image processing application is activated that processes image data generated by 2509 into the required format required by 2504. In one embodiment that processed data is transmitted as a signal to the display 2501 for display on 2504. In one embodiment the signal is provided to a driver of the screen 2504 to generate the image on the screen. In a further embodiment additional signal processing, for instance amplification, is required to condition the signal for the driver. In yet a further embodiment, especially when the signal is transmitted wirelessly, the signal is a modulated signal, such as an RF (radio frequency) or infra-red signal. A wired connection may also require a modulated signal. In the case of modulation the display 2501 has a receiver to receive the signal, and to condition the signal for demodulation, demodulates the signal, extracts the image data and processes it to be provided in the required format for the driver and provides the image data to the driver to drive the screen to show the image. Intermediate steps may be required to enhance a signal and to remove extraneous data that were used for correct communications, including but not limited to handshake data and data error correction data.

In a further embodiment the device 2503 transmits image data to 2501 in a standard format such as JPEG or RAW. In that case the device 2503 has a processor that is programmed to transform the image data from its standard format to the format required by a screen 2504 and its related driver. While this is a possible embodiment of the present invention it is a less preferred embodiment with a small and low power processor on the device 2501 that can achieve this. It is preferred to have most power intensive processing being done by the device 2503 and limit power intensive processing on device 2501.

In a further embodiment of the present invention, the device 2503 stores at least one image or a video image. The device 2503 is enabled to play for review stored images. In a further embodiment the device 2503 provides stored images for review on 2508 to be transmitted to 2507 to be reviewed on 2504.

One disadvantage of a display is its weight and bulk if not appropriately dimensioned. This is currently demonstrated by available eReaders and tablet like computers such as the Apple iPAD®. First of all these devices do not have the advantages or aspects of the present invention. Secondly, they have bulky batteries. Even an advanced eReader such as the announced QUE proReader™ by Plastic Logic Ltd. of Cambridge, UK has some disadvantages as is disclosed on the fact sheet as released by Plastic Logic which is incorporated herein by reference. It displays still images, in grey shade colors, and has a thickness over 7 mm, with a weight over a pound. Seiko Epson reported an eReader in a 18 cm by 12 cm housing of 3 mm thick of 57 gram in 2007 at Embedded Technology 2007, an exhibition event in the Pacifico Yokohama convention center. The device has a USB port. However the device displays grey color and not video enabled images as was reportedly has a refresh of 0.8 sec. It was also not disclosed how data exchange was used. It appears that it supports document type transfer.

While being portable, current devices that are on the market or that have been announced appear not to meet the requirements of being ultrathin, light and having a large display screen. A display screen that meets the requirements as an aspect of the current invention would be like a magazine or a paper notepad for instance of A4 format or larger. Such a notepad is extremely portable of light weight and only noticeable by its size, not by its weight or bulk and is very transportable without being intrusive.

It appears that the upper limit of weight for an external display to be carried along is about 1 pound, with a screen size of at least 10 by 15 cm, preferably 15 by 23 cm and more preferably 8 by 11 inches and yet more preferably greater than 8 by 11 inches. The upper weight limit for all the preferred screen sizes is about 1 pound, more preferably 12 ounces and even more preferably 8 ounces or less. Even more preferable is a weight of 6 ounces.

For an external display a weight of 16 ounces or less is preferable, a weight of 12 ounces or less is more preferable and a weight of 6-8 ounces is most preferable. A weight substantially less than 6-8 ounces and certainly less than 6 ounces is also preferable. A low weight is preferable for a portable display but a very light weight display weighing less than 6 ounces appears to lose a sense of substance. As a portable display with a minimum screen size of substantially or close to 10 by 15 cm appears to be a minimum requirement to carry an extra device. An even smaller size, such as a half postcard sized display screen size of about 7 cm by 4.5 cm is desirable and even more preferable if it is thinner than 5 mm and light, for instance 12 ounces or lighter or even more preferable 8 ounces or lighter. A larger size with low weight is also preferable. A minimum screen size of substantially or about 20 cm by 15 cm for a portable display is more preferable, while a screen size of a notebook or writing pad size (standard 8 by 11.5 inches or A4 in Europe) appears to be very preferable. Larger sizes at low weight are also preferred but less so for a portable display as it starts to become too large for being carried in carry-on luggage. A large screen as an aspect of the present invention is fully color enabled. In a further embodiment of the present invention it is also video enabled with a display rate of at least 12 fps.

Sizes as provided herein, are sizes equivalent to an area that is defined by an area of a rectangle with one side L and one side W. The area is then L*W. So if a size is preferably larger than 15 cm by 10 cm then it means that a size is preferably larger than 150 cm². In one embodiment one may prefer a rectangular shape. In another embodiment one may prefer a square shape. In yet another shape one may prefer an ellipsoid shape.

Furthermore, it is a requirement to provide in one embodiment a portable and connectable display that is not bulky. It appears that a display with a thickness greater than 1 cm is not very desirable. In a first embodiment of the present invention a display has a thickness of 1 cm or less. More preferable is a display that has a thickness of 7.5 mm or less. Even more preferable is a display that has a thickness of 7 mm or less. Even more preferable is a display that has a thickness of 6 mm or less. Even more preferable is a display that has a thickness of 5 mm or less. Even more preferable is a display that has a thickness that is 4 mm or less. Even more preferable is a display that has a thickness of 3 mm or less. A thickness of 2 mm or less is also preferred. However, there is a requirement also of rigidity and sturdiness. A thickness of 2 mm or less is only preferred if the housing and the whole display maintains a feel of sturdiness and stiffness and rigidity. There is also a matter of cost to create the display to be considered.

Computing devices with display screens of course exist. These computing devices have their display screen integrated into one body. As an embodiment of the present invention a display is a separate but connectable ultra thin/ultra-light display (UT/UL or ut/ul display). A ut/ul display is a portable external accessory to a computing device, like earphones. Current devices and displays are not ut/ul displays. The Apple iPAD® for instance has a size of 242 by 189 by 13.4 mm with a weight of about 700 grams and clearly does not meet the requirements of a ut/ul display. The Apple iPOD® for instance has a size of about 110 by 62 by 8.5 mm with a weight of about 115 grams, wherein the actual screen is substantially smaller than the size of the device, and also does not meet at least the thickness requirements of an ut/ul display.

By using materials, including housing materials, screen material and the like, in one embodiment with an average density of 1500 kg/m3 one can achieve an ut/ul display with a housing size of 30 cm by 25 cm with a display screen of 25 cm by 20 cm of with a weight of 113 grams per 1 mm thickness. A thickness of at most 4.5 mm in a box shape display, will still meet the requirements of an ut/ul display. This assumes a solid housing, which is not likely. More likely the housing has walls of 1 mm thick, preferably 0.5 mm thick, for instance of a fiber reinforced composite material. Furthermore, one may fill at least part of a housing formed by thin shells of about 1 mm thick or less with a foam such as a structural foam. One may for instance fill half shells with a foam that has a density significantly lower than 1500 kg/m3, remove or laser ablate the foam for the shapes of the components such as connectors, antennas, screens, circuits and the like, assemble the components into the shells and glue or fix the shells together. This enables a display with an average density of 900 kg/m3 and more likely an average even lower than 900 kg/m3 at a large size. This enables a display of 300 mm by 250 mm by 5 mm with a screen of 25 cm by 20 cm to have a weight less than 12 ounces.

Part of the display is being formed by the screen and screen backplane, the housing of the display and the battery or power source (if used). The screen itself can be thin if an OLED or an electrophoretic display screen are used. The thickness of ePaper or eInk display screens with backplane has been reported to be in a range of 250 micron to 850 micron. Accordingly, display screens of large areas complying with the requirements herein are available with a thickness of about 500 micron (or micro-meter). Full color and video imaging is enabled by an electrophoretic screen using electrowetting. This is disclosed in for instance US Patent Publication Ser. No. 20100128015 to Feenstra et al. published on May 27, 2010, which is incorporated herein by reference in its entirety. Such screens have been demonstrated by Liquavista of Eindhoven in the Netherlands.

The body of the display should be strong but also ultra thin. One way to achieve this is to use high-strength and high stiffness polymers. For instance one may use a polycarbonate material such as disclosed in U.S. Pat. No. 6,043,310 to Liu et al. issued on Mar. 28, 2000 which is incorporated herein by reference. One may use a housing with a maximum thickness of 5 mm or less. In one embodiment one may use a housing with a maximum thickness of about 3 mm or less. In yet a further embodiment one may use a housing of a maximum thickness of about 2 mm or less. In one embodiment one may use high strength polymer composite materials that have been reinforced by fiber materials. These composite materials are well known. In one embodiment carbon fiber reinforced composites are used. For instance in one embodiment a carbon reinforced polyimide resin is used to form a thin but strong housing. In another embodiment the housing is made of carbon nanotubes reinforced composites. Accordingly, a stiff housing for a display can be made with a thickness of less than 2 mm thick; of less than 3 mm thick; of less than 4 mm thick; and of less than 5 mm thick.

A review of documents does not reveal anyone disclosing or pursuing limitations as described herein. It appears that a thickness of a display with a large display with housing of about 1 cm is pursued, with some finding a thickness over 7 mm ultrathin. Seiko showed a non-video enabled non-color ultra-thin device that is ultra-light but that is smaller than 25 cm by 20 cm. A weight of over 1 pound appears considered to be acceptable. These embodiments are embodiments of eReaders and computing tablets and not of ultrathin, ultralight and large connectable displays as described and enabled herein.

Two familiar display screen technologies are the OLED technology and electrophoretic display screen technology also known as electronic paper. In general such a screen is an electro-optic display screen. It may contain a material with for instance active elements or with Microencapsulated Electrophoretic Capsules. A field across the display screen activates the display screen elements in one embodiment. Such a display screen is disclosed in for instance US Patent Publication 20070247697 to Sohn et al published on Oct. 25, 2007 now U.S. Pat. No. 7,672,040 to Sohn et al issued on Mar. 2, 2010 which are both incorporated herein in their entirety.

In accordance with one embodiment of the present invention the supporting electronic devices for communication, power management and screen display management are embedded in electronic integrated circuits. These integrated circuits are embedded in the plastic housing of the ut/ul display and provided with the required connections. How to embed integrated circuits into the plastic housing is known and is for instance disclosed in the article "Embedding of thinned chips in plastic substrates" by Vandecasteele et al. of IMEC-TFCG Microsystems in Zwijnaarde, Belgium as downloaded from the Internet and which is incorporated herein by reference. One may create a stiff and very thin housing of a double shell of for instance a total thickness of 3 mm and a shell wall thickness of 1 mm or less in a first embodiment and with a shell wall thickness of 0.5 mm or less in a second embodiment. In a further embodiment the total shell thickness is about 2 mm or less. If open room exists between the shell walls the shell can be filled with ultra light structural foam which provides additional strength while keeping the total weight low. The components such as chips and connectors can be fixed in or to the shell or the foam in different ways. In one embodiment foam or shell are partially ablated for instance by a laser such as a pulsed laser to create a shape in the shell or the foam that will receive the relevant components, which can then be placed and fixed into place, for instance by a glue bonding.

Figure 26:
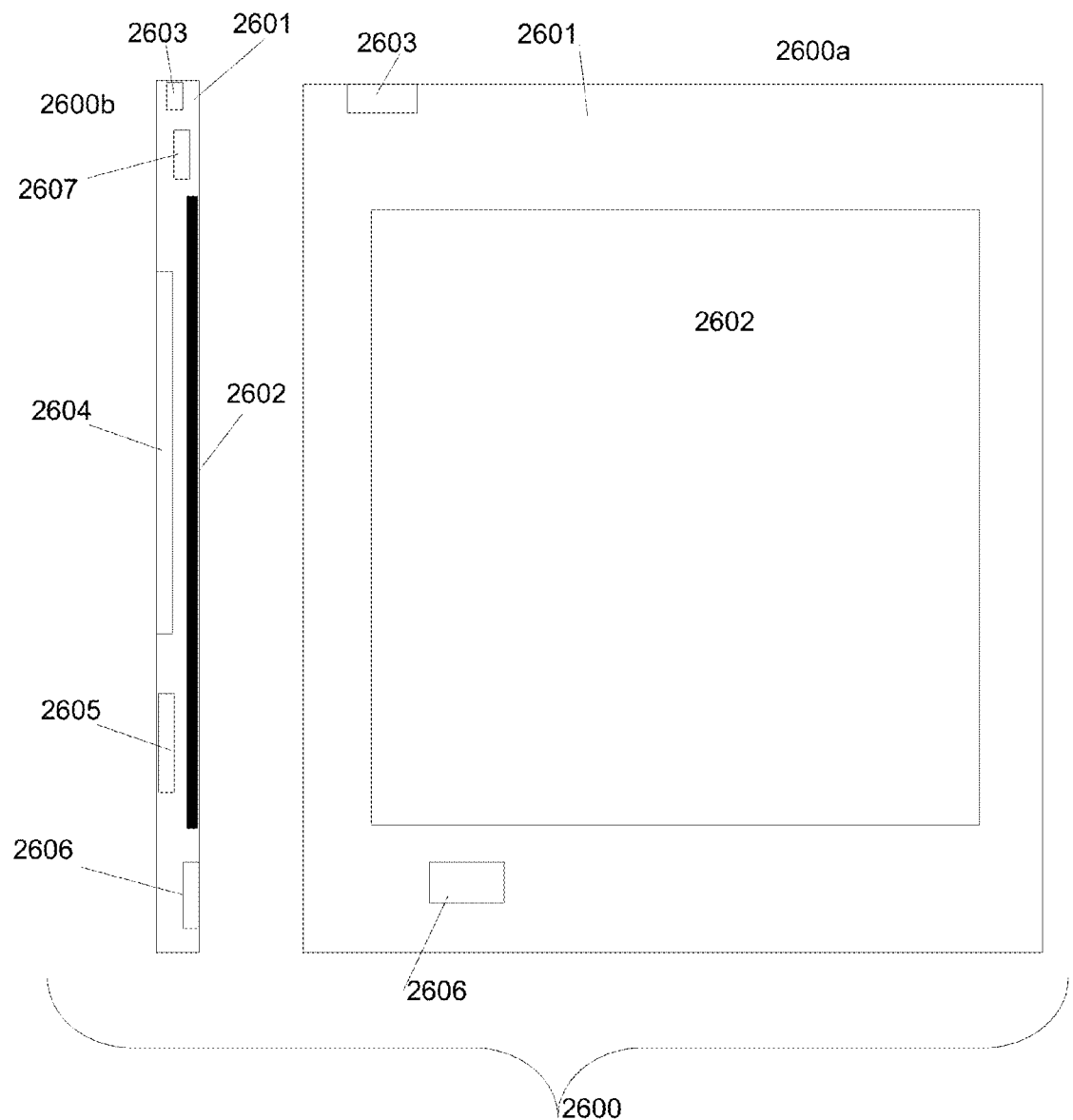

FIG. 26 illustrates one embodiment of an ut/ul display 2600 both in front view 2600*a* and a cross sectional side view 2600*b*. The display has a body or housing 2601 with a thin screen 2602 as was discussed above. Also included in an embodiment is an at least one control element 2606 which may be an on/off switch. In a further embodiment the ut/ul display has a connector 2603 for connecting an external power source. In the cross sectional view also at least one embedded IC or chip 2607 is shown. Chip 2607 is a further embodiment is representative for at least a power control chip, a display control chip (including a driver), and any other ICs that are required to enable the display. A device 2605 which is included in the housing in an embodiment represents a communication device, including an antenna in a further embodiment, to receive and process signals from a computing device that transmits signals representing an image. These signals are processed into further signals that can be processed by 2607 to be provided to 2602 for display of an image, which can be a video image. In a further embodiment, image signals may be provided through a wired connection. Device 2605 in such an embodiment can be configured to connect to a wire to receive the required signal. A wire may be an electrical wire or an optical wire such as an optical fiber. In a further embodiment it is preferred to use only one wired connection. In that case 2603 is for instance a USB port enabled to transmit power as well as signals such as an image signal.

In general a battery causes much of the bulk and weight of a computing device. Preferably, screen 2602 is a low power consumption screen as is known in the art. In that case an ultrathin battery 2604 which has a thickness of 1 mm or less and preferably of 0.5 mm is applied. Very thin Li batteries using Lithium Phosphorus Oxynitride (LiPON) as electrolyte in a FET configuration are known. Ultra-thin batteries are disclosed in U.S. Pat. No. 7,389,580 to Jenson et al. issued on Jun. 28, 2008 which is incorporated herein by reference. In a further embodiment, power is provided by inductive transmission as discussed above and 2604 represents such an inductive power receiver.

Figure 27:
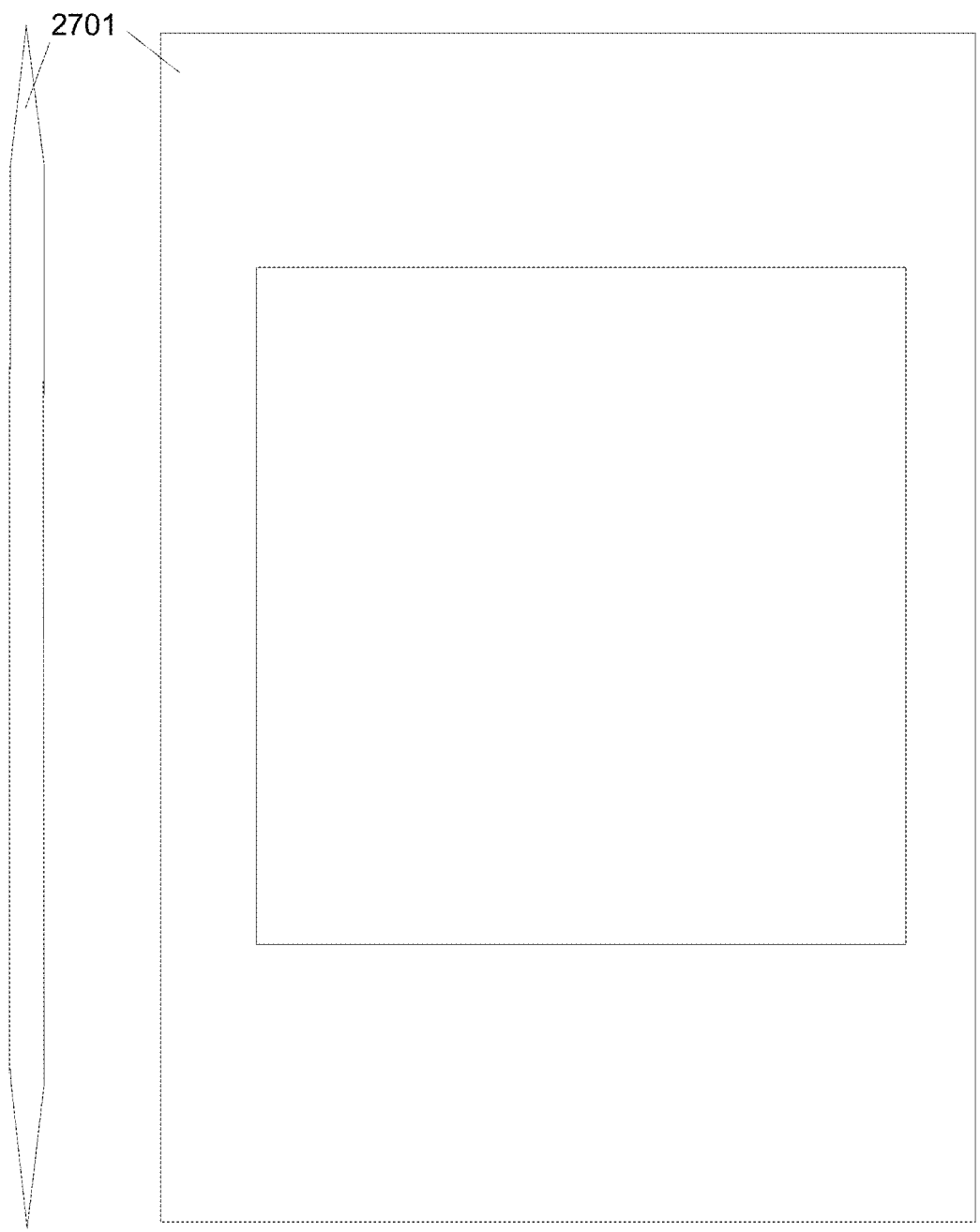

The housing serves to hold the screen and all the supporting electronics and provide stiffness to the display. It also serves to provide a user with the ability to hold the display at the edges. In a further embodiment of the ut/ul display the edges of the housing are tapered as shown in FIG. 27 by 2701. This provides a user with a sense of thinness and saves in weight.

In one embodiment a portable display is provided that has a screen that is larger than a screen of the computing device it is connected to. In one embodiment the display has a thickness that is not greater than 5 mm. In a further embodiment it has a thickness that is not greater than 7 mm. In yet a further embodiment it has a thickness that is not greater than 1 cm. In yet a further embodiment it has a weight that is less than 12 ounces. Because the thickness and weight are not as restricted as in the above disclosed embodiments, one may use cheaper technology including batteries and connections and display screens and the like. It is currently possible to create very small and compact computing devices with camera capabilities, and with integrated storage, processing, rechargeable power and communication capabilities. Such devices can be fitted with a small display screen to provide minimal status information and with limited input controls. These devices can easily be about or smaller than 6 by 3 by 2 cm. However, in such a small size the use as a smart phone or computer is limited. Especially some form of convenient input and display device are missing.

For instance the display may receive data from the computing device to be displayed on the screen, but the data does not establish a complete frame. A communication protocol, such as a handshake protocol, may inform the device that data is missing. The missing data will remain in a buffer on the computing device until the display confirms receipt of the data. One may also apply a buffer on the display that receives data at a slightly higher rate than is being processed. The display informs the computing device when the buffer is almost full, allowing the display to create a "buffer" of data for a maximum time of interruption. Data buffering techniques between a transmitting device and a receiving device are well known in the art.

The size of the screen of the connectable ut/ul display is at least larger in area than the screen of the computing device. Preferably the ut/ul screen is larger in area than 7 cm by 5 cm; more preferably the ut/ul screen is larger in area than 10 cm by 7 cm; even more preferably the ut/ul screen is larger in area than 15 cm by 10 cm; even more preferable the ut/ul screen in area is larger than 25 cm by 19 cm; even more preferable the ut/ul screen in area is larger than 30 cm by 20 cm; even more preferable the ut/ul screen in area is larger than 30 cm by 25 cm.

It should be clear that the use of a large ut/ul screen completely changes a mode in which a computing device can be operated. More data and portion of images and text or documents can be shown in a usable way than on a small integrated screen of a small computing device as provided above. In a preferred embodiment most of the data processing, storage and imaging and phone like circuitry and devices are located on the small footprint (8 cm by 3 cm by 2 cm in size or volume or smaller) or even smaller footprint (6 cm by 2 cm by 1.5 cm or smaller in volume or size) computing device. Such a device is portable and usable as a phone which may be wireless, MP3 player, camera (video, and/or panoramic and/or 3D), video viewer, data viewer, audio and video recorder data storage, data recorder and in any other form for which a computing device is and can be configured. Without an external display, viewing of data, documents and images is not as convenient or useful as with a large display screen. Furthermore, computer applications such as word processing, spreadsheets, presentations, image processing and the like can be stored on a small footprint device and can be processed by a processor on the device but cannot be viewed and/or displayed adequately. The use of certain computer applications is very much enabled when an external ut/ul display is connected.

In one embodiment of the present invention the weight of the computing device is also limited. A large integrated screen in the computing device will add to the weight. So will a large battery. In a preferred embodiment of the present invention the computing device has a weight that does not exceed 250 grams. In a more preferred embodiment of the present invention the computing device has a weight that does not exceed 200 grams. In yet a more preferred embodiment of the present invention the computing device has a weight that does not exceed 150 grams. In yet a more preferred embodiment of the present invention the computing device has a weight that does not exceed 100 grams. In one embodiment of the present invention the weight of the computing device is diminished by applying a thin battery, not exceeding 5 mm in thickness. In one embodiment of the present invention the weight of the computing device is diminished by applying a thin battery, not exceeding 3 mm in thickness.

In one embodiment, a computing device recognizes when an external display is connected to it. Such a computing device may for instance use a simple, menu driven interface to a user on its own integrated screen. It is known that a computing device can be under control of an operating system. Such an operating system in one embodiment of the present invention is operational on a processor in a small footprint computing device. The operating system is programmed to recognize the connection of an external display device. Such recognition capability is for instance known for USB devices. When an external ut/ul display is recognized the operating system through the processor generates a graphical user interface (GUI) for the external display screen, while the integrated display screen on the computing device maintains its own interface. The GUI on the external display screen may be controlled by a control on the computing device. The external ut/ul display may also have its own user control, which may be a touch screen which communicates through the connection with the processor on the computing device.

In one embodiment the external ut/ul display device depends for most of its processing capabilities and storage capabilities on the computing device. The external display in such an embodiment has capabilities to communicate with the computing device. It may have some processing power to generate appropriate graphics, images and characters. This may include screen drivers, and some control circuitry, power circuitry and some local memory to hold and perhaps recall images or GUI interfaces as well as communication circuitry to communicate with the computing device. However, all actual processing and generation of data, images and the like takes place on the small footprint computing device. This means that only a minimum of circuitry and supporting connectivity, storage and power circuitry is located on the external ut/ul display and limits its thickness and weight. In a further embodiment, one may include additional processing circuitry and memory on the external ut/ul display, allowing to process some data for display and cache data for future use. One may also include processing capabilities to locally generate and hold a GUI on the external display. This means that for instance an external display may be disconnected from the computing device without losing the data or screen information that is being displayed.

The computing device in one embodiment of the present invention has wireless phone and other capabilities such as camera capabilities and/or document processing capabilities. In one embodiment of the present invention the wireless phone capabilities can be independently switched on and/or off without switching on/off the other capabilities.

In one embodiment of the present invention, the screen is of a connectable ut/ul display is a screen with touch screen capabilities. This allows the screen to support full video in color while also having touch screen capabilities. Such a light weight display with touch screen capability has been disclosed in US Patent Application 20100171708 to Chuang published on Jul. 8, 2010 which is incorporated herein by reference. It is to be understood that an embodiment of a ut/ul display that uses touch screen technology and/or a control that communicates with a processor on the computing device is enabled to receive and process signals from the computing device and to send signals to the computing device.

Figure 28:
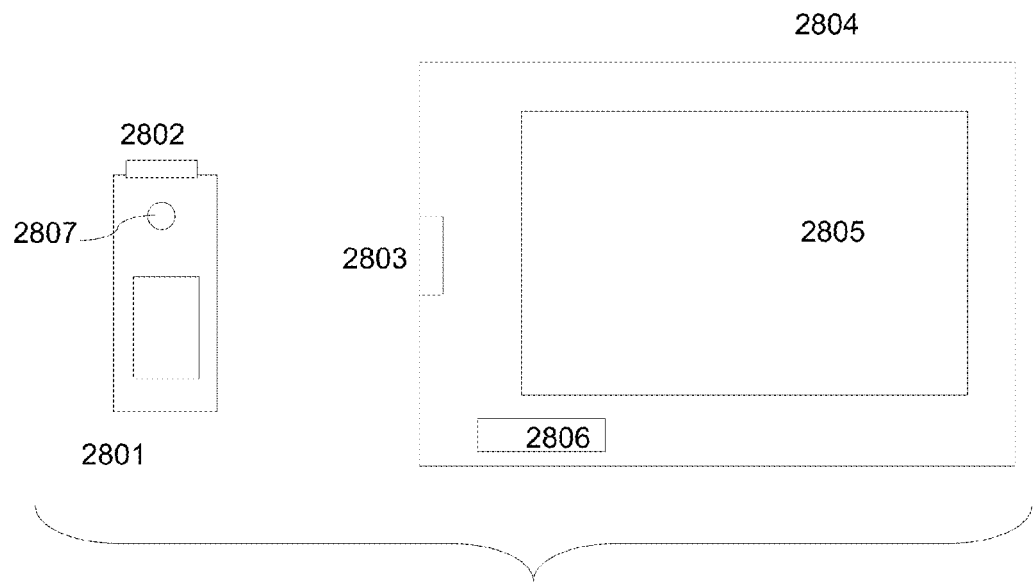

FIG. 28 is a diagram of an embodiment of the present invention. It shows a portable and connectable display 2804 with a screen 2805. The display 2804 has a connecting device 2803 which allows the display 2804 to be connected with a connecting device 2802 of a computing device 2801 which preferably is a small footprint computing device. The computing device 2801 in one embodiment has at least one lens/sensor unit 2807. In a further embodiment computing device 2801 in one embodiment has at least two lens/sensor units for creating panoramic and/or 3D images as disclosed herein. In one embodiment these panoramic and/or 3D images are created by a processor on 2801 and are transmitted to portable display 2804 to be displayed on screen 2805. In a further embodiment the constituting images are being generated by the at least two lens/sensor units on 2801 and are provided with control data that allows a processor on 2804 to combine the images to form a panoramic and/or 3D image by applying the control data and to display the panoramic and/or 3D image on screen 2805. The portable display 2804 has a control 2806 which may be an on/off switch or one or more controls to control screen functionalities such as brightness, contrast and the like, and which may also contain a mouse or pointer like control to control for instance a cursor or pointer type graphic on the screen 2805.

In a further embodiment the computing device has at least 2 lens/sensor units of which one, which is 2807 is shown facing the viewer of the FIG. 28 and at least one facing the opposite site. This allows the device 2801 to record images in the direction of a user and an image in the viewing direction of the user. In a further embodiment a lens/sensor unit in the above embodiment is at least a plurality of lens/sensor units that allows to creating panoramic and/or 3D images in each direction.

Figure 29:
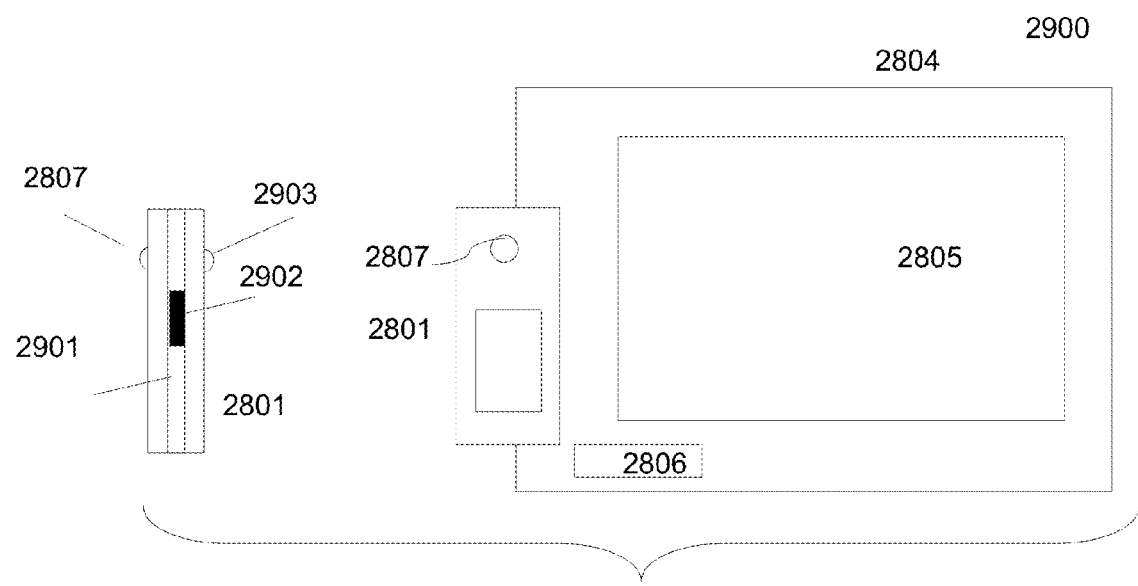

FIG. 29 shows a diagram of one embodiment wherein the computing device 2801 has a slot 2901 which contains connecting device 2902 which can receive and clamp to an edge of 2804 over the connecting device 2803 to create a single device consisting of 2801 and 2802. The computing device 2801 with slot 2901 is shown in side view in FIG. 29. A lens of lens/sensor unit 2807 is shown in the side view. A lens 2903 in an opposing direction is also shown. It is to be understood that in one embodiment of the present invention that either 2807 or 2903 or both 2807 and 2903 are a plurality of lens/sensor units.

FIG. 29 also shows a diagram of the combined devices 2801 and 2804. This allows 2900 to act as a complete portable computer. However 2900 can easily be separated again in 2801 and 2804 as separate devices. Combined device can act as a camera that applies screen 2805 as a direct viewer of either lens/sensor unit 2807 or 2903. In a further embodiment combined device 2900 records and shows images taken both by 2807 and 2903 at the same time on 2805. This may be done by displaying each respective image in a separate window on 2805. One may also show at least one image which may be a video image received by the phone device in device 2801 from a network, which may be the Internet on 2805. One may also receive a plurality of different images at the same time through the phone device. One may open separate windows for each received image and display the images which may be video images on the screen. One may also transmit an image taken by device 2801 through the network to recipients. In a further embodiment at least one window on the screen may be a window related to an application that is being processed by a processor on 2801. This window may also be transmitted through the phone device on 2801 over the network which may be the internet to one or more recipients. Accordingly, 2900 can be used as a portable teleconferencing device. It is to be understood that the functionality of 2900 can also be performed by 2804 and 2801 when not combined but in communication through connecting devices 2802 and 2803.

It is also to be understood that while 2801 in FIG. 29 is shown being clamped on 2804 on the left edge that other configurations are possible, including the computing device being clamped on the right edge, on the top edge, one the bottom edge and on the back side of the display 2804.

Figure 30:
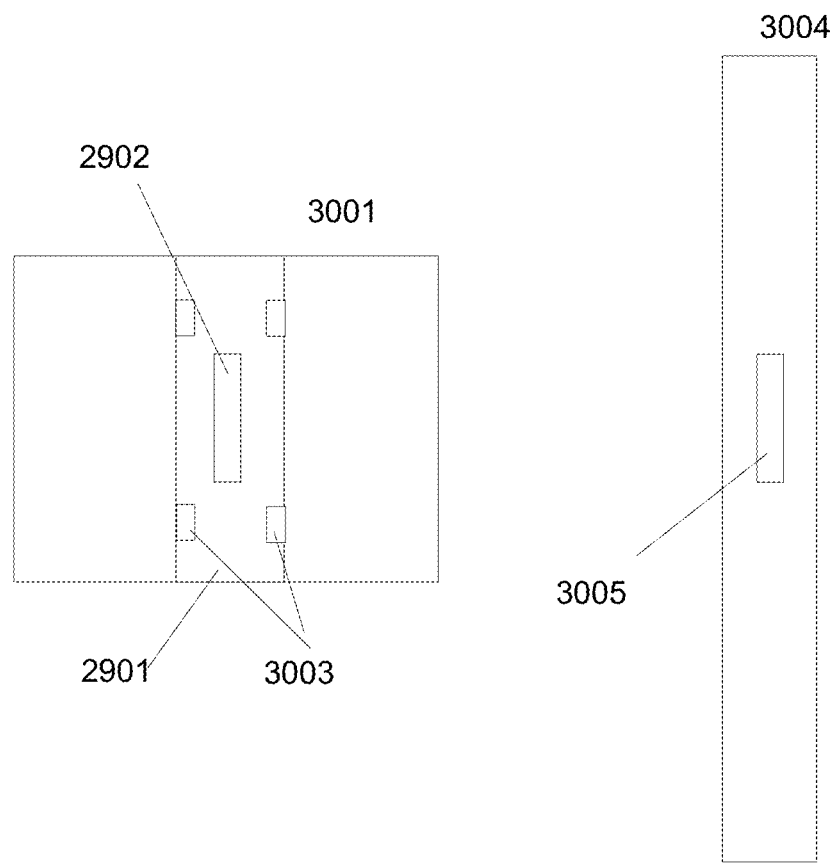

FIG. 30 shows in side view diagram one embodiment of a computing device 3001 that can be clamped onto a connectable display 3004 able to connect with computing device 3001. Computing device 3001 has, as was disclosed above, a slot 2901 which can receive the side of the display 3004. In one embodiment of the present invention, computing device 3001 has a connector 2902 which was also disclosed above and display 3004 has a connector 3005. Connectors 2902 and 3005 in one embodiment are matching male/female connectors that can be connected in a unique way. In a further embodiment of the present invention 2901 and 3005 are matching USB connectors. This allows the computing device 3001 to power the display 3004. In one embodiment the power to a display is exclusively provided externally and the display does not have a battery. The slot 2901 may be equipped with springs 3003 which further secure the display in the slot. Other means to secure the display in a slot, including alignment slots are fully contemplated. Side clamping with a slot has been provided as an illustrated example. Other means for connecting and fixating a computing device 3001 to a display 3004 are fully contemplated. For instance the display may receive the body of the computing device on the blind side. In another illustrative example the computing device may have a hook shaped connector that hooks over and edge of the display housing, with a connector inside the hook shape of the computing device and a connector on the edge of the display. In a further embodiment of the present invention 3001 and 3004 exchange data via a wireless connection.

The computing device and the connectable ut/ul display are two different devices that can be connected and/or combined. One way to not exclusively describe a combination of a computing device and a display is by size of their screens, wherein the screen of the display is larger than of the device it connects to. Another way to not exclusively describe an aspect of the invention is that no dimension in size of the computing device matches or is equal or substantially equal to the dimensions of the display with the condition that the screen of the display is larger than the screen of the computing device. The computing device housing has a length Lc (its longest dimension) a width Wc (its width) and a thickness Tc wherein all dimensions refer to the housings. These can be referred to as (Lc, Wc, Tc). A display, in a similar way, has housing dimensions (Ld, Wd, Td). In a first embodiment none of the corresponding dimensions (Lc, Wc, Tc) and (Ld, Wd, Td) are equal (Lc≠Ld) etc. In a further embodiment none of the dimensions (Lc, Wc, Tc) are equal to any of the dimensions (Ld, Wd, Td). In a further embodiment Lc<Ld and Wc<Wd. In a further embodiment Tc>Td.

In a further embodiment the display can connect preferably wirelessly with any computing device, including communication type devices such as routers to receive a signal with image data to be displayed, that is authorized. Such an authorization may be established by an authorization code or a way of coding or modulation as is known to one of ordinary skill in the art that allows an apparatus to be identified to be authorized. In a further embodiment, the display is enabled to send a probing signal wirelessly that can be recognized by a computing device. The computing device is programmed to recognize a specific signal, associate the specific signal with a specific authorization and transmits data, including image data to the display in response to a recognized probing signal. In a further embodiment the process starts with a computing device sending a signal that can be received and interpreted by the display. This signal tells the display that a computing device is present and ready to receive a probing signal from the display. This allows a display to be traced by a computing device when it is being moved and keep providing the display with appropriate data, which may include image data.

In a further embodiment a plurality of displays are static in location and placed in different positions and a first computing device is mobile, with a moving user for instance. A user may for instance be watching a video program that is stored on a second computing device on a first display and that is provided over a network to the first display. Relevant data about the video program is provided and stored on the first computing device. The user may move to a different location with a second display. The first computing device in communication with the second display communicates the presence of the user and provides the second display with the required data for the second display to show the program that was being watched on the first display with the correct timing and status data. This allows a user to move around a house and follow a video program continuously on different displays at different locations.

One may also apply a similar approach to computer applications. That is: a user may be working on one computer application at one display. All status information may be stored on a mobile first computing device that moves with the user or on a second computing device which is a server connected to a network. A status may be assigned a code which is stored on the first mobile computing device. The user, when moving to a different location with another display brings the first computing device. The first computing device interacts via the network with the second computing device and interprets the code associated with the status that is provided by the first computing device. When the application is processed from the server or second computing device it now automatically displays the correct interface associated with the status of the application. If the application is processed from the first computing device the second display starts displaying the correct interface based on the last status of the application.

In one embodiment the large connectable ultra-thin display is provided with a lens/sensor unit. In one embodiment the display has a thickness of 7 mm or less and has a weight of less than 16 ounces, preferably a weight of 12 ounces or less and a size of about 25 cm by 20 cm or larger. The lens/sensor unit can be a lens/sensor unit as disclosed by for instance Aptina Imaging of San Jose, Calif. in a wafer level camera form and with a claimed thickness of 2.5 mm. Another company offering a similar wafer level camera called NemoCAM-02AVG is Nemotek of Morroco. Its website describes the unit having a thickness of 2.6 mm. The datasheet of the NemoCAM-02AVG is incorporated herein by reference. A wafer level camera is also taught in US Patent Appl. Publ. Ser. No. 20090309177 to Jeung et al. published on Dec. 17, 2009 which is incorporated herein by reference. By using reflow soldering it is claimed by manufacturers that the wafer level camera can be soldered to a flexible PCB. This may add about 0.5 mm at least to the thickness of the camera. It is believed that the Nemotek camera module can be installed in a display that is 7 mm thick, as a housing can be created that has about 5-6 mm space if an ultrathin housing is created, for instance made from a high strength nanocarbon fiber reinforced shell. The shell can be reinforced with a structural foam.

It seems that an ultrathin display of about 5 mm thick or less may have trouble accommodating the wafer level camera module. This can be alleviated by forming a hole in the shell that receives the upper part of the wafer level camera. It appears from the literature and disclosures that are available at the time this aspect of the invention was made that no device having a thickness of 5 mm or less has been contemplated to incorporate a camera that is embedded completely inside the housing that is not thicker than 5 mm. Clearly, one can incorporate a larger camera, if it is allowed to stick out of the housing. In one embodiment of the present invention a ut/ul display having a thickness 'd' or less means that its greatest thickness at any location is not greater than 'd'. In such an embodiment if its general thickness is 'a' and a part sticks out by an amount of 'b', then the thickness is determined to be 'a'+'b'. So, with a thickness of 5 mm or less in such an embodiment the camera module has to fit within a housing that has not greater thickness than 5 mm anywhere.

Figure 34:
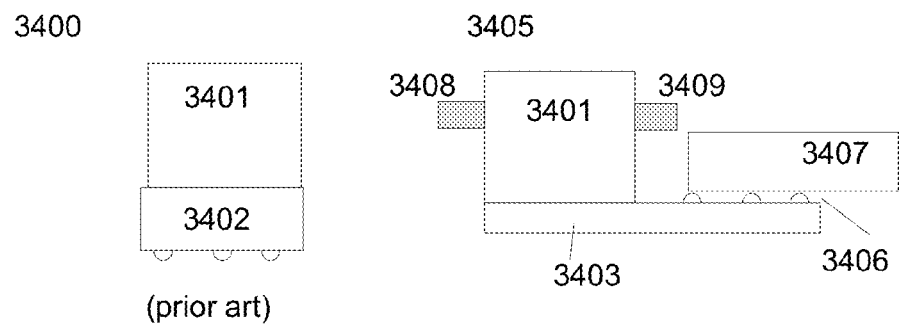
FIGS. 34-36 illustrate small thickness cameras to be integrated with a large thin display in accordance with an aspect of the present invention.

In accordance with one aspect of the present invention one may provide such a wafer level camera module with a much smaller backplane rather than a Ball Grid Array (BGA). This is shown in FIG. 34 wherein a module 3401 is attached to a BGA connector 3402 in a unit 3400. This connector still has to be soldered to a PCB, all adding to the thickness. In one embodiment of the present invention all connections, including power are provided through a thin backplane 3403 of about 0.5 mm thick in a first embodiment, but not thicker than 1 mm in a second embodiment. The backplane 3403 may have a BGA connector 3406 or any slim connector facing to the top of the camera module. Assuming that the thickness of the shell of the housing of the display is about 0.5 mm the connector 3407 can be about 2 mm thick without interfering with the shell. In one embodiment one applies wireless chip-to-chip communication between the sensor of the camera module and a connector chip 3407. Wireless chip-to-chip communication is enabled in for instance US Patent Application Publ. Ser. No. 20090175323 to Chung published on Jul. 9, 2009 and in the article RF/Wireless Interconnect for Inter- and Intra-Chip Communications by Mau-Chung Frank Chang et al. Proceedings of the IEEE, Vol. 89, no. 4, April 2001 pages 456-466 which are both incorporated herein by reference. This requires that the sensor chip of module 3401 is expanded with the communication part, which increases the size of the die. However, in this case the area of the chip is not as critical as the thickness of the chip or the backplane. By using the wireless connection, the backplane can be drastically reduced in size. The module 3401 can be provided with power through a very thin power rail 3403. The receiver chip is located in 3407. While the same diagram of FIG. 34 is applied it is noted that specific components in this embodiment have a different function from the earlier provided embodiment in diagram of FIG. 34.

Figure 35:
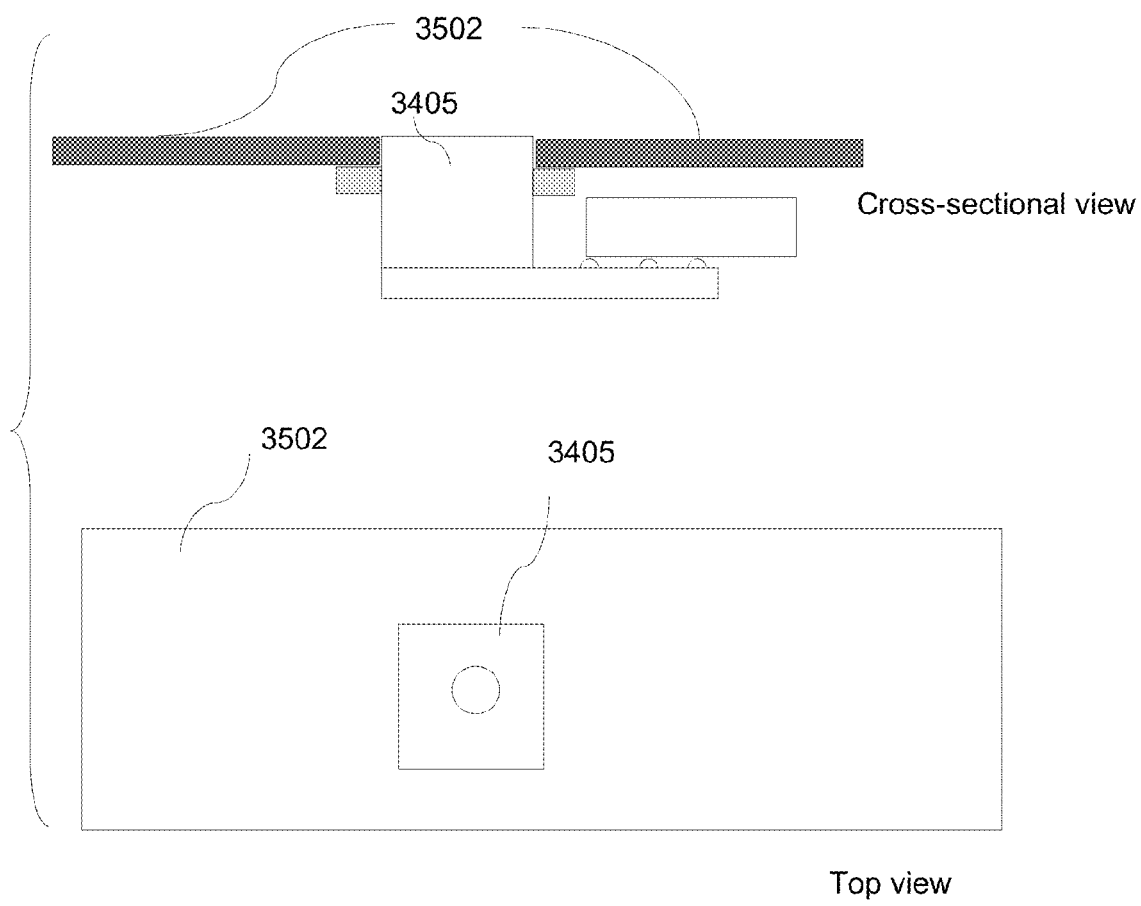

In a further embodiment of the present invention, if space allows it thin flanges 3408 and 3409 are attached to the housing of the camera module. This allows a precise fitting of the module 3401 against the surface of the housing. Preferably the flanges are 0.5 mm or less thick. FIG. 35 shows in diagram how the camera unit 3405 in one embodiment is fitted against the underside of the surface 3502 of the shell of the housing of the display. FIG. 35 shows a diagram both in cross-sectional view and in top view.

Figure 31:
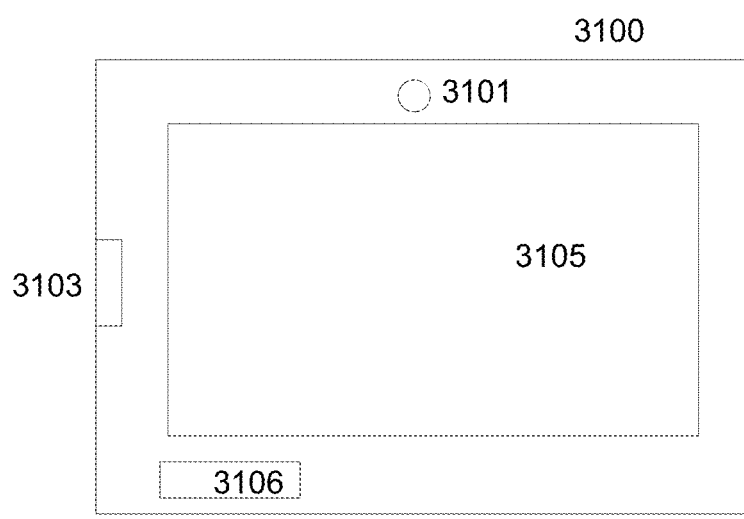
FIGS. 31-33 illustrate large displays with embedded lens/sensor units in accordance with an aspect of the present invention.
Figure 32:
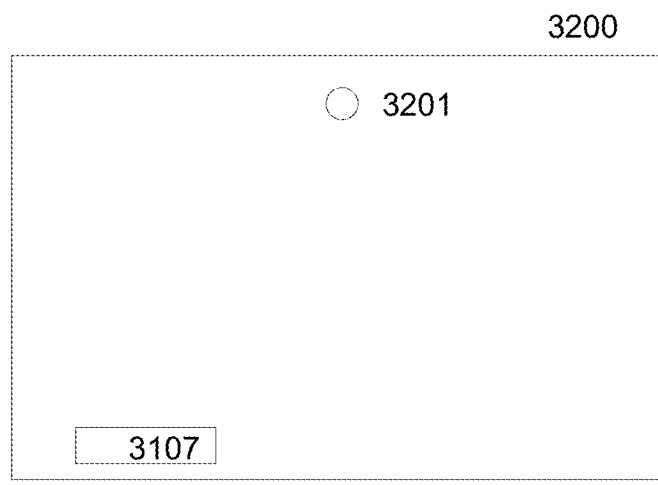
Figure 33:
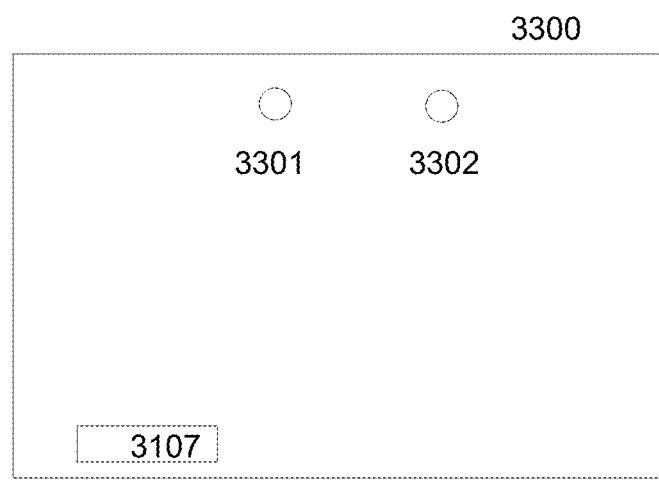

FIG. 31 shows in diagram one embodiment of a display body 3100 with a screen 3105 and a control 3106 and at least one lens/sensor unit 3101 and a connector 3103 to connect the display to the outside world. It is to be understood that related and required circuitry and connections as is known to one of ordinary skill are included in the body. In a further embodiment at least one lens/sensor unit 3201 in a display body 3200 is fitted into the body at the side of the display at the other side of the screen. A control 3107 may be included on that side. In a further embodiment of the present invention the display includes at least one lens/sensor unit 3101 at one side and at least one lens/sensor unit 3201 on the other side of the body of the ut/ul display. In a further embodiment of the present invention the ut/ul display includes at least two lens/sensor unit 3101 at one side and/or at least two lens/sensor units 3201 on the other side of the body of the ut/ul display. In a further embodiment of the present invention both at least one lens/sensor units are operated at the same time to create an image which may be a video image. It should be clear that if a body of the display has a thickness of about 5 mm or less then lens/sensor units 3101 and 3201 are positioned not opposite each other in the body as there is not enough room for that. FIG. 33 shows a diagram of an embodiment wherein one side of the display 3300 has at least two lens/sensor units 3301 and 3302 which may be enabled to create a panoramic and/or 3D image. The opposite side of the body may also have at least two lens/sensor units. Both at least two lens/sensor units in a further embodiment may be operated at the same time.

Figure 36:
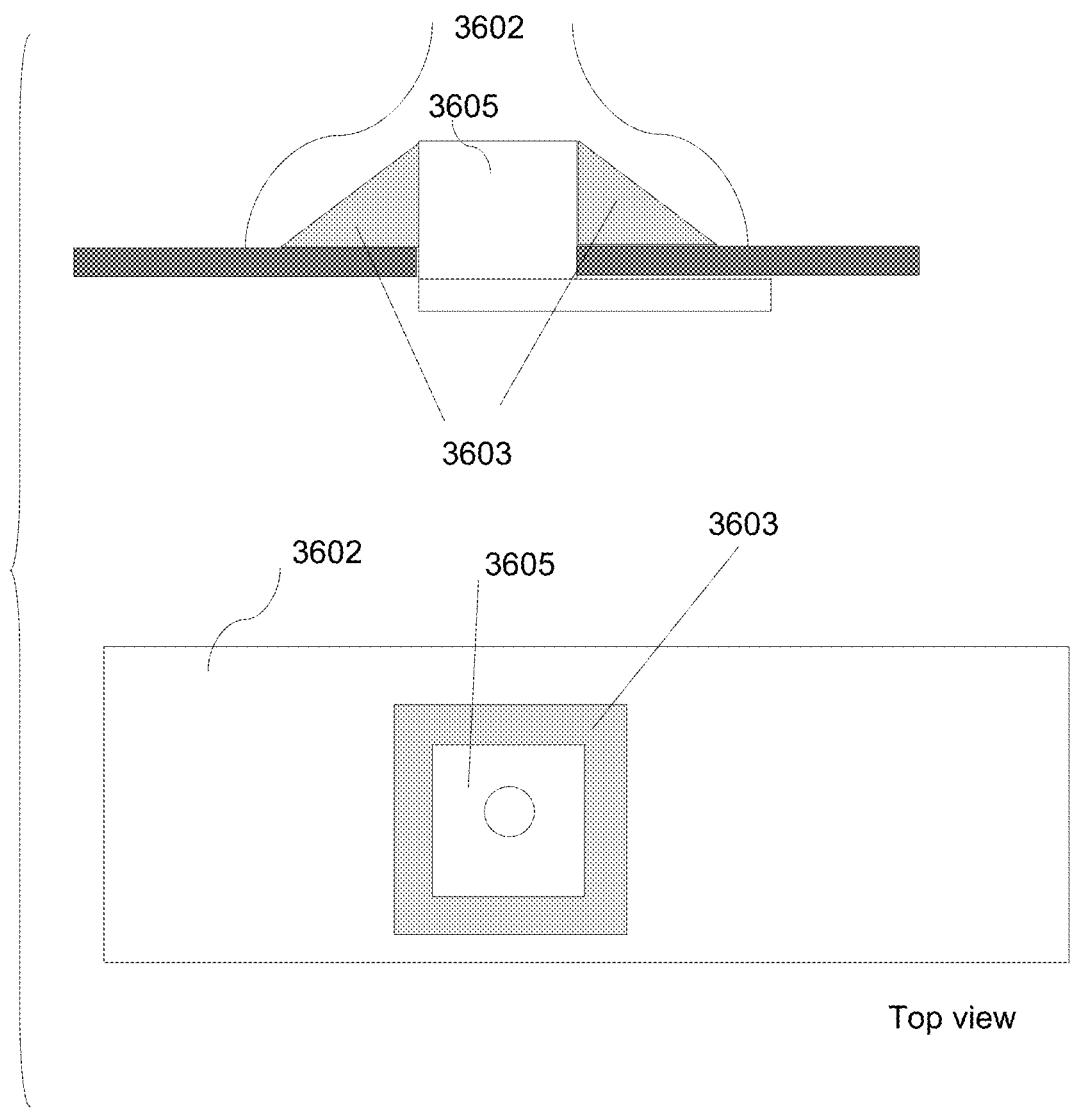

One can accommodate a lens/sensor unit of a thickness, complete with connectors of about 3 mm in a display with a thickness of 3 mm if part of the camera is allowed to stick out of the housing. This is illustrated in FIG. 36. A wafer level camera 3605 is fixed with its lens barrel through the wall 3603 and fit tightly with its backplane against the inside of the wall. Protective material 3603 to protect the barrel may be applied.

It is to be understood that an ut/ul display as provided herein, be it a detached, attached or detachable display displays images as generated by the computing device in real-time or close to real-time, with a delay that is in general not significantly noticeable by a user. One may use in one embodiment of the present display screen or screen material that has no or limited latency and can show images such as video in real-time with a speed of at least 12 images or frames per second in one embodiment, at least 20 images per second in a more preferred embodiment, 30 images per second in an even more preferred embodiment and at least 50 images or frames per second in a most preferred embodiment and shows images in full color. Accordingly, real-time video in one embodiment is video displaying at least 12 frames per second.

In a further embodiment of the present invention one may use material such as ePaper or eInk that has considerable latency and may show images at a speed of 10 images or frames per second or even less. Images may be shown in one embodiment of the present invention in shades of grey. It was already described previously that different materials to display images in accordance with an aspect of the present invention are available.

To be convenient the ut/ul display must be fairly large to serve its purpose as a large screen, thin and ultra light. It is believed that if a display does not meet certain dimensional criteria it will not serve its purpose as a detached portable large screen. It should have a screen of diagonal dimension of at least 10 cm, more preferably have a screen of diagonal dimension of at least 15 cm or preferably larger and preferably have a diagonal dimension of 20 cm, preferably even larger. Preferably it has a thickness of not more than 10 mm, more preferably not more than 7 mm, more preferable not more than 5 mm. Further, preferably a thickness should be less than 5 mm, preferably 3 mm or less, preferably 2 mm. The weight of the display should be preferably be less than 300 gram, in a further embodiment of the present invention less than 200 gram and in yet a further embodiment less than 100 gram. Preferably, the portable and self contained ut/ul display should be of the size, weight, and thickness of a magazine that one would carry without being bothered by its weight. One should be able to carry the ut/ul display in a bag or brief case, such as one would carry a magazine during travel. In one embodiment the ut/ul display has a screen that is a touch screen and wherein the display can communicate in a two way manner with the computing device. In a further embodiment the ut/ul display is connectable to a small footprint device that in a stand alone mode is mainly a mobile phone, but when connected with the display provided with touch screen capabilities is a full blown operational computing device, enabled to perform computing applications such as the full Microsoft Office® Suite of applications (Outlook, Word, Powerpoint, Excel, and Access), games, Internet browsing and the like.

Such a computing device in one embodiment has at least a processor, mass storage, display processing capability, communication capability, input and output capabilities and a minimal display, with an operating system and application software stored on the device while measuring not over 2 cm by 3 cm by 10 cm 3 in volume, preferably not more than 2 by 3 by 6 cm3 in volume.

At the time that this invention was made one available display would be an eReader. However, eReaders currently are not available as a separate portable display for a computing device with preferably at least one lens/sensor unit. In fact, one can conclude that eReaders (such as the Kindle II marketed by Amazon) are too small, too thick and too heavy to meet the requirements of the ut/ul display as defined above. eReaders are also not geared to display images in real-time, such as video images, generated from a lens/sensor unit in the computing device, which may be a smart phone with a camera.

One can find reviews of commercially available eReaders on the Internet. Such a review may be found at for instance <http://ebook-reader-review.toptenreviews.com/>. The eReaders are relatively small, thick and heavy. The battery as used in these eReaders cause the eReaders to be heavy and thick.

A separate and portable ut/ul display, which is preferably self contained and is enabled to communicate preferably wirelessly with a computing device such as a cell phone is provided herein as one aspect of the present invention. In one embodiment of the present invention the display is ultra thin. For instance in one embodiment the display is an ultra thin ePaper or eInk like display in a thin housing, and in its entirety not thicker than 5 mm. In a further embodiment the display with a portable housing has a thickness of 3 mm or thinner. The display screen material itself, for instance as announced by E.Ink corporation of Cambridge, Mass. is about 2 mm or thinner. Additional thickness or bulk is provided by a housing and in particular by a ultra-thin battery to power the display.

It should be clear that the large display as provided as an aspect of the present invention is very well enabled to display a panoramic image. The screen material in a further embodiment of the present invention is enabled to display 3D images.

The following patent applications, including the specification, claims and drawings, are hereby incorporated by reference herein, as if they were fully set forth herein: U.S. Non-Provisional patent application Ser. No. 12/435,624 filed on May 5, 2009 and U.S. Non-Provisional patent application Ser. No. 12/436,874 filed on May 7, 2009, U.S. Non-Provisional patent application Ser. No. 12/538,401 filed on Aug. 10, 2009, and U.S. Non-Provisional patent application Ser. No. 12/634,058 filed on Dec. 9, 2009.

Figure 42:
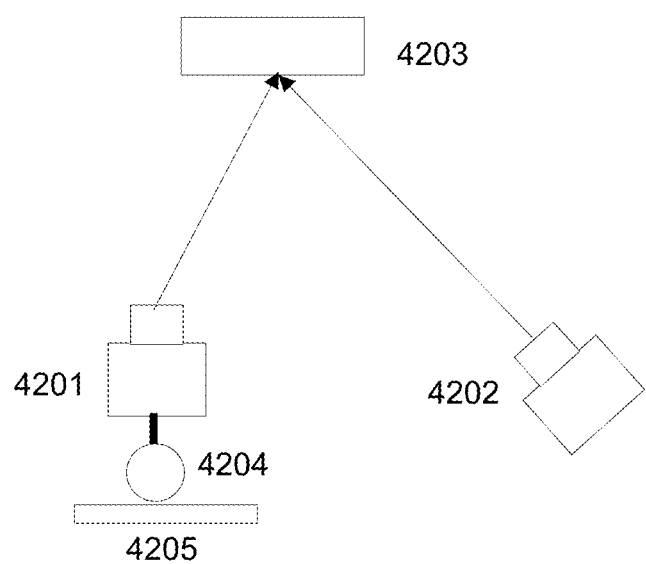
FIGS. 42-50 illustrate various aspects of a system for object tracking in accordance with one or more aspects of the present invention.

In accordance with another aspect of the present invention a system of two cameras is provided, wherein one camera 4201 is attached to a platform as illustrated in FIGS. 39 and 40 and as described above with an actuator 4204 which can be controlled remotely by a mobile computing device 4202 which also contains a camera to be rotated relative to a fixture 4205. This is illustrated in FIG. 42 wherein tow cameras designated as 4201 and 4202 are pointed at the object 4203 in real time. The cameras are digital cameras with a lens, an image sensor, memory and a processor.

Figure 43:
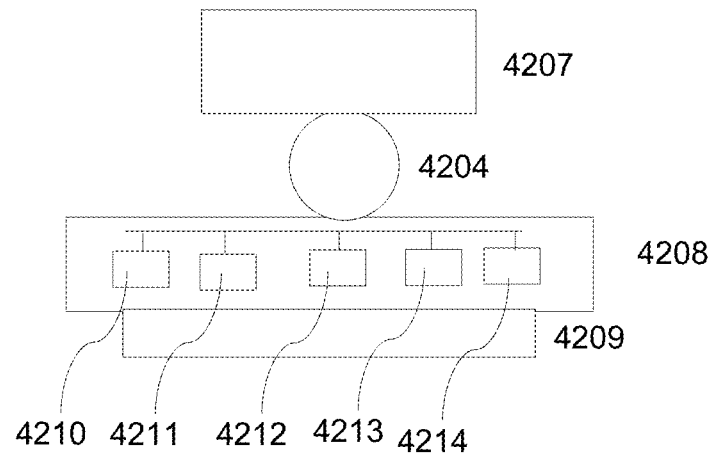

The rotatable platform is further illustrated in diagram in FIG. 43. The platform has a housing 4208 which is attached to a structure 4209. The attachment in one embodiment of the present invention is a removable attachment and in another embodiment of the present invention is a permanent or semi-permanent attachment.

The housing 4208 provides structural integrity and also contains the circuitry for the operations of the platform. To the housing is attached a first part of an actuator, with fixedly attached on another side a holder 4207. This allows to rotate the holder 4207 by the actuator 4204 relative to the housing. Rotation can be in one plane for instance in a horizontal plane. Rotation in another embodiment is in two planes, for instance horizontally and vertically. This allows the holder 4207 and a camera 4201 in the holder to be pointed almost anywhere in a 3D space only limited by the rotation room allowed by the actuator, the housing and the environmental structures.

The housing 4208 contains a number of circuits. Circuit 4210 is communication circuitry to communicate with the mobile computing device 4202. This could be a direct communication such as a wired communication or a wireless communication such as a Bluetooth link. The link receives commands from 4202 related to the activation of actuator 4204 and is enabled to send data to computing device 4202. The link 4202 in one embodiment of the present invention is enabled to transmit any of the data generated by either the platform or the camera in the holder 4207.

Circuit 4211 is a controller with a memory related to actuator 4204. Actuator 4204 may be a stepping motor which provides impulses to rotate 4207 with increments of for instance 1 degree or increments of 0.5 degree or increments of 0.1 degree in a first plane. A second stepping motor may be included to cause rotation of 4207 in a second plane. Circuitry 4211 is also enabled to determine a position of 4207 related to an origin or a neutral position.

Circuit 4212 is a general programmable processor with memory enabled to process data and execute instructions. Circuit 4213 may be included and may serve as circuitry for determining an orientation of the platform by GPS, digital compass and or sensors to determine a position and general attitude of the platform, including azimuth, elevation and altitude and location coordinates.

A digital compass is a device based on a magnetic sensor or magnetometer and can be read out by a processor to provide navigational data such as the orientation or azimuth of a device containing the digital compass.

Circuit 4214 is a communication link with a camera in holder 4207. The camera 4201 in one embodiment of the present invention is a removable camera. Camera 4201 in one embodiment of the present invention is a permanent camera.

The platform of FIG. 43 may have all circuitry or some of the circuitry, while remote reception and remote platform control are always enabled.

The platform also has additional circuits such as a power source, connectors, an antenna and the like.

Figure 44:
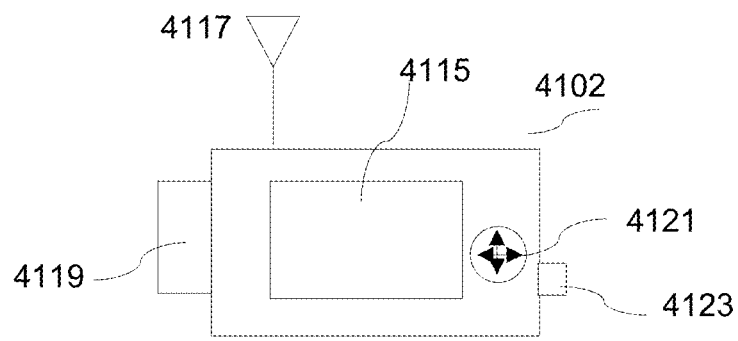

FIG. 44 illustrates a mobile computing device 4102 such as an Apple iPAD® with a camera with a lens 4123 a display screen 4115 an antenna 4117 for reception and transmission of signals a button to provide input in a first plane (left/right) and in a second plane (up/down) for instance to move a cursor on the screen and circuitry that is provided with such as computing device, including communication circuitry, a processor, memory and storage, power, connectors, a digital compass, GPS capability, accelerometers to determine a position of the device and any other devices, circuitry and software that is commonly included in a tablet like computing device like the iPAD®.

Figure 45:
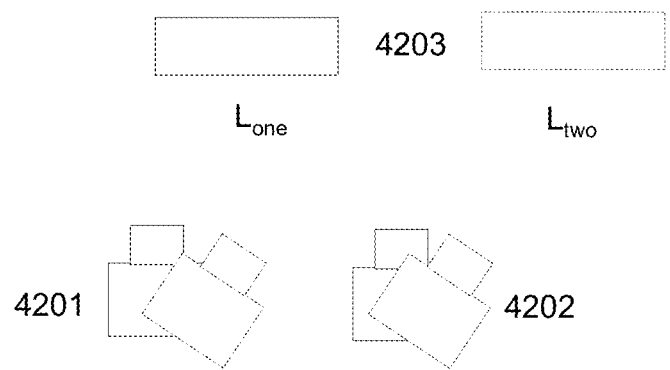
Figure 46:
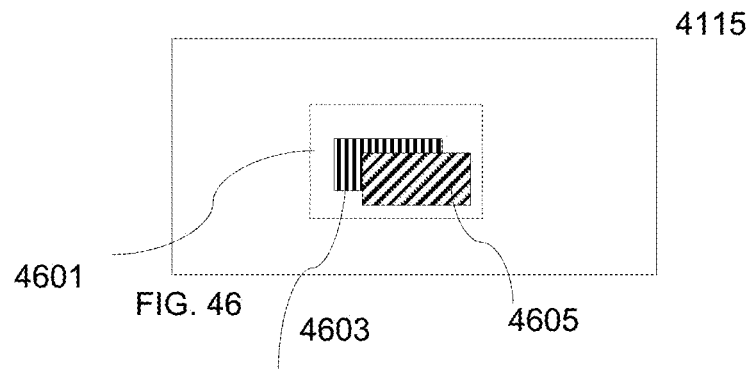
Figure 47:
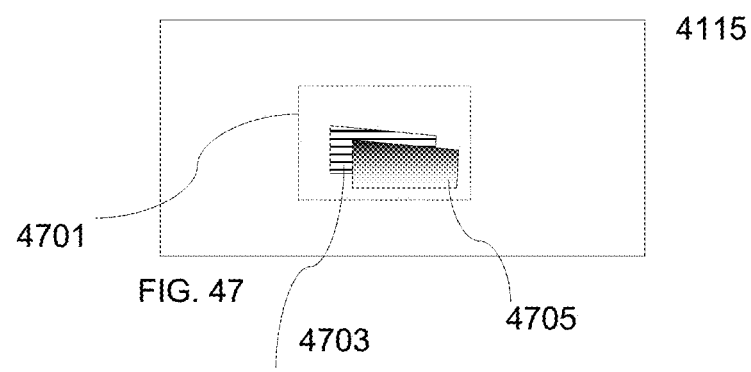
Figure 48:
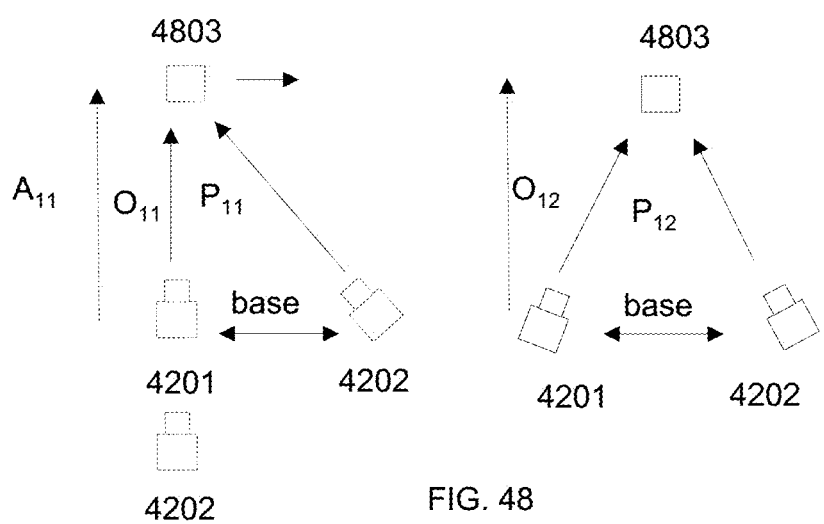

In one embodiment of the present invention camera 4101 is in the holder and is calibrated with camera 4202. This is illustrated in FIG. 45. The camera 4201 is pointed at an object 4203 in a first location $L_{one}$. An image of the object in this location is taken and stored on a memory, for instance on device 4202. The device 4202 is positioned in the same position as 4201 or as close as possible and an image of 4203 in $L_{one}$ is taken with the camera of 4202 and the image is also stored.

To make sure that the images are as close as possible they may be viewed on the screen 4115 of device 4202. A fixed window 4601 is drawn by the processor on 4115 and the image 4603 generated by 4201 is displayed. Also shown inside window 4601 is image 4605 of object 4203. The image 4605 or image 4603 or both are rendered as transparent allowing a user to make sure that both images match completely. Because the platform and 4201 have the least flexibility it is preferable that first image 4603 is generated and stored and displayed, followed by showing image 4605 in real-time. A user may position camera 4102 on the platform in a preferred position with controls 4121 to activate the actuator 4204 to view image 4603 in a preferred position inside the window. When images 4603 and 4605 match image 4605 is also stored together with the position of the actuator generated by 4211 to make this position repeatable and at least the digital compass setting of device 4202 and preferably also a GPS setting of 4202 and any accelerometer settings that are available. For instance a push on left part of control 4102 in one mode may the actuator 4204 cause to activate a rotation of 0.1 degree or 0.5 degree or 1 degree to the left. The controls on 4202 also allow to adjust and control the camera 4201, for instance start/stop recording, focal setting, aperture, color setting and the like.

One moves the object 4203 to a second location $L_{two}$ and one moves or rotates the cameras 4201 and 4202 as illustrated in FIG. 45 to take images 4703 and 4705 respectively in a matched position on screen 4115 and the images are stored together with again digital compass setting and other position settings that are available. In a further embodiment of the present invention the camera setting (especially focal setting) and data generated by an autofocus mechanism that determines a focal setting for a distance of a camera to the object are also stored for later use.

Image 4703 and 4705 are drawn in an exaggerated way to illustrate their distortion due to the angle of the camera.

One can step the cameras and objects through a series of settings with different distances to the object and angles relative to the object in an azimuth or relative compass setting. This type of calibration can be performed by a user with a series of different rotational settings or by for instance a manufacturer in a laboratory setting. The manufacturer can then provide a database of azimuth and distance settings which can be stored in a memory of for instance device 4202.

A user can enhance this database with actual images of an object or scene taken by either camera 4201 and/or 4202 and associated with a compass setting and preferably with a focal setting.

If the object is very close to the camera one has to take into account any difference in orientation of cameras 4201 and 4202. If the distance between cameras 4201 and 4202 is negligible relative to the distance of the object then one has not to correct. In one embodiment of the present invention one may place camera 4202 in the holder to take the relevant images. In one embodiment of the present invention one does not take images with 4202 and only the digital compass setting and GPS and accelerometer settings are recorded.

It is known that different cameras have different camera parameters and the image space of images of cameras 4201 and 4202 may be different. One may ignore the differences in images space by making sure that images of any camera are projected inside a window 4601. However, to be more accurate one may project all images to a common image space, for instance the image space of 4202 or to a neutral image space. How to do this is known and is for instance disclosed in U.S. Patent Application Ser. No. 20120293633 to Yamato published on Nov. 22, 2012 which is incorporated herein by reference. This allows the images to be sized by the processor to the same size so they can be registered by for instance moving camera 4202 to match the two images.

In accordance with an aspect of the present invention the two cameras and the platform are set-up for use to track a moving object 4803 or for a camera 4201 in the calibrated platform to follow or to track the movement of camera 4202.

Camera 4201 is placed in the platform attached to a structure. The camera is focused on an object 4803. The circuitry in the platform provided the relative position $O_{11}$ of the camera relative to the housing of the platform and sends it to device 4202. In one embodiment of the present invention the platform also has a digital compass and transmits its compass azimuth to 4202. In one embodiment of the present invention device 4202 is applied to determine the azimuth of the orientation of camera 4201. A user moves into a new position and takes an image of 4803 with 4202 with an azimuth $P_{11}$ of pointed to 4803.

In a next step 4202 is pointed at azimuth $P_{12}$ for instance a new position of 4803. Standard geometry allows to calculate the required rotational angle of 4201 to point also at 4803 or the focal point of 4201 to track the same arc as 4202. This can be calculated by the processor on 4202 using the available data. The processor on 4202 can translate the new required setting of 4201 into action to be performed by actuator 4202 to bring the direction of the holder from $O_{11}$ to $O_{12}$ and thus forcing the camera 4201 to point in the same direction as 4202 and thus allowing 4201 to track the movement of 4202 by using the compass data of 4202.

Figure 49:
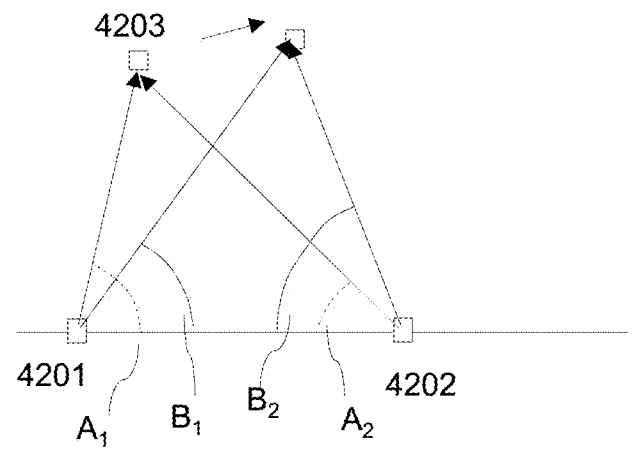

One may apply one of two methods to determine the new actuator setting. This is illustrated in FIG. 49. Basically, one determines angle $A_2$ or $B_2$ with the digital compass of 4202 to determine angles angle $A_1$ or $B_1$ and from that the actuator setting. This may create a lag in reaction. In a second embodiment a speed of 4203 is calculated and with that a corresponding average change in actuator angle $\Delta_{actuator}$. This estimated angle change is added to the previously calculated angle of the actuator and an error is determined for each moment that the angles are determined which could be once every second to 10 times every second up to every image frame generated by the cameras, which may be 120 frames per second or higher. The error angle is minimized by known optimization techniques such as the well known square root technique.

In one embodiment of the present invention the display 4115 shows the image being recorded by camera 4201 and a viewer of camera 4202 during the process. This allows a user to adjust the rotation or tracking speed and for instance an elevation of camera 4201 by adjusting the speed and elevation of camera 4202. Focal setting and aperture and other settings on 4201 may also be adjusted from 4202. Recording by camera 4201 can be started and stopped from 4202.

In one embodiment of the present invention two windows are shown on display 4115 each showing the image as generated by 4201 and 4202. Each camera may record their respective images at the same time or 4202 may act as a remote viewer or 4202 may record the image generated by 4201.

In one embodiment of the present invention camera 4201 is a panoramic or a 3D camera while 4202 is a single lens camera.

The intelligence of a platform system in one embodiment of the present invention is provided by circuitry that is part of the platform, including a processor which may also perform the control functions for the actuator, communication links and devices. All communications is directed by the platform either via a direct link to the remote mobile computing device 4202 or via a wireless link such as a cell-phone or Wi-Fi link. In addition the housing may contain a digital compass and/or GPS (global positioning system) systems. In this embodiment the camera may be a high-quality camera with its own processor. In that case a communication link is established between a processor in the housing and the high-quality camera. The housing processor includes data storage capability to store or buffer image data from the camera for transmission to the remote computing device. Before transmission the processor can perform image processing, including image space transformations, compression edge and corner detecting and line detection and generation.

In another embodiment of the present invention the camera 4201 is part of another smart phone or mobile computing device with processing capabilities, storage and a communication link to the remote computing device 4202. It may include a digital compass and GPS system. A communication link is established with the controller that controls the actuator.

Both above embodiments can perform the steps of the tracking methods as required. The holder can securely and removably hold the camera. In yet another embodiment of the present invention all intelligence and capabilities is included in the housing and the camera is fixedly attached to the actuator.

It is noted that 4201 and 4202 in one embodiment of the present invention view the same object in the same scene at the same time. The cameras may record their images at the same time into storage or memory. Also only one of the cameras may actually store an image. In a further embodiment of the present invention there are three cameras of which two are held in different platforms on different locations related to the same scene under control of a single mobile device as provided herein. This allows a single mobile device to control recording and tracking of an object in at least a combined field of view of three cameras in different location.

Furthermore, the mobile device can be applied to control the tracking or movement of a remote camera by moving the controlling device. This is advantageous when full attention is required to watch the image of the remote camera without being distracted by manipulating controls on the mobile device. One can hold the display of the mobile device in a visible position in from of the eyes and look at the image on the display generated by the remote camera. An arbitrary position of the platform can be used as the start position. For instance one can force the remote camera in the zero or neutral position and let that correspond with the current orientation of the digital compass in the mobile device. One can open a window on the mobile device that shows a map and the orientation of the remote camera allowing the remote user to turn relative to the direction of the remote camera as shown on the map.

It is known that 2D images of 3D objects are defined by a projective warping of 3D space to 2D space. This warping depends also on the camera parameters.

One can also combine or register images of an identical object in a common space wherein each image of the object is taken from a different position. In fact, when the object is known, one can determine the warping required to fully register the two images of the identical object by estimating the warping transformation that is required from the images. Such transformation estimation is for instance disclosed in U.S. Pat. No. 6,771,810 to Zhang et al. issued on Aug. 3, 2004 which is incorporated herein by reference and in U.S. Patent Application Publication Ser. No. 2003/0030638 to Astrom et al. published on Feb. 13, 2003 which is incorporated herein by reference and in U.S. Patent Application Publication Ser. No. 2013/0010081 to Tenney et al. published on Jan. 10, 2013 which is incorporated herein by reference.

Such estimation of the warping can be advantageously used to determine a relative orientation of two cameras. This requires, in accordance with an aspect of the present invention that the images of the two images are first represented in a common image space including a common grid. This means that the two cameras, if they have different pixel density, which may be the case, that the representative grids of the two cameras have to be normalized, for instance by interpolation or by reducing the resolution of the images. How to determine the relative orientation of two cameras is disclosed in U.S. Patent Application Publication Ser. No. 2013/0058582 to Van Beek et al. published on Mar. 7, 2013 which is incorporated herein by reference.

The estimation of the warping and thus the orientation between relative small images may take several seconds or up to 20 seconds as described in the article "On the Direct Estimation of the Fundamental Matrix" by Yaser Sheikh et al. on Apr. 30, 2007 and copyrighted by Radical Eye Software in 2004 and available on-line at <URLhttp://vision.eecs.ucf.edu/papers/742_submission.pdf> and which is incorporated herein by reference.

In accordance with an aspect of the present invention images generated by cameras 4201 and 4202 of a scene with the cameras generating images of identical objects shown inside a window on a display of camera 4202 are recorded and are analyzed to estimate a warping and thus a relative orientation of the cameras.

Figure 50:
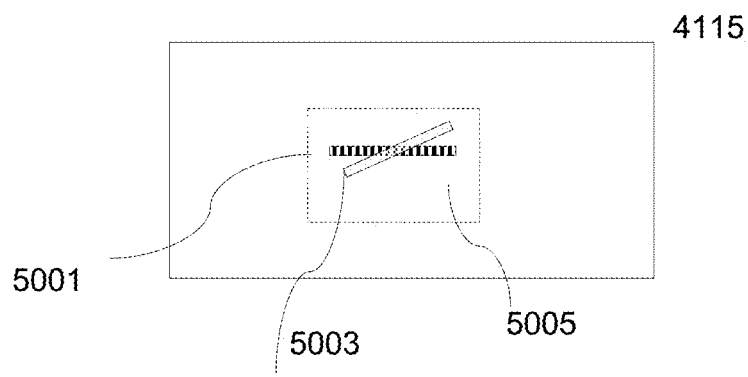

In one embodiment of the present invention line features are extracted from the images wherein the edges are limited to an area inside a window on the display. The absolute orientation of the camera 4201 has been established. A relative orientation of the cameras can be established by determining the relative position or angle between the cameras by analyzing the edges or lines by applying projective geometry as is known to one of ordinary skill. This is illustrated in FIG. 50. With two edges 5003 and 5005. Edges do not need to be straight lines. However, one can also extract corners of an object and calculate a line through corners. Furthermore, line estimating techniques like the Hough transform can also be applied. The processor can be initialized for a known maximum angle between the two cameras. The azimuth is known of camera 4202 by the digital compass. Using a previous setting, this allows the actuator 4204 to follow the movement of camera 4202 by minimizing an error angle between the two cameras that is calculated based on the information as explained earlier above.

In accordance with an aspect of the present invention the platform with housing 4208 contains a digital compass which data is provided to the device 4202 which makes the determination of angles even simpler if the device 4202 also has a digital compass.

Accordingly, methods and systems have been provided that allow a movable platform with an actuator and a holder holding a first camera to track an object and record an image of the object based on a second camera located on a different spot than the first camera that tracks the object. The first camera in fact tracks the first camera.

The term signal is used herein. Signals are processed by circuitry and represent data in digital systems. In most cases the term signal or signals can be replaced by the term data which is processed by a processor.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A camera system for tracking with a first camera a movement of a moving second camera in a device containing a digital compass, comprising:
    a platform including:
        a base that is removably attachable attached to a structure,
        a housing, the housing being attached to the base,
        the housing containing a controller to control an actuator attached to the housing and attached to a holder enabled to removably hold the first camera, the actuator enabled to rotatably move the holder relative to the base;
    a communication circuit to transmit data representing an image recorded by the first camera to the moving second camera; and
    the communication circuit enabled to receive control data from the second camera for the controller to control the actuator, the second camera containing a processor configured with instructions on the second camera to process the data representing the image recorded by the first camera and data generated by the digital compass to generate the control data; and
    the controller is configured to execute instructions that instruct the actuator to rotatably move the holder based on the received control data.

2. The camera system of claim 1, wherein the device is a smart phone.

3. The camera system of claim 1, wherein the moving second camera includes a display enabled to display the image recorded by the first camera and the image recorded by the moving second camera.

4. The camera system of claim 3, wherein the display is configured to display at least one of the images recorded by the first camera and the image recorded by the moving second camera in a transparent mode.

5. The camera system of claim 3, further comprising a window configured by the processor on the moving second camera to be displayed on the display inside which the image recorded by the first camera and the image recorded by the moving second camera are configured to be displayed.

6. The camera system of claim 1, wherein the housing contains a digital compass.

7. The camera system of claim 1, further comprising communication circuitry to establish a communication link between the first camera and a processor in the housing.

8. The camera system of claim 2, wherein the first camera is part of a mobile computing device with communication circuitry to establish a communication link to the mobile computing device where the moving second camera is part of.

9. A platform removably holding a camera to collaborate with a remote mobile computing device containing a digital compass, comprising:
- a base enabled to be attached to a structure;
- a housing attached to the base, the housing containing a controller;
- an actuator attached to the housing, the actuator being controlled by the controller; and
- a camera holder attached to the actuator enabled to be rotatably moved by the actuator relative to the housing, the camera enabled to be removably held by the holder, wherein the controller is configured to control the actuator based on control data received from the remote mobile computing device;
- the remote mobile computing device containing a processor configured with instructions to process image data representing an image recorded by the camera removably held by the holder and a status of the digital compass contained in the remote mobile computing device to generate the control data.

10. The platform of claim 9, further comprising circuitry to establish a communication link between the controller and the remote mobile computing device.

11. The platform of claim 9, further comprising a digital compass inside the housing.

12. The platform of claim 9, further comprising communication circuitry to establish a communication link between the camera and the controller.

* * * * *